US010247006B2

(12) United States Patent
Holloway et al.

(10) Patent No.: US 10,247,006 B2
(45) Date of Patent: Apr. 2, 2019

(54) TURBINE BLADE HAVING RADIAL THROAT DISTRIBUTION

(71) Applicant: General Electric Company, Schenectady, NY (US)

(72) Inventors: Dennis Scott Holloway, Simpsonville, SC (US); Adebukola Oluwaseun Benson, Simpsonville, SC (US); Melbourne James Myers, Woodruff, SC (US); Peter Paul Pirolla, Greer, SC (US); William Scott Zemitis, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 398 days.

(21) Appl. No.: 15/207,750

(22) Filed: Jul. 12, 2016

(65) Prior Publication Data
US 2018/0016902 A1    Jan. 18, 2018

(51) Int. Cl.
*F01D 5/14* (2006.01)
*F01D 25/24* (2006.01)

(52) U.S. Cl.
CPC ............. *F01D 5/141* (2013.01); *F01D 5/145* (2013.01); *F05D 2250/74* (2013.01); *Y02E 20/16* (2013.01); *Y02T 50/673* (2013.01)

(58) Field of Classification Search
CPC .......... F01D 5/141; F01D 5/147; F01D 25/24; F05D 2220/30; F05D 2250/74
See application file for complete search history.

(56) References Cited

U.S. PATENT DOCUMENTS

| 6,375,420 | B1 * | 4/2002 | Tanuma | F01D 5/141 415/199.5 |
| 6,604,285 | B2 * | 8/2003 | Burdgick | F01D 5/141 29/407.04 |
| 7,134,842 | B2 * | 11/2006 | Tam | F01D 5/143 416/193 A |
| 7,220,100 | B2 * | 5/2007 | Lee | F01D 5/143 415/191 |
| 8,133,030 | B2 | 3/2012 | Grafitti et al. | |
| 8,439,643 | B2 * | 5/2013 | Kuhne | F01D 5/143 416/193 A |
| 8,439,645 | B2 * | 5/2013 | Tsifourdaris | F01D 5/141 416/223 R |
| 8,740,570 | B2 | 6/2014 | Stein et al. | |
| 2013/0104550 | A1 * | 5/2013 | Smith | F01D 5/141 60/722 |
| 2015/0107265 | A1 * | 4/2015 | Smith | F01D 5/143 60/805 |

(Continued)

*Primary Examiner* — Igor Kershteyn
(74) *Attorney, Agent, or Firm* — Ernest G. Cusick; Hoffman Warnick LLC

(57) ABSTRACT

Various embodiments of the invention include turbine blades and systems employing such blades. Various particular embodiments include a turbine blade having: an airfoil having: a suction side; a pressure side opposing the suction side; a leading edge spanning between the pressure side and the suction side; and a trailing edge opposing the leading edge and spanning between the pressure side and the suction side, wherein the trailing edge defines a radial throat distribution between the airfoil and an adjacent airfoil; and a base connected with a first end of the airfoil along the suction side, pressure side, trailing edge and the leading edge.

18 Claims, 7 Drawing Sheets

(56) References Cited

U.S. PATENT DOCUMENTS

| | | | |
|---|---|---|---|
| 2015/0107266 A1* | 4/2015 | Gustafson | F01D 5/02 60/805 |
| 2015/0110618 A1* | 4/2015 | Stein | F01D 9/041 415/208.2 |
| 2015/0110629 A1* | 4/2015 | Brozyna | F01D 5/143 416/203 |

* cited by examiner

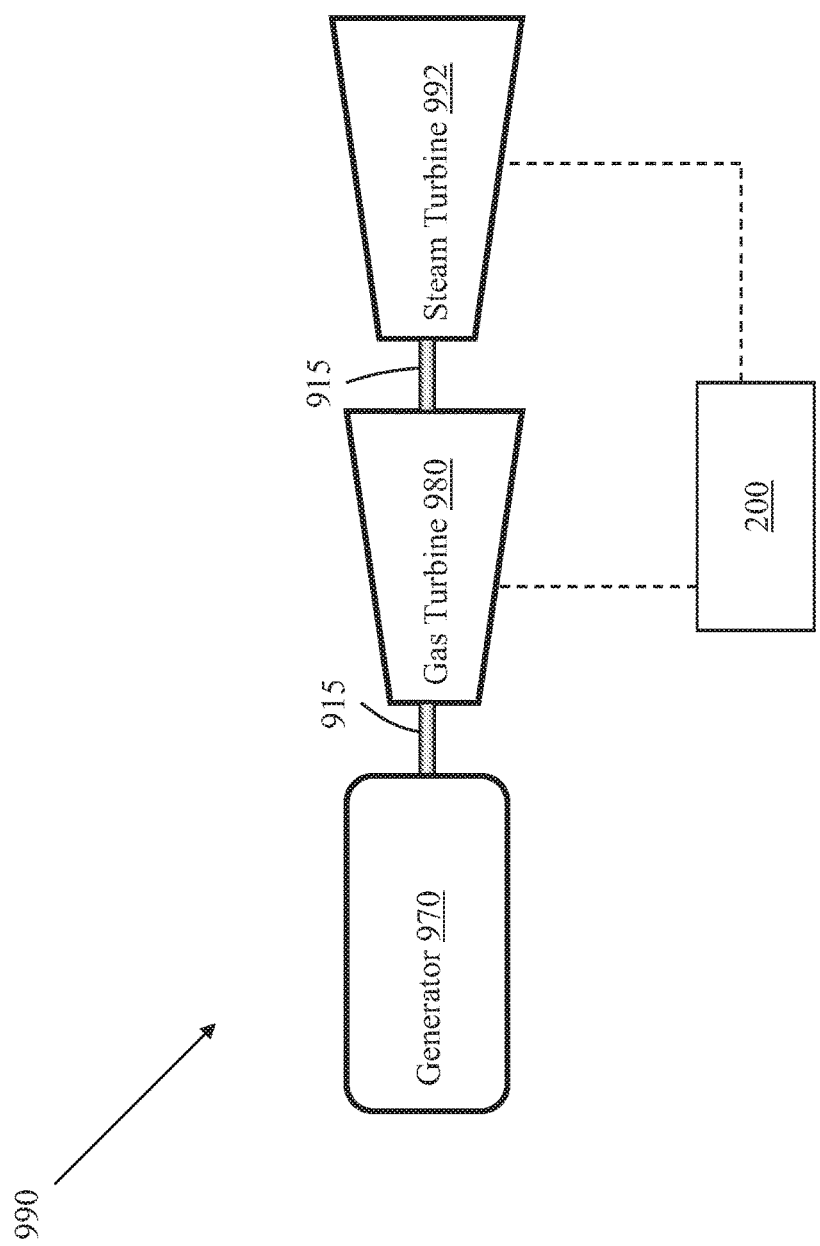

TURBINE BLADE HAVING RADIAL THROAT DISTRIBUTION

FIELD OF THE INVENTION

The subject matter disclosed herein relates to turbomachines. More particularly, the subject matter disclosed herein relates to components within turbomachines such as gas and/or steam turbines.

BACKGROUND OF THE INVENTION

Some aircraft and/or power plant systems, for example certain jet aircraft, nuclear, simple cycle and combined cycle power plant systems, employ turbines (also referred to as turbomachines) in their design and operation. Some of these turbines employ airfoils (e.g., turbine blades, blades, airfoils, etc.) which during operation are exposed to fluid flows. These airfoils are configured to aerodynamically interact with the fluid flows and generate energy (e.g., creating thrust, turning kinetic energy to mechanical energy, thermal energy to mechanical energy, etc.) from these fluid flows as part of power generation. As a result of this interaction and conversion, the aerodynamic characteristics and losses of these airfoils have an impact on system and turbine operation, performance, thrust, efficiency, and power.

BRIEF DESCRIPTION OF THE INVENTION

Various embodiments of the invention include turbine blades and systems employing such blades. Various particular embodiments include a turbine blade having: an airfoil having: a suction side; a pressure side opposing the suction side; a leading edge spanning between the pressure side and the suction side; and a trailing edge opposing the leading edge and spanning between the pressure side and the suction side, wherein the trailing edge defines a radial throat distribution between the airfoil and an adjacent airfoil; and a base connected with a first end of the airfoil along the suction side, pressure side, trailing edge and the leading edge.

A first aspect of the invention includes a turbine blade having: an airfoil having: a suction side; a pressure side opposing the suction side; a leading edge spanning between the pressure side and the suction side; and a trailing edge opposing the leading edge and spanning between the pressure side and the suction side, wherein the trailing edge defines a radial throat distribution between the airfoil and an adjacent airfoil; and a base connected with a first end of the airfoil along the suction side, pressure side, trailing edge and the leading edge.

A second aspect of the invention includes a turbine rotor section including: a set of blades, the set of blades including at least one blade having: an airfoil having: a suction side; a pressure side opposing the suction side; a leading edge spanning between the pressure side and the suction side; and a trailing edge opposing the leading edge and spanning between the pressure side and the suction side, wherein the trailing edge defines a radial throat distribution between the airfoil and an adjacent airfoil of a distinct blade in the set of blades; and a base connected with a first end of the airfoil along the suction side, pressure side, trailing edge and the leading edge, wherein at least one of the suction side or the pressure side of the airfoil includes a nominal profile substantially in accordance with Cartesian coordinate values of X, Y and Z set forth in TABLE I, wherein the Z coordinate values are non-dimensional values of from 0 to 1 convertible to Z distances by multiplying the Z values by an airfoil height expressed in units of distance, and wherein X and Y values connected by smooth continuing arcs define airfoil profile sections at each distance Z along the airfoil, the profile sections at the Z distances being joined smoothly with one another to form the airfoil profile, the X, Y, and Z distances being scalable as a function of the same constant or number to provide a scaled up or scaled down airfoil, wherein the Cartesian coordinate values have an origin at a root of the leading edge of the airfoil.

A third aspect of the invention includes a turbine having: a static nozzle section; and a rotor section at least partially contained within the static nozzle section, the rotor section having a set of static blades including at least one blade having: an airfoil having: a suction side; a pressure side opposing the suction side; a leading edge spanning between the pressure side and the suction side; and a trailing edge opposing the leading edge and spanning between the pressure side and the suction side, wherein the trailing edge defines a radial throat distribution between the airfoil and an adjacent airfoil of a distinct blade in the set of blades; and a base connected with a first end of the airfoil along the suction side, pressure side, trailing edge and the leading edge.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 7 shows a schematic block diagram illustrating portions of a single-shaft combined cycle power plant system according to embodiments of the disclosure.

It is noted that the drawings of the invention are not necessarily to scale. The drawings are intended to depict only typical aspects of the invention, and therefore should not be considered as limiting the scope of the invention. It is understood that elements similarly numbered between the FIGURES may be substantially similar as described with reference to one another. Further, in embodiments shown and described with reference to FIGS. 1-7, like numbering may represent like elements. Redundant explanation of these elements has been omitted for clarity. Finally, it is understood that the components of FIGS. 1-7 and their accompanying descriptions may be applied to any embodiment described herein.

DETAILED DESCRIPTION OF THE INVENTION

As noted herein, various aspects of the invention are directed toward turbine blades. Particular aspects of the invention include turbine blades having a radial throat distribution between adjacent blade airfoils.

In contrast to conventional turbine blades, aspects of the invention include a turbine blade (e.g., a dynamic blade for driving a turbine shaft) having a radial throat distribution between adjacent blade airfoils. This radial throat distribution can provide for enhanced performance, efficiency and/or durability of the blade (and associated turbine stages and turbine machines) when compared with conventional blades. Additionally, the turbine blade can satisfy aerodynamic and cooling parameters for the particular turbine in which it operates.

As used herein, the terms "axial" and/or "axially" refer to the relative position/direction of objects along axis A, which is substantially parallel to the axis of rotation of the turbomachine (in particular, the rotor section). As further used herein, the terms "radial" and/or "radially" refer to the relative position/direction of objects along axis (r), which is substantially perpendicular with axis A and intersects axis A at only one location. Additionally, the terms "circumferential" and/or "circumferentially" refer to the relative position/direction of objects along a circumference which surrounds axis A but does not intersect the axis A at any location. Further, the term leading edge refers to components and/or surfaces which are oriented upstream relative to the fluid flow of the system, and the term trailing edge refers to components and/or surfaces which are oriented downstream relative to the fluid flow of the system.

In the following description, reference is made to the accompanying drawings that form a part thereof, and in which is shown by way of illustration specific embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 1:
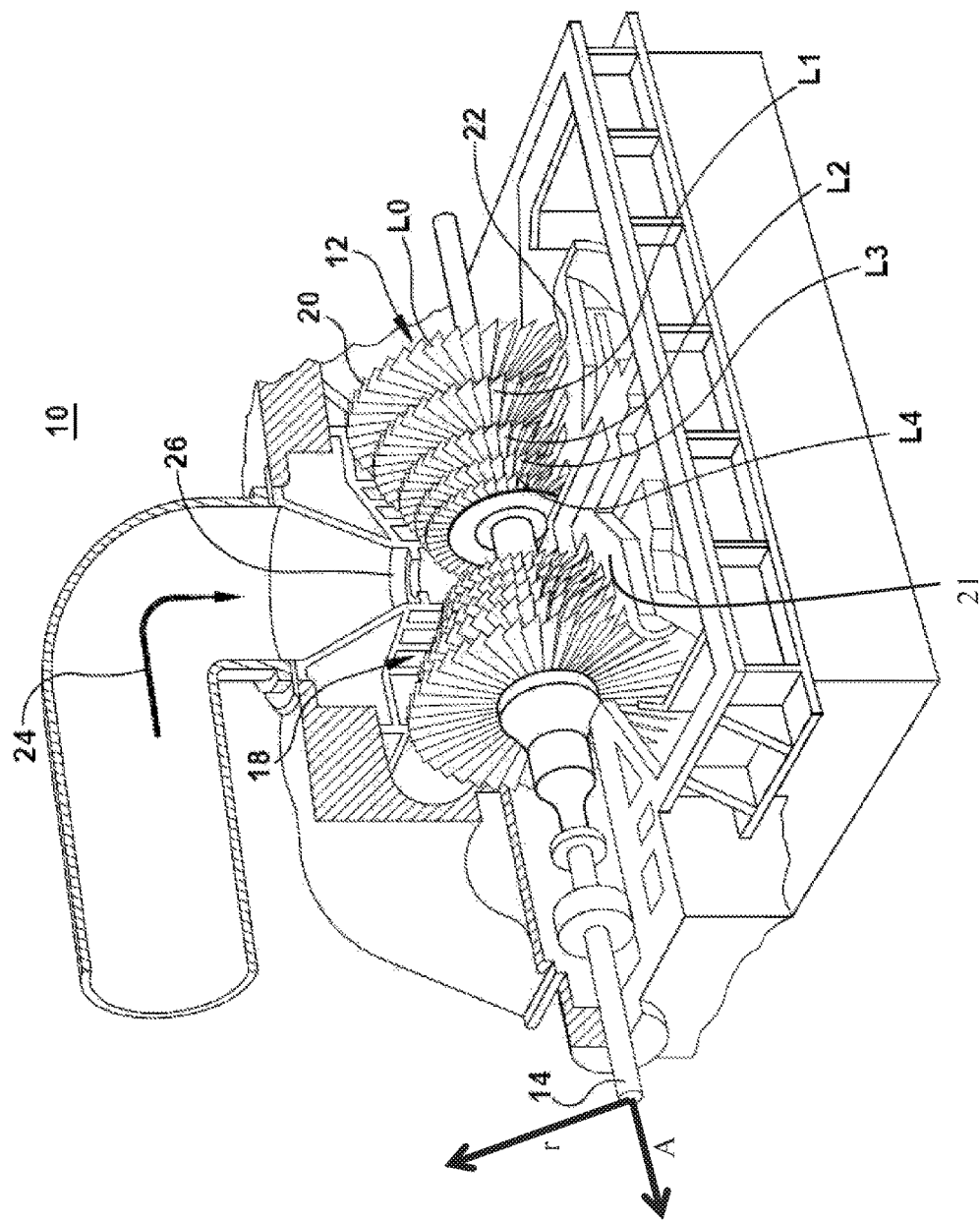
FIG. 1 shows a three-dimensional partial cut-away perspective view of a portion of a turbine according to an embodiment of the disclosure.

Referring to the drawings, FIG. 1 shows a perspective partial cut-away illustration of an example turbine 10 (e.g., a gas or steam turbine) according to various embodiments of the invention. Turbine 10 includes a rotor 12 that includes a rotating shaft 14 and a plurality of axially spaced rotor wheels 18. A plurality of rotating blades 20 (dynamic blades) are mechanically coupled to each rotor wheel 18. More specifically, blades 20 are arranged in rows that extend circumferentially around each rotor wheel 18. A static nozzle section 21 is shown including a plurality of stationary nozzles 22 circumferentially around shaft 14, and the nozzles 22 are axially positioned between adjacent rows of blades 20. Stationary nozzles 22 cooperate with blades 20 to form a stage of the turbine 10, and to define a portion of a flow path through turbine 10. As shown, the static nozzle section 21 at least partially surrounds the rotor 12 (shown in this cut-away view). It is understood that the turbine 10 shown is a dual-flow turbine 10 that includes an axially centered inlet mouth which feeds two sets of turbine stages. It is understood that various teachings can be applied to axial turbines, e.g., axial inlet gas turbines that inlet a combustion gas from a first axial end and outlet that combustion gas to a second axial end after the gas has performed mechanical work on the turbine.

Returning to FIG. 1, in operation, gas 24 enters an inlet 26 of turbine 10 and is channeled through stationary nozzles 22. Nozzles 22 direct gas 24 against blades 20. Gas 24 passes through the remaining stages imparting a force on blades 20 causing shaft 14 to rotate. At least one end of turbine 10 may extend axially away from rotating shaft 12 and may be attached to a load or machinery (not shown) such as, but not limited to, a generator, and/or another turbine.

In one embodiment, turbine 10 may include five stages. The five stages are referred to as L0, L1, L2, L3 and L4. Stage L4 is the first stage and is the smallest (in a radial direction) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that five stages are shown as one example only, and each turbine may have more or less than five stages. Also, as will be described herein, the teachings of the invention do not require a multiple stage turbine. In another embodiment, turbine 10 may comprise an aircraft engine used to produce thrust.

Figure 2:
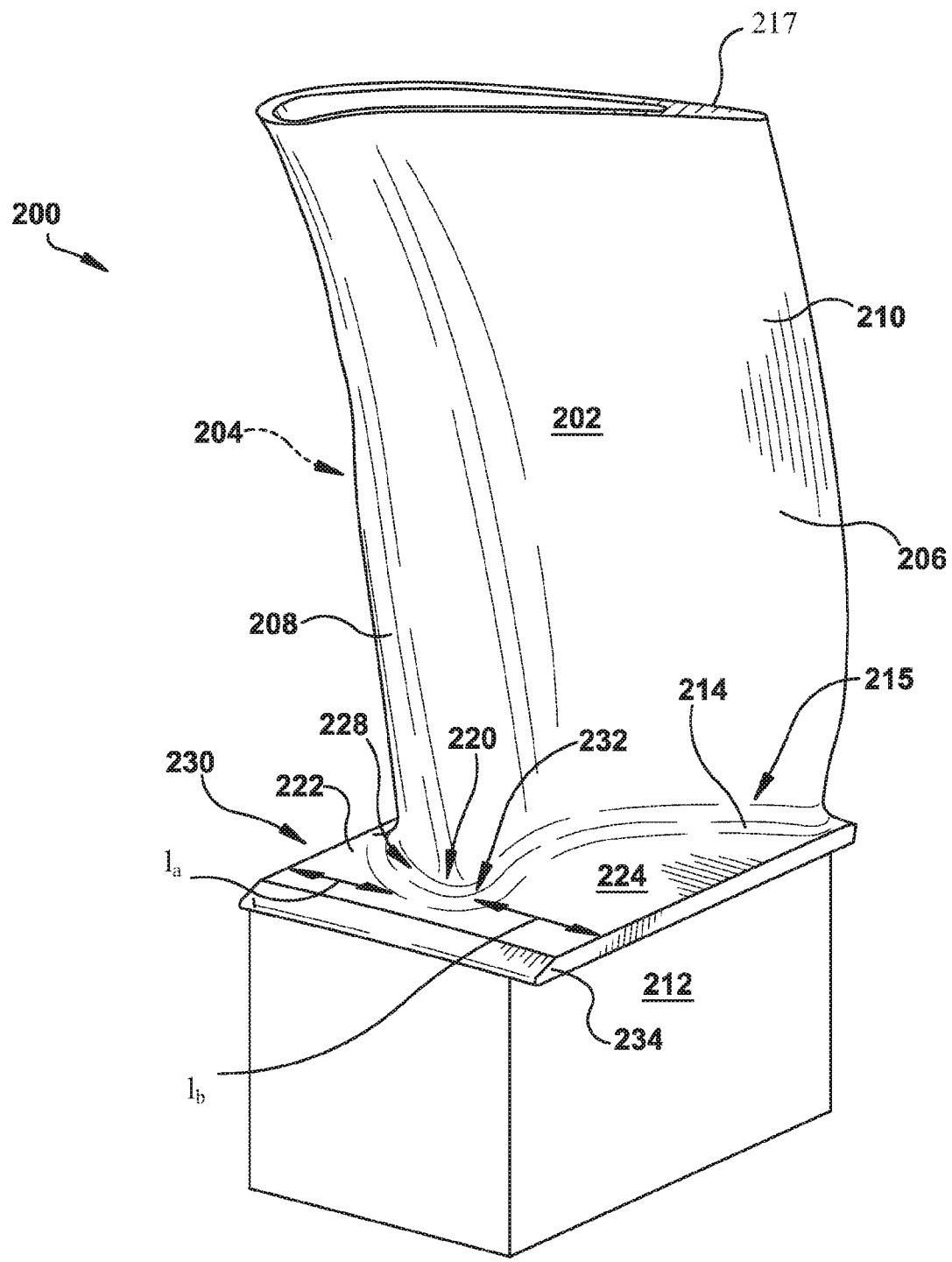
FIG. 2 shows a schematic three-dimensional depiction of a turbine blade including an airfoil and a base according to various embodiments of the disclosure.

Turning to FIG. 2, a schematic three-dimensional depiction of a turbine blade (or simply, blade) 200 is shown according to various embodiments. The blade 200 is a rotatable (dynamic) blade which is part of a set of blades circumferentially dispersed about a rotor shaft in a stage of a turbine (e.g., turbine 10). That is, during operation of a turbine (e.g., turbine 10), the blade 200 will rotate about the axis A as a working fluid (e.g., gas or steam) is directed across the blade's airfoil, initiating rotation of a rotor shaft (e.g., shaft 14). It is understood that blade 200 is configured to couple (mechanically couple via fasteners, welds, slot/grooves, etc.) with a plurality of similar or distinct blades (e.g., blades 200 or other blades) to form a set of blades in a stage of the turbine.

Returning to FIG. 2, turbine blade 200 can include an airfoil 202 having a suction side 204 (obstructed in this view), and a pressure side 206 opposing the suction side 204. Blade 200 can also include a leading edge 208 spanning between pressure side 206 and suction side 204, and a trailing edge 210 opposing leading edge 208 and spanning between pressure side 206 and suction side 204.

As shown, blade 200 can also include a base 212 connected with the airfoil 202. The base 212 can be connected with the airfoil 202 along the suction side 204, pressure side 206, trailing edge 210 and the leading edge 208. In various embodiments, the blade 200 includes a fillet 214 proximate a first end 215 of the airfoil 202, the fillet 214 connecting the airfoil 202 and the base 212. The fillet 214 can include a weld or braze fillet, which may be formed via conventional MIG welding, TIG welding, brazing, etc. As is known in the art, the base 212 is designed to fit into a mating slot in the turbine rotor shaft (e.g., shaft 14) and mate with adjacent base components of other blades 200. The base 212 is designed to be located radially inboard of the airfoil 202

With reference to FIG. 1, in various embodiments, blade 200 can include a first stage blade (L4) or second stage blade (L3). In particular embodiments, blade 200 is a second stage blade (L3), and the improved flow profile across airfoil 200 and base 212 interface allows that first stage blade (L4) to withstand the high-heat gas entering turbine 10 at that first stage. In various embodiments, turbine 10 can include a set of blades 200 in only the first stage (L4) of turbine 10, or in only the first stage (L4) and the second stage (L3) of turbine 10.

According to various embodiments, base 212 includes a first surface 222 on the suction side 204 of leading edge 208, and a second surface 224 on the pressure side 206 of leading edge 208. The second surface 224 and the first surface 222 can have distinct slopes, e.g., distinct radial v. circumferential ratios. In some embodiments, the first surface 222 has a distinct profile from the second surface 224. In some cases, the distinct profile includes distinct base features (e.g., bump(s), trough(s), etc.) in the first surface 222 as compared with the second surface 224 (having its own endwall features (e.g., bump(s), trough(s), etc.). In some cases, the second surface 224 has a substantially flat, or unsloped gradient, and the first surface 222 has a gradient distinct from the gradient of the second surface, e.g., a gradient that is positive or negative, but not equal to zero.

According to various particular embodiments, the first surface 222 has a first length $l_a$ measured from a junction 228 of the suction side 204 and the leading edge 208 of the airfoil 202 along the base 212 to an outer edge 230 of the base 212. In these embodiments, the second surface 224 has a second length $l_b$ measured from a junction 232 of the pressure side 206 and the leading edge 208 of the airfoil 202 along the base 212 to an inner edge 234 of the base 212. In various embodiments, the first length $l_a$ is distinct from the second length $l_b$, and in particular embodiments, the second length $l_b$ is greater than the first length $l_a$.

Figure 3:
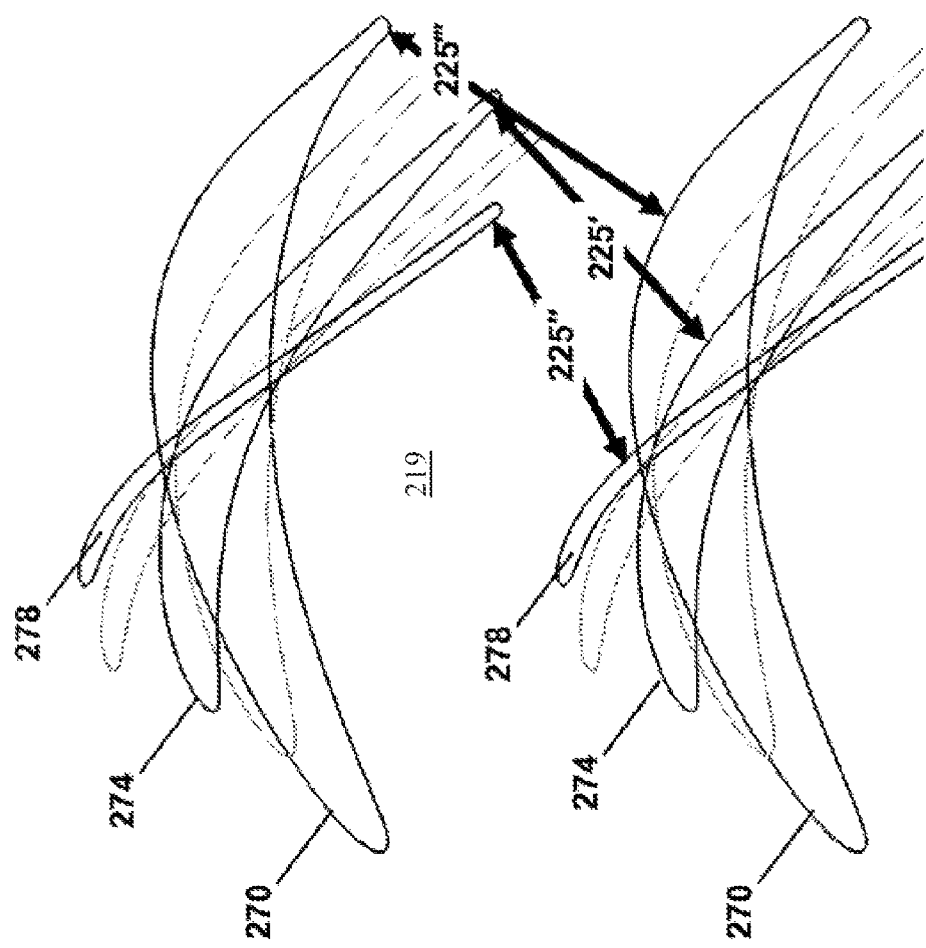
FIG. 3 shows a representation of a throat between a pair of adjacent blades employing an airfoil profile according to various embodiments of the disclosure disclosed herein, viewed from tips of the blades toward roots of the blades.
Figure 4:
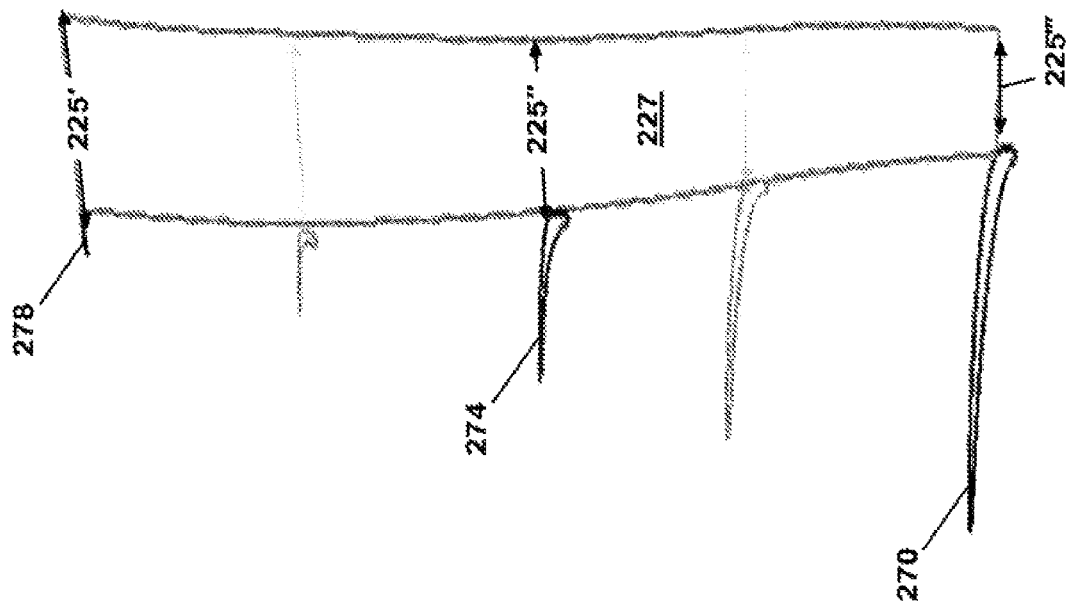
FIG. 4 shows a graphical representation of an imaginary surface of a throat according to embodiments of the disclosure.
Figure 5:
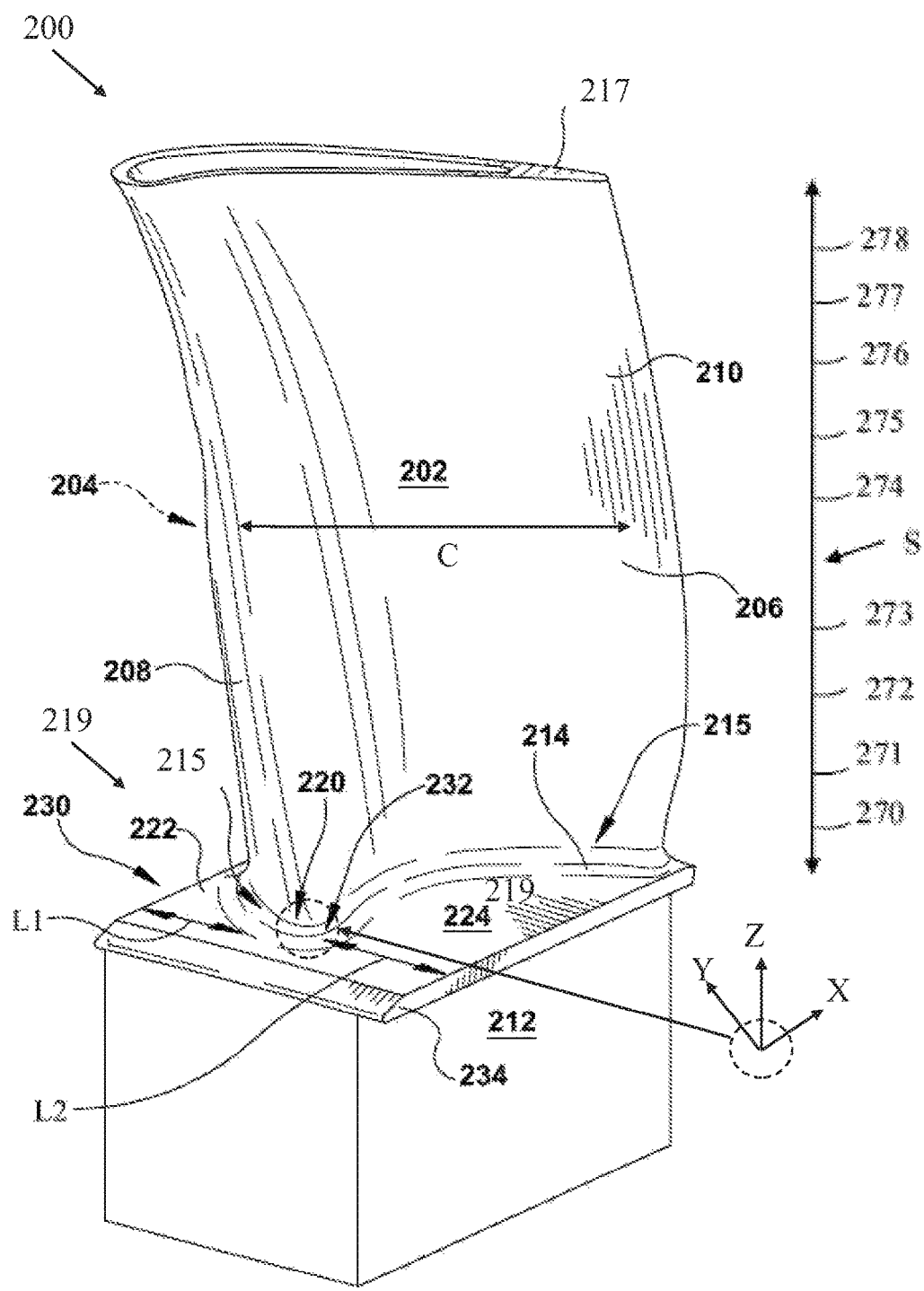
FIG. 5 shows a schematic three-dimensional depiction of a turbine blade according to various embodiments of the disclosure.

With particular reference to FIGS. 3, 4 and 5, each passage 219 between each pair of airfoils 202 can be regarded as bounded by pressure sidewall 206 of a first airfoil 202, suction sidewall 204 of a second airfoil 202 (not shown), and portions of a root 215 (FIG. 5) of each of the first and second blades 200. Passage 219 can span from root 215 to second end 217 of airfoil 202 between adjacent airfoils 202.

Passage 219 can have at least one minimum gap 225 between airfoils 202 along corresponding chord lines C at a point along spans S of airfoils 202. The combined minimum gaps 225 of all corresponding chord lines along spans S can define a throat of the pair of airfoils 202, which is an area that can be visualized as a virtual surface. In embodiments, every throat between a respective pair of airfoils of a stage of blades can be substantially identical, in part to avoid vibration that can be introduced by different flow rates in respective throats, which can damage a given stage of blades or even an entire turbine. Thus, the sum of the throats of a stage of blades 200 can be used to determine a total minimum area of the stage, which can be important to performance of and/or used to analyze and/or design a rotor wheel 18 and/or turbine 10.

In various embodiments, the throat distribution between airfoils 202 is defined by a distance of approximately 2.5 centimeters to approximately 5 centimeters (approximately 1-2 inches) between the trailing edge 210 of an airfoil 202 and (suction side 204 of) adjacent airfoil 202. In particular cases, this throat distribution can range from approximately 2.8 to approximately 4.3 centimeters (1.1 to 1.7 inches). This distance is illustrated as minimum gap 225. In various embodiments, this throat distribution is measured from trailing edge 210 of a first airfoil 202 to suction side 204 of the adjacent airfoil 202 at approximately 60-80% (and in particular cases, approximately 65-75%) of an axial span of the adjacent airfoil 202.

Where surfaces and edges of a pair of airfoils 202 extend substantially along respective radii of a respective rotor wheel 18, the throat can be determined by measuring minimum gap at a few points, such as near the inner endwall (base 212), midspan, and near the outer endwall 221, averaging the values measured, and multiplying the average by the span of the airfoils 202. The resulting minimum area between the airfoils can be visualized as a virtual surface of substantially a quadrilateral shape and substantially planar. However, airfoil 202 can be a high-performance airfoil as seen, for example, in FIG. 2, with a more complex shape and/or profile that can include curvature, twists, and other variations. As a result, a throat between two such more variable airfoils can be complex, as illustrated and/or visualized in FIGS. 3 and 4. In FIG. 3, two adjacent blades 200 employing twisted or otherwise variable airfoils are shown, viewed from tips 217 toward roots 215 (FIG. 5). As can be seen, the orientation and length of minimum gap 225 can vary, illustrated by minimum gap 225' at tips 217, minimum gap 225" at midspan, and minimum gap 225''' at roots 215. Thus, minimum gap 225 can define a throat as a complex area or virtual surface 227 shown in FIG. 4. Applying techniques used for simpler airfoils can therefore introduce error, such as up to 20%, which can be significant in design and analysis of a stage of blades 200 and turbine 10 as a whole. In addition, while typical inner and/or outer endwalls can be substantially uniform, inner and outer endwalls 212 (base), 221 can include contours, which can further complicate determination of the throat. Such more complex profiles and/or contours can produce more efficient flow in passage 219, as well provide additional space for cooling passages and/or support structures within parts of a blade.

In some cases, where airfoils 202 have complex profiles and/or contours as described according to various embodiments, determination of a throat 227 between pairs of high-performance airfoils 202 can be aided using a set of coordinates describing and/or defining the three-dimensional profile of each airfoil. For example, a unique set or loci of points in space can be provided, such as those listed in TABLE I, below, and can meet stage requirements for manufacture and performance. The loci of points can be arrived at by iteration between aerodynamic, thermal, and mechanical loadings enabling operation in an efficient, safe, and smooth manner. The loci, as embodied by the disclosure, can define the blade airfoil profile for airfoil 202 and can comprise a set of points relative to any suitable frame of reference and/or origin, such as the axis of rotation of turbine 10, a coordinate system of turbine 10, and/or an origin located at a desired and/or suitable point of the airfoil and/or base and/or any other suitable component.

With reference to FIG. 5 (and continuing reference to FIGS. 2-4), a plurality of points 270-278 along span S, including root 215 and tip 217, can correspond to Z coordinate values of chord lines, and a cross section of airfoil 202 at each point can be described by a respective set of X and Y coordinates. For example, 100 points can be listed for each cross section 270-278, though it should be apparent that more or fewer points can be used for each cross section, and more or fewer cross sections can be used, as may be desired and/or appropriate. The X, Y, and Z coordinate values in TABLE I have been expressed in normalized or non-dimensionalized form in values of from 0 to 1, but it should be apparent that any or all of the coordinate values could instead be expressed in distance units so long as the proportions are maintained. To convert an X, Y or Z value of TABLE I to a respective X, Y or Z coordinate value in units of distance, such as inches or meters, the non-dimensional X, Y or Z value given in TABLE I can be multiplied by an airfoil height of airfoil 202 in such units of distance. By connecting the X and Y values with smooth continuing arcs, each profile cross section at each distance Z can be fixed, and the airfoil profiles of the various surface locations between the distances Z can be determined by smoothly connecting adjacent profile sections to one another, thus forming the airfoil profile.

The values in TABLE I are generated and shown to four decimal places for determining the profile of a nominal airfoil 202 at ambient, non-operating, or non-hot conditions, and do not take any coatings or fillets into account, though embodiments could account for other conditions, coatings, and/or fillets. To allow for typical manufacturing tolerances and/or coating thicknesses, ± values can be added to the values listed in TABLE I, particularly to the X and Y values therein. For example, a tolerance of about 10-20 percent of a thickness of the trailing edge in a direction normal to any surface location along the airfoil profile can define an airfoil profile envelope for a blade airfoil design at cold or room temperature. In other words, a distance of about 10-20 percent of a thickness of the trailing edge in a direction normal to any surface location along the airfoil profile can define a range of variation between measured points on an actual airfoil surface and ideal positions of those points, particularly at a cold or room temperature, as embodied by the invention. The blade airfoil design, as embodied by the invention, is robust to this range of variation without impairment of mechanical and aerodynamic functions. Likewise, the profile and/or design can be scaled up or down, such as geometrically, without impairment of operation, and such scaling can be facilitated by use of normalized coordinate values, i.e. multiplying the normalized values by a scaling factor, or a larger or smaller number of distance units than might have originally been used. For example, the values in TABLE I, particularly the X and Y values, could be multiplied by a scaling factor of 2, 0.5, or any other desired scaling factor. In various embodiments, the X, Y, and Z distances are scalable as a function of the same constant or number to provide a scaled up or scaled down airfoil. Alternatively, the values could be multiplied by a larger or smaller desired span. As referenced herein, the origin of the X, Y, Z coordinate system is the root of the leading edge (junction 232) of the airfoil 202.

TABLE 1

| | Non-Dimensionalized (X Y Z/Span Height) | | | |
|---|---|---|---|---|
| N | Location | X | Y | Z |
| 1 | Suction side | −0.00454 | 0.01907 | 0.00000 |
| 2 | Suction side | −0.00389 | 0.00913 | 0.00000 |
| 3 | Suction side | −0.00298 | 0.02893 | 0.00000 |
| 4 | Suction side | 0.00000 | 0.03846 | 0.00000 |
| 5 | Suction side | 0.00000 | 0.00000 | 0.00000 |
| 6 | Suction side | 0.00385 | 0.04765 | 0.00000 |
| 7 | Suction side | 0.00841 | 0.05656 | 0.00000 |
| 8 | Suction side | 0.01345 | 0.06517 | 0.00000 |
| 9 | Suction side | 0.01889 | 0.07355 | 0.00000 |
| 10 | Suction side | 0.02467 | 0.08170 | 0.00000 |
| 11 | Suction side | 0.03075 | 0.08962 | 0.00000 |
| 12 | Suction side | 0.03708 | 0.09734 | 0.00000 |
| 13 | Suction side | 0.04366 | 0.10486 | 0.00000 |
| 14 | Suction side | 0.05045 | 0.11219 | 0.00000 |
| 15 | Suction side | 0.05744 | 0.11932 | 0.00000 |
| 16 | Suction side | 0.06462 | 0.12627 | 0.00000 |
| 17 | Suction side | 0.07199 | 0.13303 | 0.00000 |
| 18 | Suction side | 0.07952 | 0.13958 | 0.00000 |
| 19 | Suction side | 0.08724 | 0.14591 | 0.00000 |
| 20 | Suction side | 0.09513 | 0.15206 | 0.00000 |
| 21 | Suction side | 0.10318 | 0.15796 | 0.00000 |
| 22 | Suction side | 0.11140 | 0.16363 | 0.00000 |
| 23 | Suction side | 0.11978 | 0.16906 | 0.00000 |
| 24 | Suction side | 0.12833 | 0.17424 | 0.00000 |
| 25 | Suction side | 0.13703 | 0.17914 | 0.00000 |
| 26 | Suction side | 0.14590 | 0.18374 | 0.00000 |
| 27 | Suction side | 0.15492 | 0.18804 | 0.00000 |
| 28 | Suction side | 0.16408 | 0.19201 | 0.00000 |
| 29 | Suction side | 0.17339 | 0.19564 | 0.00000 |
| 30 | Suction side | 0.18283 | 0.19888 | 0.00000 |
| 31 | Suction side | 0.19241 | 0.20175 | 0.00000 |
| 32 | Suction side | 0.20209 | 0.20419 | 0.00000 |
| 33 | Suction side | 0.21187 | 0.20621 | 0.00000 |
| 34 | Suction side | 0.22174 | 0.20775 | 0.00000 |
| 35 | Suction side | 0.23167 | 0.20883 | 0.00000 |
| 36 | Suction side | 0.24164 | 0.20940 | 0.00000 |
| 37 | Suction side | 0.25163 | 0.20947 | 0.00000 |
| 38 | Suction side | 0.26161 | 0.20901 | 0.00000 |
| 39 | Suction side | 0.27155 | 0.20803 | 0.00000 |
| 40 | Suction side | 0.28142 | 0.20652 | 0.00000 |
| 41 | Suction side | 0.29120 | 0.20449 | 0.00000 |
| 42 | Suction side | 0.30087 | 0.20196 | 0.00000 |
| 43 | Suction side | 0.31038 | 0.19892 | 0.00000 |
| 44 | Suction side | 0.31973 | 0.19541 | 0.00000 |
| 45 | Suction side | 0.32889 | 0.19144 | 0.00000 |
| 46 | Suction side | 0.33786 | 0.18703 | 0.00000 |
| 47 | Suction side | 0.34660 | 0.18221 | 0.00000 |
| 48 | Suction side | 0.35512 | 0.17699 | 0.00000 |
| 49 | Suction side | 0.36342 | 0.17143 | 0.00000 |
| 50 | Suction side | 0.37148 | 0.16553 | 0.00000 |
| 51 | Suction side | 0.37931 | 0.15932 | 0.00000 |
| 52 | Suction side | 0.38689 | 0.15283 | 0.00000 |
| 53 | Suction side | 0.39426 | 0.14608 | 0.00000 |
| 54 | Suction side | 0.40139 | 0.13908 | 0.00000 |
| 55 | Suction side | 0.40831 | 0.13188 | 0.00000 |
| 56 | Suction side | 0.41502 | 0.12448 | 0.00000 |
| 57 | Suction side | 0.42152 | 0.11690 | 0.00000 |
| 58 | Suction side | 0.42783 | 0.10915 | 0.00000 |
| 59 | Suction side | 0.43395 | 0.10125 | 0.00000 |
| 60 | Suction side | 0.43989 | 0.09322 | 0.00000 |
| 61 | Suction side | 0.44565 | 0.08505 | 0.00000 |
| 62 | Suction side | 0.45125 | 0.07679 | 0.00000 |
| 63 | Suction side | 0.45669 | 0.06841 | 0.00000 |
| 64 | Suction side | 0.46198 | 0.05994 | 0.00000 |
| 65 | Suction side | 0.46713 | 0.05138 | 0.00000 |
| 66 | Suction side | 0.47216 | 0.04274 | 0.00000 |
| 67 | Suction side | 0.47706 | 0.03404 | 0.00000 |
| 68 | Suction side | 0.48183 | 0.02526 | 0.00000 |
| 69 | Suction side | 0.48650 | 0.01644 | 0.00000 |
| 70 | Suction side | 0.49105 | 0.00754 | 0.00000 |
| 71 | Suction side | 0.49550 | −0.00140 | 0.00000 |
| 72 | Suction side | 0.49985 | −0.01039 | 0.00000 |
| 73 | Suction side | 0.50412 | −0.01943 | 0.00000 |
| 74 | Suction side | 0.50830 | −0.02850 | 0.00000 |
| 75 | Suction side | 0.51240 | −0.03760 | 0.00000 |
| 76 | Suction side | 0.51642 | −0.04675 | 0.00000 |
| 77 | Suction side | 0.52036 | −0.05594 | 0.00000 |
| 78 | Suction side | 0.52424 | −0.06513 | 0.00000 |
| 79 | Suction side | 0.52806 | −0.07437 | 0.00000 |
| 80 | Suction side | 0.53181 | −0.08363 | 0.00000 |
| 81 | Suction side | 0.53551 | −0.09290 | 0.00000 |
| 82 | Suction side | 0.53915 | −0.10220 | 0.00000 |
| 83 | Suction side | 0.54275 | −0.11153 | 0.00000 |
| 84 | Suction side | 0.54630 | −0.12086 | 0.00000 |
| 85 | Suction side | 0.54980 | −0.13023 | 0.00000 |
| 86 | Suction side | 0.55324 | −0.13959 | 0.00000 |
| 87 | Suction side | 0.55667 | −0.14898 | 0.00000 |
| 88 | Suction side | 0.56005 | −0.15838 | 0.00000 |
| 89 | Suction side | 0.56340 | −0.16779 | 0.00000 |
| 90 | Suction side | 0.56670 | −0.17722 | 0.00000 |
| 91 | Suction side | 0.56999 | −0.18666 | 0.00000 |
| 92 | Suction side | 0.57324 | −0.19610 | 0.00000 |
| 93 | Suction side | 0.57647 | −0.20555 | 0.00000 |
| 94 | Suction side | 0.57968 | −0.21501 | 0.00000 |
| 95 | Suction side | 0.58286 | −0.22448 | 0.00000 |
| 96 | Suction side | 0.58603 | −0.23396 | 0.00000 |
| 97 | Suction side | 0.58617 | −0.25586 | 0.00000 |
| 98 | Suction side | 0.58877 | −0.25222 | 0.00000 |
| 99 | Suction side | 0.58917 | −0.24343 | 0.00000 |
| 100 | Suction side | 0.58982 | −0.24787 | 0.00000 |
| 101 | Pressure side | 0.00551 | −0.00499 | 0.00000 |
| 102 | Pressure side | 0.01238 | −0.00791 | 0.00000 |

TABLE 1-continued

Non-Dimensionalized (X Y Z/Span Height)

| N | Location | X | Y | Z |
|---|---|---|---|---|
| 103 | Pressure side | 0.01976 | −0.00907 | 0.00000 |
| 104 | Pressure side | 0.02725 | −0.00911 | 0.00000 |
| 105 | Pressure side | 0.03469 | −0.00842 | 0.00000 |
| 106 | Pressure side | 0.04208 | −0.00724 | 0.00000 |
| 107 | Pressure side | 0.04941 | −0.00567 | 0.00000 |
| 108 | Pressure side | 0.05667 | −0.00385 | 0.00000 |
| 109 | Pressure side | 0.06387 | −0.00184 | 0.00000 |
| 110 | Pressure side | 0.07105 | 0.00031 | 0.00000 |
| 111 | Pressure side | 0.07818 | 0.00257 | 0.00000 |
| 112 | Pressure side | 0.08530 | 0.00490 | 0.00000 |
| 113 | Pressure side | 0.09239 | 0.00729 | 0.00000 |
| 114 | Pressure side | 0.09948 | 0.00971 | 0.00000 |
| 115 | Pressure side | 0.10655 | 0.01214 | 0.00000 |
| 116 | Pressure side | 0.11364 | 0.01455 | 0.00000 |
| 117 | Pressure side | 0.12074 | 0.01696 | 0.00000 |
| 118 | Pressure side | 0.12784 | 0.01931 | 0.00000 |
| 119 | Pressure side | 0.13496 | 0.02161 | 0.00000 |
| 120 | Pressure side | 0.14210 | 0.02385 | 0.00000 |
| 121 | Pressure side | 0.14927 | 0.02601 | 0.00000 |
| 122 | Pressure side | 0.15646 | 0.02809 | 0.00000 |
| 123 | Pressure side | 0.16368 | 0.03006 | 0.00000 |
| 124 | Pressure side | 0.17093 | 0.03192 | 0.00000 |
| 125 | Pressure side | 0.17821 | 0.03365 | 0.00000 |
| 126 | Pressure side | 0.18553 | 0.03525 | 0.00000 |
| 127 | Pressure side | 0.19287 | 0.03670 | 0.00000 |
| 128 | Pressure side | 0.20024 | 0.03800 | 0.00000 |
| 129 | Pressure side | 0.20765 | 0.03913 | 0.00000 |
| 130 | Pressure side | 0.21506 | 0.04010 | 0.00000 |
| 131 | Pressure side | 0.22251 | 0.04087 | 0.00000 |
| 132 | Pressure side | 0.22997 | 0.04147 | 0.00000 |
| 133 | Pressure side | 0.23745 | 0.04185 | 0.00000 |
| 134 | Pressure side | 0.24493 | 0.04204 | 0.00000 |
| 135 | Pressure side | 0.25241 | 0.04203 | 0.00000 |
| 136 | Pressure side | 0.25989 | 0.04180 | 0.00000 |
| 137 | Pressure side | 0.26737 | 0.04134 | 0.00000 |
| 138 | Pressure side | 0.27483 | 0.04067 | 0.00000 |
| 139 | Pressure side | 0.28226 | 0.03978 | 0.00000 |
| 140 | Pressure side | 0.28966 | 0.03866 | 0.00000 |
| 141 | Pressure side | 0.29701 | 0.03731 | 0.00000 |
| 142 | Pressure side | 0.30434 | 0.03573 | 0.00000 |
| 143 | Pressure side | 0.31161 | 0.03394 | 0.00000 |
| 144 | Pressure side | 0.31882 | 0.03192 | 0.00000 |
| 145 | Pressure side | 0.32596 | 0.02967 | 0.00000 |
| 146 | Pressure side | 0.33303 | 0.02721 | 0.00000 |
| 147 | Pressure side | 0.34001 | 0.02453 | 0.00000 |
| 148 | Pressure side | 0.34692 | 0.02164 | 0.00000 |
| 149 | Pressure side | 0.35374 | 0.01855 | 0.00000 |
| 150 | Pressure side | 0.36045 | 0.01525 | 0.00000 |
| 151 | Pressure side | 0.36707 | 0.01175 | 0.00000 |
| 152 | Pressure side | 0.37360 | 0.00808 | 0.00000 |
| 153 | Pressure side | 0.37999 | 0.00420 | 0.00000 |
| 154 | Pressure side | 0.38629 | 0.00015 | 0.00000 |
| 155 | Pressure side | 0.39247 | −0.00407 | 0.00000 |
| 156 | Pressure side | 0.39854 | −0.00846 | 0.00000 |
| 157 | Pressure side | 0.40448 | −0.01300 | 0.00000 |
| 158 | Pressure side | 0.41031 | −0.01770 | 0.00000 |
| 159 | Pressure side | 0.41602 | −0.02254 | 0.00000 |
| 160 | Pressure side | 0.42161 | −0.02753 | 0.00000 |
| 161 | Pressure side | 0.42708 | −0.03264 | 0.00000 |
| 162 | Pressure side | 0.43242 | −0.03788 | 0.00000 |
| 163 | Pressure side | 0.43765 | −0.04324 | 0.00000 |
| 164 | Pressure side | 0.44276 | −0.04871 | 0.00000 |
| 165 | Pressure side | 0.44776 | −0.05428 | 0.00000 |
| 166 | Pressure side | 0.45265 | −0.05994 | 0.00000 |
| 167 | Pressure side | 0.45743 | −0.06570 | 0.00000 |
| 168 | Pressure side | 0.46210 | −0.07156 | 0.00000 |
| 169 | Pressure side | 0.46668 | −0.07748 | 0.00000 |
| 170 | Pressure side | 0.47115 | −0.08348 | 0.00000 |
| 171 | Pressure side | 0.47553 | −0.08954 | 0.00000 |
| 172 | Pressure side | 0.47982 | −0.09569 | 0.00000 |
| 173 | Pressure side | 0.48403 | −0.10188 | 0.00000 |
| 174 | Pressure side | 0.48815 | −0.10813 | 0.00000 |
| 175 | Pressure side | 0.49220 | −0.11443 | 0.00000 |
| 176 | Pressure side | 0.49616 | −0.12077 | 0.00000 |
| 177 | Pressure side | 0.50007 | −0.12716 | 0.00000 |
| 178 | Pressure side | 0.50391 | −0.13359 | 0.00000 |
| 179 | Pressure side | 0.50769 | −0.14003 | 0.00000 |
| 180 | Pressure side | 0.51143 | −0.14652 | 0.00000 |
| 181 | Pressure side | 0.51511 | −0.15305 | 0.00000 |
| 182 | Pressure side | 0.51874 | −0.15959 | 0.00000 |
| 183 | Pressure side | 0.52234 | −0.16615 | 0.00000 |
| 184 | Pressure side | 0.52592 | −0.17273 | 0.00000 |
| 185 | Pressure side | 0.52944 | −0.17933 | 0.00000 |
| 186 | Pressure side | 0.53295 | −0.18595 | 0.00000 |
| 187 | Pressure side | 0.53643 | −0.19257 | 0.00000 |
| 188 | Pressure side | 0.53989 | −0.19921 | 0.00000 |
| 189 | Pressure side | 0.54333 | −0.20587 | 0.00000 |
| 190 | Pressure side | 0.54676 | −0.21252 | 0.00000 |
| 191 | Pressure side | 0.55015 | −0.21919 | 0.00000 |
| 192 | Pressure side | 0.55355 | −0.22585 | 0.00000 |
| 193 | Pressure side | 0.55695 | −0.23253 | 0.00000 |
| 194 | Pressure side | 0.56032 | −0.23921 | 0.00000 |
| 195 | Pressure side | 0.56370 | −0.24589 | 0.00000 |
| 196 | Pressure side | 0.56707 | −0.25258 | 0.00000 |
| 197 | Pressure side | 0.56976 | −0.25618 | 0.00000 |
| 198 | Pressure side | 0.57357 | −0.25853 | 0.00000 |
| 199 | Pressure side | 0.57801 | −0.25925 | 0.00000 |
| 200 | Pressure side | 0.58240 | −0.25829 | 0.00000 |
| 1 | Suction side | 0.01028 | 0.03449 | 0.10000 |
| 2 | Suction side | 0.01079 | 0.04447 | 0.10000 |
| 3 | Suction side | 0.01240 | 0.02476 | 0.10000 |
| 4 | Suction side | 0.01299 | 0.05423 | 0.10000 |
| 5 | Suction side | 0.01626 | 0.06368 | 0.10000 |
| 6 | Suction side | 0.01801 | 0.01656 | 0.10000 |
| 7 | Suction side | 0.02029 | 0.07284 | 0.10000 |
| 8 | Suction side | 0.02491 | 0.08172 | 0.10000 |
| 9 | Suction side | 0.02997 | 0.09035 | 0.10000 |
| 10 | Suction side | 0.03542 | 0.09875 | 0.10000 |
| 11 | Suction side | 0.04119 | 0.10692 | 0.10000 |
| 12 | Suction side | 0.04725 | 0.11490 | 0.10000 |
| 13 | Suction side | 0.05357 | 0.12266 | 0.10000 |
| 14 | Suction side | 0.06012 | 0.13021 | 0.10000 |
| 15 | Suction side | 0.06690 | 0.13758 | 0.10000 |
| 16 | Suction side | 0.07390 | 0.14474 | 0.10000 |
| 17 | Suction side | 0.08110 | 0.15169 | 0.10000 |
| 18 | Suction side | 0.08850 | 0.15843 | 0.10000 |
| 19 | Suction side | 0.09610 | 0.16494 | 0.10000 |
| 20 | Suction side | 0.10388 | 0.17124 | 0.10000 |
| 21 | Suction side | 0.11186 | 0.17728 | 0.10000 |
| 22 | Suction side | 0.12002 | 0.18307 | 0.10000 |
| 23 | Suction side | 0.12838 | 0.18858 | 0.10000 |
| 24 | Suction side | 0.13693 | 0.19379 | 0.10000 |
| 25 | Suction side | 0.14566 | 0.19868 | 0.10000 |
| 26 | Suction side | 0.15458 | 0.20323 | 0.10000 |
| 27 | Suction side | 0.16366 | 0.20742 | 0.10000 |
| 28 | Suction side | 0.17293 | 0.21120 | 0.10000 |
| 29 | Suction side | 0.18236 | 0.21456 | 0.10000 |
| 30 | Suction side | 0.19194 | 0.21744 | 0.10000 |
| 31 | Suction side | 0.20166 | 0.21985 | 0.10000 |
| 32 | Suction side | 0.21149 | 0.22172 | 0.10000 |
| 33 | Suction side | 0.22141 | 0.22303 | 0.10000 |
| 34 | Suction side | 0.23139 | 0.22378 | 0.10000 |
| 35 | Suction side | 0.24140 | 0.22394 | 0.10000 |
| 36 | Suction side | 0.25140 | 0.22351 | 0.10000 |
| 37 | Suction side | 0.26134 | 0.22248 | 0.10000 |
| 38 | Suction side | 0.27123 | 0.22087 | 0.10000 |
| 39 | Suction side | 0.28100 | 0.21869 | 0.10000 |
| 40 | Suction side | 0.29063 | 0.21597 | 0.10000 |
| 41 | Suction side | 0.30009 | 0.21274 | 0.10000 |
| 42 | Suction side | 0.30938 | 0.20900 | 0.10000 |
| 43 | Suction side | 0.31847 | 0.20481 | 0.10000 |
| 44 | Suction side | 0.32735 | 0.20021 | 0.10000 |
| 45 | Suction side | 0.33603 | 0.19521 | 0.10000 |
| 46 | Suction side | 0.34448 | 0.18985 | 0.10000 |
| 47 | Suction side | 0.35271 | 0.18415 | 0.10000 |
| 48 | Suction side | 0.36072 | 0.17816 | 0.10000 |
| 49 | Suction side | 0.36852 | 0.17188 | 0.10000 |
| 50 | Suction side | 0.37610 | 0.16535 | 0.10000 |
| 51 | Suction side | 0.38348 | 0.15860 | 0.10000 |
| 52 | Suction side | 0.39067 | 0.15161 | 0.10000 |
| 53 | Suction side | 0.39765 | 0.14445 | 0.10000 |
| 54 | Suction side | 0.40444 | 0.13710 | 0.10000 |

TABLE 1-continued

| Non-Dimensionalized (X Y Z/Span Height) | | | | |
|---|---|---|---|---|
| N | Location | X | Y | Z |
| 55 | Suction side | 0.41106 | 0.12959 | 0.10000 |
| 56 | Suction side | 0.41751 | 0.12193 | 0.10000 |
| 57 | Suction side | 0.42378 | 0.11413 | 0.10000 |
| 58 | Suction side | 0.42990 | 0.10621 | 0.10000 |
| 59 | Suction side | 0.43588 | 0.09818 | 0.10000 |
| 60 | Suction side | 0.44171 | 0.09004 | 0.10000 |
| 61 | Suction side | 0.44739 | 0.08181 | 0.10000 |
| 62 | Suction side | 0.45295 | 0.07348 | 0.10000 |
| 63 | Suction side | 0.45838 | 0.06507 | 0.10000 |
| 64 | Suction side | 0.46369 | 0.05660 | 0.10000 |
| 65 | Suction side | 0.46889 | 0.04804 | 0.10000 |
| 66 | Suction side | 0.47398 | 0.03942 | 0.10000 |
| 67 | Suction side | 0.47897 | 0.03073 | 0.10000 |
| 68 | Suction side | 0.48384 | 0.02199 | 0.10000 |
| 69 | Suction side | 0.48863 | 0.01322 | 0.10000 |
| 70 | Suction side | 0.49333 | 0.00438 | 0.10000 |
| 71 | Suction side | 0.49793 | −0.00452 | 0.10000 |
| 72 | Suction side | 0.50246 | −0.01345 | 0.10000 |
| 73 | Suction side | 0.50690 | −0.02241 | 0.10000 |
| 74 | Suction side | 0.51126 | −0.03142 | 0.10000 |
| 75 | Suction side | 0.51555 | −0.04047 | 0.10000 |
| 76 | Suction side | 0.51976 | −0.04955 | 0.10000 |
| 77 | Suction side | 0.52391 | −0.05866 | 0.10000 |
| 78 | Suction side | 0.52798 | −0.06779 | 0.10000 |
| 79 | Suction side | 0.53199 | −0.07696 | 0.10000 |
| 80 | Suction side | 0.53594 | −0.08616 | 0.10000 |
| 81 | Suction side | 0.53982 | −0.09538 | 0.10000 |
| 82 | Suction side | 0.54365 | −0.10463 | 0.10000 |
| 83 | Suction side | 0.54743 | −0.11391 | 0.10000 |
| 84 | Suction side | 0.55116 | −0.12319 | 0.10000 |
| 85 | Suction side | 0.55482 | −0.13250 | 0.10000 |
| 86 | Suction side | 0.55845 | −0.14184 | 0.10000 |
| 87 | Suction side | 0.56203 | −0.15119 | 0.10000 |
| 88 | Suction side | 0.56557 | −0.16055 | 0.10000 |
| 89 | Suction side | 0.56907 | −0.16993 | 0.10000 |
| 90 | Suction side | 0.57253 | −0.17932 | 0.10000 |
| 91 | Suction side | 0.57595 | −0.18872 | 0.10000 |
| 92 | Suction side | 0.57935 | −0.19815 | 0.10000 |
| 93 | Suction side | 0.58271 | −0.20757 | 0.10000 |
| 94 | Suction side | 0.58605 | −0.21700 | 0.10000 |
| 95 | Suction side | 0.58936 | −0.22645 | 0.10000 |
| 96 | Suction side | 0.59265 | −0.23590 | 0.10000 |
| 97 | Suction side | 0.59323 | −0.25759 | 0.10000 |
| 98 | Suction side | 0.59572 | −0.25398 | 0.10000 |
| 99 | Suction side | 0.59594 | −0.24535 | 0.10000 |
| 100 | Suction side | 0.59664 | −0.24969 | 0.10000 |
| 101 | Pressure side | 0.02403 | 0.01228 | 0.10000 |
| 102 | Pressure side | 0.03094 | 0.00962 | 0.10000 |
| 103 | Pressure side | 0.03825 | 0.00851 | 0.10000 |
| 104 | Pressure side | 0.04566 | 0.00860 | 0.10000 |
| 105 | Pressure side | 0.05301 | 0.00952 | 0.10000 |
| 106 | Pressure side | 0.06027 | 0.01099 | 0.10000 |
| 107 | Pressure side | 0.06745 | 0.01287 | 0.10000 |
| 108 | Pressure side | 0.07453 | 0.01504 | 0.10000 |
| 109 | Pressure side | 0.08157 | 0.01736 | 0.10000 |
| 110 | Pressure side | 0.08856 | 0.01983 | 0.10000 |
| 111 | Pressure side | 0.09554 | 0.02236 | 0.10000 |
| 112 | Pressure side | 0.10248 | 0.02495 | 0.10000 |
| 113 | Pressure side | 0.10943 | 0.02754 | 0.10000 |
| 114 | Pressure side | 0.11637 | 0.03014 | 0.10000 |
| 115 | Pressure side | 0.12332 | 0.03269 | 0.10000 |
| 116 | Pressure side | 0.13030 | 0.03521 | 0.10000 |
| 117 | Pressure side | 0.13730 | 0.03765 | 0.10000 |
| 118 | Pressure side | 0.14432 | 0.04002 | 0.10000 |
| 119 | Pressure side | 0.15138 | 0.04227 | 0.10000 |
| 120 | Pressure side | 0.15848 | 0.04441 | 0.10000 |
| 121 | Pressure side | 0.16562 | 0.04642 | 0.10000 |
| 122 | Pressure side | 0.17279 | 0.04829 | 0.10000 |
| 123 | Pressure side | 0.18000 | 0.04998 | 0.10000 |
| 124 | Pressure side | 0.18726 | 0.05151 | 0.10000 |
| 125 | Pressure side | 0.19455 | 0.05286 | 0.10000 |
| 126 | Pressure side | 0.20187 | 0.05400 | 0.10000 |
| 127 | Pressure side | 0.20923 | 0.05494 | 0.10000 |
| 128 | Pressure side | 0.21660 | 0.05567 | 0.10000 |
| 129 | Pressure side | 0.22399 | 0.05616 | 0.10000 |
| 130 | Pressure side | 0.23141 | 0.05643 | 0.10000 |
| 131 | Pressure side | 0.23881 | 0.05644 | 0.10000 |
| 132 | Pressure side | 0.24623 | 0.05623 | 0.10000 |
| 133 | Pressure side | 0.25362 | 0.05577 | 0.10000 |
| 134 | Pressure side | 0.26100 | 0.05507 | 0.10000 |
| 135 | Pressure side | 0.26835 | 0.05412 | 0.10000 |
| 136 | Pressure side | 0.27567 | 0.05293 | 0.10000 |
| 137 | Pressure side | 0.28294 | 0.05151 | 0.10000 |
| 138 | Pressure side | 0.29017 | 0.04987 | 0.10000 |
| 139 | Pressure side | 0.29735 | 0.04798 | 0.10000 |
| 140 | Pressure side | 0.30446 | 0.04589 | 0.10000 |
| 141 | Pressure side | 0.31150 | 0.04358 | 0.10000 |
| 142 | Pressure side | 0.31847 | 0.04106 | 0.10000 |
| 143 | Pressure side | 0.32537 | 0.03834 | 0.10000 |
| 144 | Pressure side | 0.33219 | 0.03543 | 0.10000 |
| 145 | Pressure side | 0.33892 | 0.03234 | 0.10000 |
| 146 | Pressure side | 0.34557 | 0.02906 | 0.10000 |
| 147 | Pressure side | 0.35212 | 0.02560 | 0.10000 |
| 148 | Pressure side | 0.35860 | 0.02198 | 0.10000 |
| 149 | Pressure side | 0.36497 | 0.01820 | 0.10000 |
| 150 | Pressure side | 0.37124 | 0.01426 | 0.10000 |
| 151 | Pressure side | 0.37744 | 0.01018 | 0.10000 |
| 152 | Pressure side | 0.38352 | 0.00595 | 0.10000 |
| 153 | Pressure side | 0.38951 | 0.00158 | 0.10000 |
| 154 | Pressure side | 0.39541 | −0.00291 | 0.10000 |
| 155 | Pressure side | 0.40120 | −0.00753 | 0.10000 |
| 156 | Pressure side | 0.40690 | −0.01228 | 0.10000 |
| 157 | Pressure side | 0.41250 | −0.01714 | 0.10000 |
| 158 | Pressure side | 0.41801 | −0.02210 | 0.10000 |
| 159 | Pressure side | 0.42340 | −0.02717 | 0.10000 |
| 160 | Pressure side | 0.42872 | −0.03235 | 0.10000 |
| 161 | Pressure side | 0.43393 | −0.03762 | 0.10000 |
| 162 | Pressure side | 0.43905 | −0.04298 | 0.10000 |
| 163 | Pressure side | 0.44407 | −0.04843 | 0.10000 |
| 164 | Pressure side | 0.44901 | −0.05396 | 0.10000 |
| 165 | Pressure side | 0.45384 | −0.05957 | 0.10000 |
| 166 | Pressure side | 0.45860 | −0.06526 | 0.10000 |
| 167 | Pressure side | 0.46327 | −0.07102 | 0.10000 |
| 168 | Pressure side | 0.46786 | −0.07684 | 0.10000 |
| 169 | Pressure side | 0.47236 | −0.08273 | 0.10000 |
| 170 | Pressure side | 0.47680 | −0.08867 | 0.10000 |
| 171 | Pressure side | 0.48115 | −0.09466 | 0.10000 |
| 172 | Pressure side | 0.48544 | −0.10071 | 0.10000 |
| 173 | Pressure side | 0.48966 | −0.10681 | 0.10000 |
| 174 | Pressure side | 0.49381 | −0.11295 | 0.10000 |
| 175 | Pressure side | 0.49791 | −0.11913 | 0.10000 |
| 176 | Pressure side | 0.50194 | −0.12535 | 0.10000 |
| 177 | Pressure side | 0.50591 | −0.13161 | 0.10000 |
| 178 | Pressure side | 0.50983 | −0.13790 | 0.10000 |
| 179 | Pressure side | 0.51369 | −0.14422 | 0.10000 |
| 180 | Pressure side | 0.51752 | −0.15058 | 0.10000 |
| 181 | Pressure side | 0.52130 | −0.15695 | 0.10000 |
| 182 | Pressure side | 0.52503 | −0.16335 | 0.10000 |
| 183 | Pressure side | 0.52873 | −0.16978 | 0.10000 |
| 184 | Pressure side | 0.53239 | −0.17623 | 0.10000 |
| 185 | Pressure side | 0.53603 | −0.18269 | 0.10000 |
| 186 | Pressure side | 0.53963 | −0.18916 | 0.10000 |
| 187 | Pressure side | 0.54321 | −0.19565 | 0.10000 |
| 188 | Pressure side | 0.54677 | −0.20215 | 0.10000 |
| 189 | Pressure side | 0.55029 | −0.20868 | 0.10000 |
| 190 | Pressure side | 0.55382 | −0.21520 | 0.10000 |
| 191 | Pressure side | 0.55730 | −0.22174 | 0.10000 |
| 192 | Pressure side | 0.56078 | −0.22829 | 0.10000 |
| 193 | Pressure side | 0.56424 | −0.23485 | 0.10000 |
| 194 | Pressure side | 0.56768 | −0.24141 | 0.10000 |
| 195 | Pressure side | 0.57112 | −0.24797 | 0.10000 |
| 196 | Pressure side | 0.57454 | −0.25455 | 0.10000 |
| 197 | Pressure side | 0.57721 | −0.25805 | 0.10000 |
| 198 | Pressure side | 0.58096 | −0.26033 | 0.10000 |
| 199 | Pressure side | 0.58529 | −0.26100 | 0.10000 |
| 200 | Pressure side | 0.58958 | −0.26003 | 0.10000 |
| 1 | Suction side | 0.02182 | 0.05968 | 0.20000 |
| 2 | Suction side | 0.02216 | 0.04966 | 0.20000 |
| 3 | Suction side | 0.02331 | 0.06958 | 0.20000 |
| 4 | Suction side | 0.02535 | 0.04021 | 0.20000 |
| 5 | Suction side | 0.02601 | 0.07924 | 0.20000 |
| 6 | Suction side | 0.02955 | 0.08862 | 0.20000 |

TABLE 1-continued

Non-Dimensionalized (X Y Z/Span Height)

| N | Location | X | Y | Z |
|---|---|---|---|---|
| 7 | Suction side | 0.03198 | 0.03281 | 0.20000 |
| 8 | Suction side | 0.03371 | 0.09775 | 0.20000 |
| 9 | Suction side | 0.03838 | 0.10663 | 0.20000 |
| 10 | Suction side | 0.04347 | 0.11527 | 0.20000 |
| 11 | Suction side | 0.04893 | 0.12368 | 0.20000 |
| 12 | Suction side | 0.05471 | 0.13188 | 0.20000 |
| 13 | Suction side | 0.06081 | 0.13984 | 0.20000 |
| 14 | Suction side | 0.06716 | 0.14762 | 0.20000 |
| 15 | Suction side | 0.07377 | 0.15515 | 0.20000 |
| 16 | Suction side | 0.08063 | 0.16248 | 0.20000 |
| 17 | Suction side | 0.08773 | 0.16957 | 0.20000 |
| 18 | Suction side | 0.09504 | 0.17642 | 0.20000 |
| 19 | Suction side | 0.10260 | 0.18303 | 0.20000 |
| 20 | Suction side | 0.11037 | 0.18937 | 0.20000 |
| 21 | Suction side | 0.11836 | 0.19544 | 0.20000 |
| 22 | Suction side | 0.12656 | 0.20120 | 0.20000 |
| 23 | Suction side | 0.13498 | 0.20666 | 0.20000 |
| 24 | Suction side | 0.14361 | 0.21177 | 0.20000 |
| 25 | Suction side | 0.15245 | 0.21650 | 0.20000 |
| 26 | Suction side | 0.16150 | 0.22085 | 0.20000 |
| 27 | Suction side | 0.17073 | 0.22476 | 0.20000 |
| 28 | Suction side | 0.18014 | 0.22821 | 0.20000 |
| 29 | Suction side | 0.18974 | 0.23114 | 0.20000 |
| 30 | Suction side | 0.19948 | 0.23355 | 0.20000 |
| 31 | Suction side | 0.20934 | 0.23537 | 0.20000 |
| 32 | Suction side | 0.21930 | 0.23659 | 0.20000 |
| 33 | Suction side | 0.22931 | 0.23717 | 0.20000 |
| 34 | Suction side | 0.23934 | 0.23712 | 0.20000 |
| 35 | Suction side | 0.24935 | 0.23642 | 0.20000 |
| 36 | Suction side | 0.25928 | 0.23507 | 0.20000 |
| 37 | Suction side | 0.26912 | 0.23310 | 0.20000 |
| 38 | Suction side | 0.27881 | 0.23052 | 0.20000 |
| 39 | Suction side | 0.28834 | 0.22738 | 0.20000 |
| 40 | Suction side | 0.29766 | 0.22371 | 0.20000 |
| 41 | Suction side | 0.30680 | 0.21956 | 0.20000 |
| 42 | Suction side | 0.31570 | 0.21494 | 0.20000 |
| 43 | Suction side | 0.32439 | 0.20993 | 0.20000 |
| 44 | Suction side | 0.33285 | 0.20454 | 0.20000 |
| 45 | Suction side | 0.34109 | 0.19882 | 0.20000 |
| 46 | Suction side | 0.34912 | 0.19280 | 0.20000 |
| 47 | Suction side | 0.35693 | 0.18652 | 0.20000 |
| 48 | Suction side | 0.36454 | 0.17998 | 0.20000 |
| 49 | Suction side | 0.37195 | 0.17322 | 0.20000 |
| 50 | Suction side | 0.37918 | 0.16627 | 0.20000 |
| 51 | Suction side | 0.38623 | 0.15912 | 0.20000 |
| 52 | Suction side | 0.39310 | 0.15181 | 0.20000 |
| 53 | Suction side | 0.39981 | 0.14436 | 0.20000 |
| 54 | Suction side | 0.40637 | 0.13677 | 0.20000 |
| 55 | Suction side | 0.41278 | 0.12904 | 0.20000 |
| 56 | Suction side | 0.41904 | 0.12122 | 0.20000 |
| 57 | Suction side | 0.42517 | 0.11327 | 0.20000 |
| 58 | Suction side | 0.43117 | 0.10524 | 0.20000 |
| 59 | Suction side | 0.43706 | 0.09711 | 0.20000 |
| 60 | Suction side | 0.44282 | 0.08890 | 0.20000 |
| 61 | Suction side | 0.44847 | 0.08061 | 0.20000 |
| 62 | Suction side | 0.45402 | 0.07226 | 0.20000 |
| 63 | Suction side | 0.45945 | 0.06382 | 0.20000 |
| 64 | Suction side | 0.46479 | 0.05534 | 0.20000 |
| 65 | Suction side | 0.47004 | 0.04678 | 0.20000 |
| 66 | Suction side | 0.47519 | 0.03818 | 0.20000 |
| 67 | Suction side | 0.48025 | 0.02951 | 0.20000 |
| 68 | Suction side | 0.48524 | 0.02081 | 0.20000 |
| 69 | Suction side | 0.49013 | 0.01206 | 0.20000 |
| 70 | Suction side | 0.49496 | 0.00326 | 0.20000 |
| 71 | Suction side | 0.49970 | −0.00558 | 0.20000 |
| 72 | Suction side | 0.50437 | −0.01446 | 0.20000 |
| 73 | Suction side | 0.50896 | −0.02338 | 0.20000 |
| 74 | Suction side | 0.51349 | −0.03234 | 0.20000 |
| 75 | Suction side | 0.51794 | −0.04132 | 0.20000 |
| 76 | Suction side | 0.52233 | −0.05034 | 0.20000 |
| 77 | Suction side | 0.52664 | −0.05940 | 0.20000 |
| 78 | Suction side | 0.53089 | −0.06848 | 0.20000 |
| 79 | Suction side | 0.53509 | −0.07760 | 0.20000 |
| 80 | Suction side | 0.53921 | −0.08675 | 0.20000 |
| 81 | Suction side | 0.54328 | −0.09591 | 0.20000 |
| 82 | Suction side | 0.54728 | −0.10510 | 0.20000 |
| 83 | Suction side | 0.55123 | −0.11433 | 0.20000 |
| 84 | Suction side | 0.55513 | −0.12357 | 0.20000 |
| 85 | Suction side | 0.55896 | −0.13285 | 0.20000 |
| 86 | Suction side | 0.56275 | −0.14213 | 0.20000 |
| 87 | Suction side | 0.56649 | −0.15145 | 0.20000 |
| 88 | Suction side | 0.57018 | −0.16077 | 0.20000 |
| 89 | Suction side | 0.57381 | −0.17012 | 0.20000 |
| 90 | Suction side | 0.57743 | −0.17948 | 0.20000 |
| 91 | Suction side | 0.58099 | −0.18886 | 0.20000 |
| 92 | Suction side | 0.58453 | −0.19825 | 0.20000 |
| 93 | Suction side | 0.58802 | −0.20765 | 0.20000 |
| 94 | Suction side | 0.59150 | −0.21705 | 0.20000 |
| 95 | Suction side | 0.59494 | −0.22648 | 0.20000 |
| 96 | Suction side | 0.59837 | −0.23590 | 0.20000 |
| 97 | Suction side | 0.59936 | −0.25739 | 0.20000 |
| 98 | Suction side | 0.60171 | −0.25379 | 0.20000 |
| 99 | Suction side | 0.60178 | −0.24534 | 0.20000 |
| 100 | Suction side | 0.60253 | −0.24958 | 0.20000 |
| 101 | Pressure side | 0.03835 | 0.02909 | 0.20000 |
| 102 | Pressure side | 0.04526 | 0.02654 | 0.20000 |
| 103 | Pressure side | 0.05254 | 0.02537 | 0.20000 |
| 104 | Pressure side | 0.05990 | 0.02544 | 0.20000 |
| 105 | Pressure side | 0.06721 | 0.02643 | 0.20000 |
| 106 | Pressure side | 0.07439 | 0.02810 | 0.20000 |
| 107 | Pressure side | 0.08145 | 0.03021 | 0.20000 |
| 108 | Pressure side | 0.08842 | 0.03263 | 0.20000 |
| 109 | Pressure side | 0.09532 | 0.03525 | 0.20000 |
| 110 | Pressure side | 0.10218 | 0.03797 | 0.20000 |
| 111 | Pressure side | 0.10901 | 0.04076 | 0.20000 |
| 112 | Pressure side | 0.11584 | 0.04356 | 0.20000 |
| 113 | Pressure side | 0.12267 | 0.04633 | 0.20000 |
| 114 | Pressure side | 0.12953 | 0.04907 | 0.20000 |
| 115 | Pressure side | 0.13641 | 0.05171 | 0.20000 |
| 116 | Pressure side | 0.14333 | 0.05427 | 0.20000 |
| 117 | Pressure side | 0.15029 | 0.05670 | 0.20000 |
| 118 | Pressure side | 0.15730 | 0.05900 | 0.20000 |
| 119 | Pressure side | 0.16436 | 0.06114 | 0.20000 |
| 120 | Pressure side | 0.17147 | 0.06311 | 0.20000 |
| 121 | Pressure side | 0.17863 | 0.06489 | 0.20000 |
| 122 | Pressure side | 0.18583 | 0.06648 | 0.20000 |
| 123 | Pressure side | 0.19308 | 0.06784 | 0.20000 |
| 124 | Pressure side | 0.20037 | 0.06897 | 0.20000 |
| 125 | Pressure side | 0.20770 | 0.06988 | 0.20000 |
| 126 | Pressure side | 0.21504 | 0.07053 | 0.20000 |
| 127 | Pressure side | 0.22240 | 0.07091 | 0.20000 |
| 128 | Pressure side | 0.22978 | 0.07104 | 0.20000 |
| 129 | Pressure side | 0.23716 | 0.07090 | 0.20000 |
| 130 | Pressure side | 0.24453 | 0.07049 | 0.20000 |
| 131 | Pressure side | 0.25187 | 0.06980 | 0.20000 |
| 132 | Pressure side | 0.25918 | 0.06885 | 0.20000 |
| 133 | Pressure side | 0.26646 | 0.06764 | 0.20000 |
| 134 | Pressure side | 0.27368 | 0.06615 | 0.20000 |
| 135 | Pressure side | 0.28086 | 0.06442 | 0.20000 |
| 136 | Pressure side | 0.28796 | 0.06245 | 0.20000 |
| 137 | Pressure side | 0.29500 | 0.06023 | 0.20000 |
| 138 | Pressure side | 0.30196 | 0.05781 | 0.20000 |
| 139 | Pressure side | 0.30885 | 0.05515 | 0.20000 |
| 140 | Pressure side | 0.31565 | 0.05230 | 0.20000 |
| 141 | Pressure side | 0.32237 | 0.04924 | 0.20000 |
| 142 | Pressure side | 0.32900 | 0.04601 | 0.20000 |
| 143 | Pressure side | 0.33555 | 0.04262 | 0.20000 |
| 144 | Pressure side | 0.34200 | 0.03904 | 0.20000 |
| 145 | Pressure side | 0.34837 | 0.03531 | 0.20000 |
| 146 | Pressure side | 0.35464 | 0.03145 | 0.20000 |
| 147 | Pressure side | 0.36084 | 0.02743 | 0.20000 |
| 148 | Pressure side | 0.36693 | 0.02329 | 0.20000 |
| 149 | Pressure side | 0.37295 | 0.01902 | 0.20000 |
| 150 | Pressure side | 0.37888 | 0.01463 | 0.20000 |
| 151 | Pressure side | 0.38473 | 0.01013 | 0.20000 |
| 152 | Pressure side | 0.39049 | 0.00552 | 0.20000 |
| 153 | Pressure side | 0.39616 | 0.00081 | 0.20000 |
| 154 | Pressure side | 0.40176 | −0.00399 | 0.20000 |
| 155 | Pressure side | 0.40728 | −0.00889 | 0.20000 |
| 156 | Pressure side | 0.41271 | −0.01388 | 0.20000 |
| 157 | Pressure side | 0.41807 | −0.01894 | 0.20000 |
| 158 | Pressure side | 0.42335 | −0.02409 | 0.20000 |

TABLE 1-continued

Non-Dimensionalized (X Y Z/Span Height)

| N | Location | X | Y | Z |
|---|---|---|---|---|
| 159 | Pressure side | 0.42856 | −0.02932 | 0.20000 |
| 160 | Pressure side | 0.43369 | −0.03463 | 0.20000 |
| 161 | Pressure side | 0.43874 | −0.04000 | 0.20000 |
| 162 | Pressure side | 0.44373 | −0.04544 | 0.20000 |
| 163 | Pressure side | 0.44863 | −0.05095 | 0.20000 |
| 164 | Pressure side | 0.45347 | −0.05652 | 0.20000 |
| 165 | Pressure side | 0.45823 | −0.06214 | 0.20000 |
| 166 | Pressure side | 0.46294 | −0.06783 | 0.20000 |
| 167 | Pressure side | 0.46757 | −0.07358 | 0.20000 |
| 168 | Pressure side | 0.47213 | −0.07937 | 0.20000 |
| 169 | Pressure side | 0.47664 | −0.08521 | 0.20000 |
| 170 | Pressure side | 0.48108 | −0.09110 | 0.20000 |
| 171 | Pressure side | 0.48545 | −0.09704 | 0.20000 |
| 172 | Pressure side | 0.48978 | −0.10302 | 0.20000 |
| 173 | Pressure side | 0.49405 | −0.10903 | 0.20000 |
| 174 | Pressure side | 0.49826 | −0.11509 | 0.20000 |
| 175 | Pressure side | 0.50242 | −0.12117 | 0.20000 |
| 176 | Pressure side | 0.50653 | −0.12730 | 0.20000 |
| 177 | Pressure side | 0.51060 | −0.13346 | 0.20000 |
| 178 | Pressure side | 0.51461 | −0.13965 | 0.20000 |
| 179 | Pressure side | 0.51858 | −0.14586 | 0.20000 |
| 180 | Pressure side | 0.52251 | −0.15211 | 0.20000 |
| 181 | Pressure side | 0.52640 | −0.15838 | 0.20000 |
| 182 | Pressure side | 0.53024 | −0.16468 | 0.20000 |
| 183 | Pressure side | 0.53406 | −0.17099 | 0.20000 |
| 184 | Pressure side | 0.53784 | −0.17732 | 0.20000 |
| 185 | Pressure side | 0.54158 | −0.18368 | 0.20000 |
| 186 | Pressure side | 0.54529 | −0.19005 | 0.20000 |
| 187 | Pressure side | 0.54898 | −0.19644 | 0.20000 |
| 188 | Pressure side | 0.55263 | −0.20285 | 0.20000 |
| 189 | Pressure side | 0.55626 | −0.20928 | 0.20000 |
| 190 | Pressure side | 0.55987 | −0.21571 | 0.20000 |
| 191 | Pressure side | 0.56345 | −0.22216 | 0.20000 |
| 192 | Pressure side | 0.56701 | −0.22861 | 0.20000 |
| 193 | Pressure side | 0.57056 | −0.23509 | 0.20000 |
| 194 | Pressure side | 0.57408 | −0.24158 | 0.20000 |
| 195 | Pressure side | 0.57758 | −0.24806 | 0.20000 |
| 196 | Pressure side | 0.58107 | −0.25456 | 0.20000 |
| 197 | Pressure side | 0.58371 | −0.25796 | 0.20000 |
| 198 | Pressure side | 0.58739 | −0.26017 | 0.20000 |
| 199 | Pressure side | 0.59164 | −0.26082 | 0.20000 |
| 200 | Pressure side | 0.59582 | −0.25983 | 0.20000 |
| 1 | Suction side | 0.02965 | 0.07255 | 0.30000 |
| 2 | Suction side | 0.03053 | 0.08256 | 0.30000 |
| 3 | Suction side | 0.03058 | 0.06255 | 0.30000 |
| 4 | Suction side | 0.03260 | 0.09239 | 0.30000 |
| 5 | Suction side | 0.03428 | 0.05325 | 0.30000 |
| 6 | Suction side | 0.03557 | 0.10201 | 0.30000 |
| 7 | Suction side | 0.03919 | 0.11140 | 0.30000 |
| 8 | Suction side | 0.04133 | 0.04619 | 0.30000 |
| 9 | Suction side | 0.04337 | 0.12056 | 0.30000 |
| 10 | Suction side | 0.04801 | 0.12948 | 0.30000 |
| 11 | Suction side | 0.05309 | 0.13816 | 0.30000 |
| 12 | Suction side | 0.05853 | 0.14662 | 0.30000 |
| 13 | Suction side | 0.06433 | 0.15486 | 0.30000 |
| 14 | Suction side | 0.07045 | 0.16284 | 0.30000 |
| 15 | Suction side | 0.07687 | 0.17058 | 0.30000 |
| 16 | Suction side | 0.08359 | 0.17807 | 0.30000 |
| 17 | Suction side | 0.09060 | 0.18530 | 0.30000 |
| 18 | Suction side | 0.09788 | 0.19224 | 0.30000 |
| 19 | Suction side | 0.10543 | 0.19888 | 0.30000 |
| 20 | Suction side | 0.11326 | 0.20522 | 0.30000 |
| 21 | Suction side | 0.12132 | 0.21122 | 0.30000 |
| 22 | Suction side | 0.12965 | 0.21686 | 0.30000 |
| 23 | Suction side | 0.13823 | 0.22212 | 0.30000 |
| 24 | Suction side | 0.14704 | 0.22698 | 0.30000 |
| 25 | Suction side | 0.15608 | 0.23141 | 0.30000 |
| 26 | Suction side | 0.16532 | 0.23538 | 0.30000 |
| 27 | Suction side | 0.17476 | 0.23885 | 0.30000 |
| 28 | Suction side | 0.18438 | 0.24179 | 0.30000 |
| 29 | Suction side | 0.19416 | 0.24418 | 0.30000 |
| 30 | Suction side | 0.20406 | 0.24598 | 0.30000 |
| 31 | Suction side | 0.21405 | 0.24717 | 0.30000 |
| 32 | Suction side | 0.22410 | 0.24773 | 0.30000 |
| 33 | Suction side | 0.23416 | 0.24766 | 0.30000 |
| 34 | Suction side | 0.24418 | 0.24694 | 0.30000 |
| 35 | Suction side | 0.25416 | 0.24558 | 0.30000 |
| 36 | Suction side | 0.26402 | 0.24360 | 0.30000 |
| 37 | Suction side | 0.27375 | 0.24102 | 0.30000 |
| 38 | Suction side | 0.28330 | 0.23786 | 0.30000 |
| 39 | Suction side | 0.29266 | 0.23418 | 0.30000 |
| 40 | Suction side | 0.30181 | 0.23000 | 0.30000 |
| 41 | Suction side | 0.31074 | 0.22536 | 0.30000 |
| 42 | Suction side | 0.31944 | 0.22031 | 0.30000 |
| 43 | Suction side | 0.32791 | 0.21489 | 0.30000 |
| 44 | Suction side | 0.33616 | 0.20912 | 0.30000 |
| 45 | Suction side | 0.34418 | 0.20304 | 0.30000 |
| 46 | Suction side | 0.35200 | 0.19671 | 0.30000 |
| 47 | Suction side | 0.35960 | 0.19012 | 0.30000 |
| 48 | Suction side | 0.36701 | 0.18330 | 0.30000 |
| 49 | Suction side | 0.37422 | 0.17629 | 0.30000 |
| 50 | Suction side | 0.38127 | 0.16910 | 0.30000 |
| 51 | Suction side | 0.38814 | 0.16175 | 0.30000 |
| 52 | Suction side | 0.39485 | 0.15426 | 0.30000 |
| 53 | Suction side | 0.40142 | 0.14664 | 0.30000 |
| 54 | Suction side | 0.40784 | 0.13889 | 0.30000 |
| 55 | Suction side | 0.41413 | 0.13103 | 0.30000 |
| 56 | Suction side | 0.42030 | 0.12308 | 0.30000 |
| 57 | Suction side | 0.42634 | 0.11504 | 0.30000 |
| 58 | Suction side | 0.43227 | 0.10691 | 0.30000 |
| 59 | Suction side | 0.43808 | 0.09869 | 0.30000 |
| 60 | Suction side | 0.44379 | 0.09041 | 0.30000 |
| 61 | Suction side | 0.44941 | 0.08206 | 0.30000 |
| 62 | Suction side | 0.45494 | 0.07366 | 0.30000 |
| 63 | Suction side | 0.46038 | 0.06518 | 0.30000 |
| 64 | Suction side | 0.46572 | 0.05666 | 0.30000 |
| 65 | Suction side | 0.47100 | 0.04810 | 0.30000 |
| 66 | Suction side | 0.47619 | 0.03947 | 0.30000 |
| 67 | Suction side | 0.48131 | 0.03081 | 0.30000 |
| 68 | Suction side | 0.48636 | 0.02211 | 0.30000 |
| 69 | Suction side | 0.49133 | 0.01336 | 0.30000 |
| 70 | Suction side | 0.49624 | 0.00458 | 0.30000 |
| 71 | Suction side | 0.50109 | −0.00424 | 0.30000 |
| 72 | Suction side | 0.50586 | −0.01309 | 0.30000 |
| 73 | Suction side | 0.51058 | −0.02198 | 0.30000 |
| 74 | Suction side | 0.51523 | −0.03091 | 0.30000 |
| 75 | Suction side | 0.51983 | −0.03986 | 0.30000 |
| 76 | Suction side | 0.52435 | −0.04885 | 0.30000 |
| 77 | Suction side | 0.52882 | −0.05787 | 0.30000 |
| 78 | Suction side | 0.53322 | −0.06691 | 0.30000 |
| 79 | Suction side | 0.53757 | −0.07598 | 0.30000 |
| 80 | Suction side | 0.54186 | −0.08509 | 0.30000 |
| 81 | Suction side | 0.54608 | −0.09421 | 0.30000 |
| 82 | Suction side | 0.55026 | −0.10337 | 0.30000 |
| 83 | Suction side | 0.55438 | −0.11256 | 0.30000 |
| 84 | Suction side | 0.55843 | −0.12177 | 0.30000 |
| 85 | Suction side | 0.56243 | −0.13100 | 0.30000 |
| 86 | Suction side | 0.56639 | −0.14025 | 0.30000 |
| 87 | Suction side | 0.57028 | −0.14952 | 0.30000 |
| 88 | Suction side | 0.57413 | −0.15882 | 0.30000 |
| 89 | Suction side | 0.57795 | −0.16814 | 0.30000 |
| 90 | Suction side | 0.58170 | −0.17747 | 0.30000 |
| 91 | Suction side | 0.58543 | −0.18682 | 0.30000 |
| 92 | Suction side | 0.58911 | −0.19619 | 0.30000 |
| 93 | Suction side | 0.59276 | −0.20556 | 0.30000 |
| 94 | Suction side | 0.59637 | −0.21495 | 0.30000 |
| 95 | Suction side | 0.59996 | −0.22435 | 0.30000 |
| 96 | Suction side | 0.60352 | −0.23376 | 0.30000 |
| 97 | Suction side | 0.60492 | −0.25495 | 0.30000 |
| 98 | Suction side | 0.60706 | −0.24319 | 0.30000 |
| 99 | Suction side | 0.60714 | −0.25141 | 0.30000 |
| 100 | Suction side | 0.60786 | −0.24729 | 0.30000 |
| 101 | Pressure side | 0.04781 | 0.04268 | 0.30000 |
| 102 | Pressure side | 0.05470 | 0.04008 | 0.30000 |
| 103 | Pressure side | 0.06191 | 0.03863 | 0.30000 |
| 104 | Pressure side | 0.06927 | 0.03834 | 0.30000 |
| 105 | Pressure side | 0.07659 | 0.03908 | 0.30000 |
| 106 | Pressure side | 0.08379 | 0.04067 | 0.30000 |
| 107 | Pressure side | 0.09083 | 0.04286 | 0.30000 |
| 108 | Pressure side | 0.09772 | 0.04547 | 0.30000 |
| 109 | Pressure side | 0.10452 | 0.04832 | 0.30000 |
| 110 | Pressure side | 0.11125 | 0.05133 | 0.30000 |

TABLE 1-continued

Non-Dimensionalized (X Y Z/Span Height)

| N | Location | X | Y | Z |
|---|---|---|---|---|
| 111 | Pressure side | 0.11795 | 0.05440 | 0.30000 |
| 112 | Pressure side | 0.12464 | 0.05747 | 0.30000 |
| 113 | Pressure side | 0.13136 | 0.06050 | 0.30000 |
| 114 | Pressure side | 0.13813 | 0.06344 | 0.30000 |
| 115 | Pressure side | 0.14493 | 0.06626 | 0.30000 |
| 116 | Pressure side | 0.15180 | 0.06894 | 0.30000 |
| 117 | Pressure side | 0.15874 | 0.07142 | 0.30000 |
| 118 | Pressure side | 0.16574 | 0.07371 | 0.30000 |
| 119 | Pressure side | 0.17282 | 0.07578 | 0.30000 |
| 120 | Pressure side | 0.17995 | 0.07761 | 0.30000 |
| 121 | Pressure side | 0.18715 | 0.07919 | 0.30000 |
| 122 | Pressure side | 0.19441 | 0.08050 | 0.30000 |
| 123 | Pressure side | 0.20171 | 0.08154 | 0.30000 |
| 124 | Pressure side | 0.20903 | 0.08229 | 0.30000 |
| 125 | Pressure side | 0.21639 | 0.08276 | 0.30000 |
| 126 | Pressure side | 0.22375 | 0.08294 | 0.30000 |
| 127 | Pressure side | 0.23112 | 0.08284 | 0.30000 |
| 128 | Pressure side | 0.23848 | 0.08243 | 0.30000 |
| 129 | Pressure side | 0.24582 | 0.08176 | 0.30000 |
| 130 | Pressure side | 0.25313 | 0.08079 | 0.30000 |
| 131 | Pressure side | 0.26039 | 0.07955 | 0.30000 |
| 132 | Pressure side | 0.26760 | 0.07803 | 0.30000 |
| 133 | Pressure side | 0.27475 | 0.07625 | 0.30000 |
| 134 | Pressure side | 0.28184 | 0.07423 | 0.30000 |
| 135 | Pressure side | 0.28886 | 0.07196 | 0.30000 |
| 136 | Pressure side | 0.29579 | 0.06947 | 0.30000 |
| 137 | Pressure side | 0.30264 | 0.06675 | 0.30000 |
| 138 | Pressure side | 0.30940 | 0.06383 | 0.30000 |
| 139 | Pressure side | 0.31608 | 0.06072 | 0.30000 |
| 140 | Pressure side | 0.32267 | 0.05741 | 0.30000 |
| 141 | Pressure side | 0.32917 | 0.05394 | 0.30000 |
| 142 | Pressure side | 0.33558 | 0.05030 | 0.30000 |
| 143 | Pressure side | 0.34191 | 0.04651 | 0.30000 |
| 144 | Pressure side | 0.34814 | 0.04258 | 0.30000 |
| 145 | Pressure side | 0.35429 | 0.03851 | 0.30000 |
| 146 | Pressure side | 0.36034 | 0.03431 | 0.30000 |
| 147 | Pressure side | 0.36632 | 0.03000 | 0.30000 |
| 148 | Pressure side | 0.37221 | 0.02557 | 0.30000 |
| 149 | Pressure side | 0.37802 | 0.02104 | 0.30000 |
| 150 | Pressure side | 0.38376 | 0.01641 | 0.30000 |
| 151 | Pressure side | 0.38941 | 0.01169 | 0.30000 |
| 152 | Pressure side | 0.39499 | 0.00687 | 0.30000 |
| 153 | Pressure side | 0.40050 | 0.00198 | 0.30000 |
| 154 | Pressure side | 0.40595 | −0.00299 | 0.30000 |
| 155 | Pressure side | 0.41133 | −0.00804 | 0.30000 |
| 156 | Pressure side | 0.41663 | −0.01315 | 0.30000 |
| 157 | Pressure side | 0.42187 | −0.01833 | 0.30000 |
| 158 | Pressure side | 0.42705 | −0.02357 | 0.30000 |
| 159 | Pressure side | 0.43215 | −0.02889 | 0.30000 |
| 160 | Pressure side | 0.43721 | −0.03426 | 0.30000 |
| 161 | Pressure side | 0.44220 | −0.03968 | 0.30000 |
| 162 | Pressure side | 0.44712 | −0.04516 | 0.30000 |
| 163 | Pressure side | 0.45200 | −0.05068 | 0.30000 |
| 164 | Pressure side | 0.45682 | −0.05627 | 0.30000 |
| 165 | Pressure side | 0.46158 | −0.06189 | 0.30000 |
| 166 | Pressure side | 0.46628 | −0.06756 | 0.30000 |
| 167 | Pressure side | 0.47093 | −0.07329 | 0.30000 |
| 168 | Pressure side | 0.47553 | −0.07905 | 0.30000 |
| 169 | Pressure side | 0.48007 | −0.08485 | 0.30000 |
| 170 | Pressure side | 0.48458 | −0.09069 | 0.30000 |
| 171 | Pressure side | 0.48902 | −0.09657 | 0.30000 |
| 172 | Pressure side | 0.49342 | −0.10248 | 0.30000 |
| 173 | Pressure side | 0.49777 | −0.10842 | 0.30000 |
| 174 | Pressure side | 0.50207 | −0.11440 | 0.30000 |
| 175 | Pressure side | 0.50633 | −0.12042 | 0.30000 |
| 176 | Pressure side | 0.51055 | −0.12646 | 0.30000 |
| 177 | Pressure side | 0.51472 | −0.13254 | 0.30000 |
| 178 | Pressure side | 0.51885 | −0.13865 | 0.30000 |
| 179 | Pressure side | 0.52293 | −0.14478 | 0.30000 |
| 180 | Pressure side | 0.52699 | −0.15094 | 0.30000 |
| 181 | Pressure side | 0.53100 | −0.15713 | 0.30000 |
| 182 | Pressure side | 0.53495 | −0.16334 | 0.30000 |
| 183 | Pressure side | 0.53888 | −0.16957 | 0.30000 |
| 184 | Pressure side | 0.54278 | −0.17583 | 0.30000 |
| 185 | Pressure side | 0.54664 | −0.18212 | 0.30000 |
| 186 | Pressure side | 0.55046 | −0.18841 | 0.30000 |
| 187 | Pressure side | 0.55425 | −0.19474 | 0.30000 |
| 188 | Pressure side | 0.55800 | −0.20107 | 0.30000 |
| 189 | Pressure side | 0.56174 | −0.20743 | 0.30000 |
| 190 | Pressure side | 0.56543 | −0.21381 | 0.30000 |
| 191 | Pressure side | 0.56911 | −0.22019 | 0.30000 |
| 192 | Pressure side | 0.57276 | −0.22660 | 0.30000 |
| 193 | Pressure side | 0.57638 | −0.23301 | 0.30000 |
| 194 | Pressure side | 0.57998 | −0.23945 | 0.30000 |
| 195 | Pressure side | 0.58357 | −0.24589 | 0.30000 |
| 196 | Pressure side | 0.58713 | −0.25234 | 0.30000 |
| 197 | Pressure side | 0.58974 | −0.25562 | 0.30000 |
| 198 | Pressure side | 0.59333 | −0.25776 | 0.30000 |
| 199 | Pressure side | 0.59746 | −0.25838 | 0.30000 |
| 200 | Pressure side | 0.60153 | −0.25739 | 0.30000 |
| 1 | Suction side | 0.03589 | 0.09018 | 0.40000 |
| 2 | Suction side | 0.03642 | 0.10020 | 0.40000 |
| 3 | Suction side | 0.03712 | 0.08025 | 0.40000 |
| 4 | Suction side | 0.03814 | 0.11009 | 0.40000 |
| 5 | Suction side | 0.04075 | 0.11977 | 0.40000 |
| 6 | Suction side | 0.04096 | 0.07101 | 0.40000 |
| 7 | Suction side | 0.04408 | 0.12925 | 0.40000 |
| 8 | Suction side | 0.04800 | 0.13848 | 0.40000 |
| 9 | Suction side | 0.04819 | 0.06419 | 0.40000 |
| 10 | Suction side | 0.05242 | 0.14749 | 0.40000 |
| 11 | Suction side | 0.05731 | 0.15627 | 0.40000 |
| 12 | Suction side | 0.06260 | 0.16479 | 0.40000 |
| 13 | Suction side | 0.06829 | 0.17306 | 0.40000 |
| 14 | Suction side | 0.07434 | 0.18107 | 0.40000 |
| 15 | Suction side | 0.08074 | 0.18881 | 0.40000 |
| 16 | Suction side | 0.08747 | 0.19625 | 0.40000 |
| 17 | Suction side | 0.09453 | 0.20339 | 0.40000 |
| 18 | Suction side | 0.10190 | 0.21020 | 0.40000 |
| 19 | Suction side | 0.10957 | 0.21668 | 0.40000 |
| 20 | Suction side | 0.11753 | 0.22279 | 0.40000 |
| 21 | Suction side | 0.12579 | 0.22850 | 0.40000 |
| 22 | Suction side | 0.13431 | 0.23380 | 0.40000 |
| 23 | Suction side | 0.14310 | 0.23865 | 0.40000 |
| 24 | Suction side | 0.15213 | 0.24304 | 0.40000 |
| 25 | Suction side | 0.16138 | 0.24692 | 0.40000 |
| 26 | Suction side | 0.17085 | 0.25026 | 0.40000 |
| 27 | Suction side | 0.18049 | 0.25306 | 0.40000 |
| 28 | Suction side | 0.19028 | 0.25526 | 0.40000 |
| 29 | Suction side | 0.20019 | 0.25688 | 0.40000 |
| 30 | Suction side | 0.21018 | 0.25787 | 0.40000 |
| 31 | Suction side | 0.22020 | 0.25823 | 0.40000 |
| 32 | Suction side | 0.23024 | 0.25795 | 0.40000 |
| 33 | Suction side | 0.24024 | 0.25706 | 0.40000 |
| 34 | Suction side | 0.25016 | 0.25553 | 0.40000 |
| 35 | Suction side | 0.25997 | 0.25342 | 0.40000 |
| 36 | Suction side | 0.26964 | 0.25073 | 0.40000 |
| 37 | Suction side | 0.27914 | 0.24750 | 0.40000 |
| 38 | Suction side | 0.28845 | 0.24375 | 0.40000 |
| 39 | Suction side | 0.29757 | 0.23954 | 0.40000 |
| 40 | Suction side | 0.30647 | 0.23488 | 0.40000 |
| 41 | Suction side | 0.31513 | 0.22983 | 0.40000 |
| 42 | Suction side | 0.32359 | 0.22441 | 0.40000 |
| 43 | Suction side | 0.33182 | 0.21866 | 0.40000 |
| 44 | Suction side | 0.33983 | 0.21262 | 0.40000 |
| 45 | Suction side | 0.34763 | 0.20630 | 0.40000 |
| 46 | Suction side | 0.35523 | 0.19975 | 0.40000 |
| 47 | Suction side | 0.36263 | 0.19297 | 0.40000 |
| 48 | Suction side | 0.36986 | 0.18600 | 0.40000 |
| 49 | Suction side | 0.37690 | 0.17883 | 0.40000 |
| 50 | Suction side | 0.38377 | 0.17152 | 0.40000 |
| 51 | Suction side | 0.39049 | 0.16407 | 0.40000 |
| 52 | Suction side | 0.39707 | 0.15648 | 0.40000 |
| 53 | Suction side | 0.40350 | 0.14877 | 0.40000 |
| 54 | Suction side | 0.40980 | 0.14096 | 0.40000 |
| 55 | Suction side | 0.41598 | 0.13305 | 0.40000 |
| 56 | Suction side | 0.42204 | 0.12504 | 0.40000 |
| 57 | Suction side | 0.42799 | 0.11696 | 0.40000 |
| 58 | Suction side | 0.43383 | 0.10879 | 0.40000 |
| 59 | Suction side | 0.43958 | 0.10056 | 0.40000 |
| 60 | Suction side | 0.44524 | 0.09227 | 0.40000 |
| 61 | Suction side | 0.45080 | 0.08392 | 0.40000 |
| 62 | Suction side | 0.45628 | 0.07551 | 0.40000 |

TABLE 1-continued

Non-Dimensionalized (X Y Z/Span Height)

| N | Location | X | Y | Z |
|---|---|---|---|---|
| 63 | Suction side | 0.46169 | 0.06705 | 0.40000 |
| 64 | Suction side | 0.46702 | 0.05854 | 0.40000 |
| 65 | Suction side | 0.47227 | 0.04998 | 0.40000 |
| 66 | Suction side | 0.47746 | 0.04139 | 0.40000 |
| 67 | Suction side | 0.48258 | 0.03276 | 0.40000 |
| 68 | Suction side | 0.48764 | 0.02409 | 0.40000 |
| 69 | Suction side | 0.49264 | 0.01538 | 0.40000 |
| 70 | Suction side | 0.49759 | 0.00664 | 0.40000 |
| 71 | Suction side | 0.50247 | −0.00212 | 0.40000 |
| 72 | Suction side | 0.50730 | −0.01093 | 0.40000 |
| 73 | Suction side | 0.51208 | −0.01976 | 0.40000 |
| 74 | Suction side | 0.51680 | −0.02861 | 0.40000 |
| 75 | Suction side | 0.52147 | −0.03750 | 0.40000 |
| 76 | Suction side | 0.52608 | −0.04641 | 0.40000 |
| 77 | Suction side | 0.53065 | −0.05535 | 0.40000 |
| 78 | Suction side | 0.53518 | −0.06432 | 0.40000 |
| 79 | Suction side | 0.53965 | −0.07331 | 0.40000 |
| 80 | Suction side | 0.54406 | −0.08232 | 0.40000 |
| 81 | Suction side | 0.54842 | −0.09136 | 0.40000 |
| 82 | Suction side | 0.55272 | −0.10043 | 0.40000 |
| 83 | Suction side | 0.55698 | −0.10953 | 0.40000 |
| 84 | Suction side | 0.56118 | −0.11864 | 0.40000 |
| 85 | Suction side | 0.56534 | −0.12778 | 0.40000 |
| 86 | Suction side | 0.56944 | −0.13694 | 0.40000 |
| 87 | Suction side | 0.57348 | −0.14613 | 0.40000 |
| 88 | Suction side | 0.57748 | −0.15534 | 0.40000 |
| 89 | Suction side | 0.58142 | −0.16457 | 0.40000 |
| 90 | Suction side | 0.58531 | −0.17382 | 0.40000 |
| 91 | Suction side | 0.58917 | −0.18310 | 0.40000 |
| 92 | Suction side | 0.59299 | −0.19238 | 0.40000 |
| 93 | Suction side | 0.59676 | −0.20168 | 0.40000 |
| 94 | Suction side | 0.60049 | −0.21099 | 0.40000 |
| 95 | Suction side | 0.60421 | −0.22033 | 0.40000 |
| 96 | Suction side | 0.60788 | −0.22967 | 0.40000 |
| 97 | Suction side | 0.60961 | −0.25044 | 0.40000 |
| 98 | Suction side | 0.61152 | −0.23902 | 0.40000 |
| 99 | Suction side | 0.61171 | −0.24698 | 0.40000 |
| 100 | Suction side | 0.61235 | −0.24299 | 0.40000 |
| 101 | Pressure side | 0.05464 | 0.06067 | 0.40000 |
| 102 | Pressure side | 0.06147 | 0.05793 | 0.40000 |
| 103 | Pressure side | 0.06862 | 0.05621 | 0.40000 |
| 104 | Pressure side | 0.07595 | 0.05558 | 0.40000 |
| 105 | Pressure side | 0.08330 | 0.05599 | 0.40000 |
| 106 | Pressure side | 0.09052 | 0.05736 | 0.40000 |
| 107 | Pressure side | 0.09757 | 0.05945 | 0.40000 |
| 108 | Pressure side | 0.10448 | 0.06202 | 0.40000 |
| 109 | Pressure side | 0.11126 | 0.06487 | 0.40000 |
| 110 | Pressure side | 0.11798 | 0.06788 | 0.40000 |
| 111 | Pressure side | 0.12467 | 0.07096 | 0.40000 |
| 112 | Pressure side | 0.13136 | 0.07404 | 0.40000 |
| 113 | Pressure side | 0.13806 | 0.07705 | 0.40000 |
| 114 | Pressure side | 0.14483 | 0.07995 | 0.40000 |
| 115 | Pressure side | 0.15166 | 0.08270 | 0.40000 |
| 116 | Pressure side | 0.15857 | 0.08524 | 0.40000 |
| 117 | Pressure side | 0.16555 | 0.08757 | 0.40000 |
| 118 | Pressure side | 0.17263 | 0.08963 | 0.40000 |
| 119 | Pressure side | 0.17976 | 0.09143 | 0.40000 |
| 120 | Pressure side | 0.18696 | 0.09292 | 0.40000 |
| 121 | Pressure side | 0.19423 | 0.09411 | 0.40000 |
| 122 | Pressure side | 0.20154 | 0.09499 | 0.40000 |
| 123 | Pressure side | 0.20888 | 0.09555 | 0.40000 |
| 124 | Pressure side | 0.21623 | 0.09580 | 0.40000 |
| 125 | Pressure side | 0.22360 | 0.09573 | 0.40000 |
| 126 | Pressure side | 0.23095 | 0.09533 | 0.40000 |
| 127 | Pressure side | 0.23828 | 0.09463 | 0.40000 |
| 128 | Pressure side | 0.24557 | 0.09364 | 0.40000 |
| 129 | Pressure side | 0.25282 | 0.09236 | 0.40000 |
| 130 | Pressure side | 0.26001 | 0.09080 | 0.40000 |
| 131 | Pressure side | 0.26714 | 0.08897 | 0.40000 |
| 132 | Pressure side | 0.27421 | 0.08689 | 0.40000 |
| 133 | Pressure side | 0.28119 | 0.08457 | 0.40000 |
| 134 | Pressure side | 0.28810 | 0.08201 | 0.40000 |
| 135 | Pressure side | 0.29492 | 0.07924 | 0.40000 |
| 136 | Pressure side | 0.30164 | 0.07626 | 0.40000 |
| 137 | Pressure side | 0.30829 | 0.07311 | 0.40000 |
| 138 | Pressure side | 0.31485 | 0.06976 | 0.40000 |
| 139 | Pressure side | 0.32131 | 0.06625 | 0.40000 |
| 140 | Pressure side | 0.32770 | 0.06258 | 0.40000 |
| 141 | Pressure side | 0.33399 | 0.05876 | 0.40000 |
| 142 | Pressure side | 0.34020 | 0.05482 | 0.40000 |
| 143 | Pressure side | 0.34633 | 0.05073 | 0.40000 |
| 144 | Pressure side | 0.35238 | 0.04653 | 0.40000 |
| 145 | Pressure side | 0.35834 | 0.04222 | 0.40000 |
| 146 | Pressure side | 0.36423 | 0.03779 | 0.40000 |
| 147 | Pressure side | 0.37003 | 0.03328 | 0.40000 |
| 148 | Pressure side | 0.37577 | 0.02866 | 0.40000 |
| 149 | Pressure side | 0.38144 | 0.02397 | 0.40000 |
| 150 | Pressure side | 0.38704 | 0.01918 | 0.40000 |
| 151 | Pressure side | 0.39256 | 0.01432 | 0.40000 |
| 152 | Pressure side | 0.39803 | 0.00939 | 0.40000 |
| 153 | Pressure side | 0.40344 | 0.00439 | 0.40000 |
| 154 | Pressure side | 0.40877 | −0.00067 | 0.40000 |
| 155 | Pressure side | 0.41406 | −0.00580 | 0.40000 |
| 156 | Pressure side | 0.41929 | −0.01099 | 0.40000 |
| 157 | Pressure side | 0.42446 | −0.01623 | 0.40000 |
| 158 | Pressure side | 0.42957 | −0.02152 | 0.40000 |
| 159 | Pressure side | 0.43464 | −0.02685 | 0.40000 |
| 160 | Pressure side | 0.43966 | −0.03225 | 0.40000 |
| 161 | Pressure side | 0.44462 | −0.03768 | 0.40000 |
| 162 | Pressure side | 0.44954 | −0.04316 | 0.40000 |
| 163 | Pressure side | 0.45441 | −0.04867 | 0.40000 |
| 164 | Pressure side | 0.45923 | −0.05423 | 0.40000 |
| 165 | Pressure side | 0.46402 | −0.05983 | 0.40000 |
| 166 | Pressure side | 0.46876 | −0.06546 | 0.40000 |
| 167 | Pressure side | 0.47346 | −0.07114 | 0.40000 |
| 168 | Pressure side | 0.47811 | −0.07684 | 0.40000 |
| 169 | Pressure side | 0.48272 | −0.08257 | 0.40000 |
| 170 | Pressure side | 0.48729 | −0.08835 | 0.40000 |
| 171 | Pressure side | 0.49181 | −0.09416 | 0.40000 |
| 172 | Pressure side | 0.49629 | −0.10000 | 0.40000 |
| 173 | Pressure side | 0.50073 | −0.10587 | 0.40000 |
| 174 | Pressure side | 0.50513 | −0.11177 | 0.40000 |
| 175 | Pressure side | 0.50950 | −0.11770 | 0.40000 |
| 176 | Pressure side | 0.51381 | −0.12366 | 0.40000 |
| 177 | Pressure side | 0.51808 | −0.12965 | 0.40000 |
| 178 | Pressure side | 0.52232 | −0.13567 | 0.40000 |
| 179 | Pressure side | 0.52652 | −0.14173 | 0.40000 |
| 180 | Pressure side | 0.53068 | −0.14779 | 0.40000 |
| 181 | Pressure side | 0.53480 | −0.15390 | 0.40000 |
| 182 | Pressure side | 0.53887 | −0.16003 | 0.40000 |
| 183 | Pressure side | 0.54290 | −0.16619 | 0.40000 |
| 184 | Pressure side | 0.54691 | −0.17237 | 0.40000 |
| 185 | Pressure side | 0.55087 | −0.17857 | 0.40000 |
| 186 | Pressure side | 0.55480 | −0.18480 | 0.40000 |
| 187 | Pressure side | 0.55869 | −0.19105 | 0.40000 |
| 188 | Pressure side | 0.56254 | −0.19732 | 0.40000 |
| 189 | Pressure side | 0.56636 | −0.20362 | 0.40000 |
| 190 | Pressure side | 0.57015 | −0.20993 | 0.40000 |
| 191 | Pressure side | 0.57392 | −0.21625 | 0.40000 |
| 192 | Pressure side | 0.57766 | −0.22260 | 0.40000 |
| 193 | Pressure side | 0.58136 | −0.22896 | 0.40000 |
| 194 | Pressure side | 0.58503 | −0.23533 | 0.40000 |
| 195 | Pressure side | 0.58870 | −0.24172 | 0.40000 |
| 196 | Pressure side | 0.59234 | −0.24811 | 0.40000 |
| 197 | Pressure side | 0.59489 | −0.25127 | 0.40000 |
| 198 | Pressure side | 0.59840 | −0.25330 | 0.40000 |
| 199 | Pressure side | 0.60242 | −0.25386 | 0.40000 |
| 200 | Pressure side | 0.60636 | −0.25285 | 0.40000 |
| 1 | Suction side | 0.04030 | 0.11235 | 0.50000 |
| 2 | Suction side | 0.04077 | 0.12230 | 0.50000 |
| 3 | Suction side | 0.04156 | 0.10247 | 0.50000 |
| 4 | Suction side | 0.04243 | 0.13213 | 0.50000 |
| 5 | Suction side | 0.04497 | 0.14178 | 0.50000 |
| 6 | Suction side | 0.04539 | 0.09331 | 0.50000 |
| 7 | Suction side | 0.04825 | 0.15119 | 0.50000 |
| 8 | Suction side | 0.05214 | 0.16036 | 0.50000 |
| 9 | Suction side | 0.05245 | 0.08642 | 0.50000 |
| 10 | Suction side | 0.05657 | 0.16931 | 0.50000 |
| 11 | Suction side | 0.06147 | 0.17798 | 0.50000 |
| 12 | Suction side | 0.06682 | 0.18640 | 0.50000 |
| 13 | Suction side | 0.07259 | 0.19453 | 0.50000 |
| 14 | Suction side | 0.07874 | 0.20238 | 0.50000 |

TABLE 1-continued

Non-Dimensionalized (X Y Z/Span Height)

| N | Location | X | Y | Z |
|---|---|---|---|---|
| 15 | Suction side | 0.08528 | 0.20991 | 0.50000 |
| 16 | Suction side | 0.09218 | 0.21711 | 0.50000 |
| 17 | Suction side | 0.09943 | 0.22396 | 0.50000 |
| 18 | Suction side | 0.10700 | 0.23044 | 0.50000 |
| 19 | Suction side | 0.11490 | 0.23653 | 0.50000 |
| 20 | Suction side | 0.12310 | 0.24219 | 0.50000 |
| 21 | Suction side | 0.13161 | 0.24740 | 0.50000 |
| 22 | Suction side | 0.14039 | 0.25213 | 0.50000 |
| 23 | Suction side | 0.14942 | 0.25634 | 0.50000 |
| 24 | Suction side | 0.15870 | 0.26001 | 0.50000 |
| 25 | Suction side | 0.16817 | 0.26311 | 0.50000 |
| 26 | Suction side | 0.17783 | 0.26562 | 0.50000 |
| 27 | Suction side | 0.18761 | 0.26751 | 0.50000 |
| 28 | Suction side | 0.19751 | 0.26879 | 0.50000 |
| 29 | Suction side | 0.20746 | 0.26942 | 0.50000 |
| 30 | Suction side | 0.21743 | 0.26942 | 0.50000 |
| 31 | Suction side | 0.22738 | 0.26880 | 0.50000 |
| 32 | Suction side | 0.23728 | 0.26756 | 0.50000 |
| 33 | Suction side | 0.24707 | 0.26573 | 0.50000 |
| 34 | Suction side | 0.25675 | 0.26334 | 0.50000 |
| 35 | Suction side | 0.26629 | 0.26042 | 0.50000 |
| 36 | Suction side | 0.27564 | 0.25698 | 0.50000 |
| 37 | Suction side | 0.28483 | 0.25308 | 0.50000 |
| 38 | Suction side | 0.29381 | 0.24874 | 0.50000 |
| 39 | Suction side | 0.30257 | 0.24401 | 0.50000 |
| 40 | Suction side | 0.31115 | 0.23889 | 0.50000 |
| 41 | Suction side | 0.31951 | 0.23346 | 0.50000 |
| 42 | Suction side | 0.32765 | 0.22771 | 0.50000 |
| 43 | Suction side | 0.33560 | 0.22168 | 0.50000 |
| 44 | Suction side | 0.34334 | 0.21541 | 0.50000 |
| 45 | Suction side | 0.35090 | 0.20889 | 0.50000 |
| 46 | Suction side | 0.35827 | 0.20218 | 0.50000 |
| 47 | Suction side | 0.36547 | 0.19527 | 0.50000 |
| 48 | Suction side | 0.37249 | 0.18820 | 0.50000 |
| 49 | Suction side | 0.37935 | 0.18096 | 0.50000 |
| 50 | Suction side | 0.38605 | 0.17357 | 0.50000 |
| 51 | Suction side | 0.39261 | 0.16606 | 0.50000 |
| 52 | Suction side | 0.39903 | 0.15843 | 0.50000 |
| 53 | Suction side | 0.40532 | 0.15070 | 0.50000 |
| 54 | Suction side | 0.41149 | 0.14286 | 0.50000 |
| 55 | Suction side | 0.41753 | 0.13493 | 0.50000 |
| 56 | Suction side | 0.42349 | 0.12692 | 0.50000 |
| 57 | Suction side | 0.42933 | 0.11884 | 0.50000 |
| 58 | Suction side | 0.43506 | 0.11069 | 0.50000 |
| 59 | Suction side | 0.44073 | 0.10247 | 0.50000 |
| 60 | Suction side | 0.44630 | 0.09420 | 0.50000 |
| 61 | Suction side | 0.45179 | 0.08588 | 0.50000 |
| 62 | Suction side | 0.45721 | 0.07751 | 0.50000 |
| 63 | Suction side | 0.46257 | 0.06909 | 0.50000 |
| 64 | Suction side | 0.46785 | 0.06064 | 0.50000 |
| 65 | Suction side | 0.47308 | 0.05214 | 0.50000 |
| 66 | Suction side | 0.47824 | 0.04361 | 0.50000 |
| 67 | Suction side | 0.48334 | 0.03505 | 0.50000 |
| 68 | Suction side | 0.48839 | 0.02645 | 0.50000 |
| 69 | Suction side | 0.49340 | 0.01782 | 0.50000 |
| 70 | Suction side | 0.49835 | 0.00916 | 0.50000 |
| 71 | Suction side | 0.50325 | 0.00048 | 0.50000 |
| 72 | Suction side | 0.50811 | −0.00823 | 0.50000 |
| 73 | Suction side | 0.51292 | −0.01697 | 0.50000 |
| 74 | Suction side | 0.51768 | −0.02573 | 0.50000 |
| 75 | Suction side | 0.52240 | −0.03453 | 0.50000 |
| 76 | Suction side | 0.52706 | −0.04333 | 0.50000 |
| 77 | Suction side | 0.53169 | −0.05217 | 0.50000 |
| 78 | Suction side | 0.53627 | −0.06102 | 0.50000 |
| 79 | Suction side | 0.54080 | −0.06990 | 0.50000 |
| 80 | Suction side | 0.54529 | −0.07881 | 0.50000 |
| 81 | Suction side | 0.54973 | −0.08774 | 0.50000 |
| 82 | Suction side | 0.55414 | −0.09669 | 0.50000 |
| 83 | Suction side | 0.55849 | −0.10566 | 0.50000 |
| 84 | Suction side | 0.56279 | −0.11466 | 0.50000 |
| 85 | Suction side | 0.56705 | −0.12368 | 0.50000 |
| 86 | Suction side | 0.57126 | −0.13272 | 0.50000 |
| 87 | Suction side | 0.57542 | −0.14178 | 0.50000 |
| 88 | Suction side | 0.57954 | −0.15086 | 0.50000 |
| 89 | Suction side | 0.58361 | −0.15997 | 0.50000 |
| 90 | Suction side | 0.58763 | −0.16909 | 0.50000 |
| 91 | Suction side | 0.59161 | −0.17824 | 0.50000 |
| 92 | Suction side | 0.59554 | −0.18740 | 0.50000 |
| 93 | Suction side | 0.59944 | −0.19658 | 0.50000 |
| 94 | Suction side | 0.60329 | −0.20578 | 0.50000 |
| 95 | Suction side | 0.60711 | −0.21500 | 0.50000 |
| 96 | Suction side | 0.61087 | −0.22422 | 0.50000 |
| 97 | Suction side | 0.61287 | −0.24458 | 0.50000 |
| 98 | Suction side | 0.61462 | −0.23347 | 0.50000 |
| 99 | Suction side | 0.61488 | −0.24119 | 0.50000 |
| 100 | Suction side | 0.61546 | −0.23731 | 0.50000 |
| 101 | Pressure side | 0.05884 | 0.08279 | 0.50000 |
| 102 | Pressure side | 0.06560 | 0.07990 | 0.50000 |
| 103 | Pressure side | 0.07270 | 0.07798 | 0.50000 |
| 104 | Pressure side | 0.07999 | 0.07708 | 0.50000 |
| 105 | Pressure side | 0.08734 | 0.07724 | 0.50000 |
| 106 | Pressure side | 0.09461 | 0.07839 | 0.50000 |
| 107 | Pressure side | 0.10172 | 0.08026 | 0.50000 |
| 108 | Pressure side | 0.10869 | 0.08261 | 0.50000 |
| 109 | Pressure side | 0.11555 | 0.08527 | 0.50000 |
| 110 | Pressure side | 0.12235 | 0.08809 | 0.50000 |
| 111 | Pressure side | 0.12912 | 0.09097 | 0.50000 |
| 112 | Pressure side | 0.13591 | 0.09381 | 0.50000 |
| 113 | Pressure side | 0.14273 | 0.09655 | 0.50000 |
| 114 | Pressure side | 0.14963 | 0.09914 | 0.50000 |
| 115 | Pressure side | 0.15657 | 0.10154 | 0.50000 |
| 116 | Pressure side | 0.16361 | 0.10372 | 0.50000 |
| 117 | Pressure side | 0.17072 | 0.10561 | 0.50000 |
| 118 | Pressure side | 0.17789 | 0.10723 | 0.50000 |
| 119 | Pressure side | 0.18513 | 0.10854 | 0.50000 |
| 120 | Pressure side | 0.19242 | 0.10950 | 0.50000 |
| 121 | Pressure side | 0.19976 | 0.11014 | 0.50000 |
| 122 | Pressure side | 0.20710 | 0.11043 | 0.50000 |
| 123 | Pressure side | 0.21447 | 0.11039 | 0.50000 |
| 124 | Pressure side | 0.22181 | 0.11000 | 0.50000 |
| 125 | Pressure side | 0.22913 | 0.10929 | 0.50000 |
| 126 | Pressure side | 0.23641 | 0.10826 | 0.50000 |
| 127 | Pressure side | 0.24365 | 0.10691 | 0.50000 |
| 128 | Pressure side | 0.25082 | 0.10528 | 0.50000 |
| 129 | Pressure side | 0.25793 | 0.10337 | 0.50000 |
| 130 | Pressure side | 0.26496 | 0.10120 | 0.50000 |
| 131 | Pressure side | 0.27192 | 0.09879 | 0.50000 |
| 132 | Pressure side | 0.27878 | 0.09616 | 0.50000 |
| 133 | Pressure side | 0.28557 | 0.09331 | 0.50000 |
| 134 | Pressure side | 0.29227 | 0.09027 | 0.50000 |
| 135 | Pressure side | 0.29887 | 0.08704 | 0.50000 |
| 136 | Pressure side | 0.30540 | 0.08363 | 0.50000 |
| 137 | Pressure side | 0.31183 | 0.08007 | 0.50000 |
| 138 | Pressure side | 0.31818 | 0.07635 | 0.50000 |
| 139 | Pressure side | 0.32445 | 0.07250 | 0.50000 |
| 140 | Pressure side | 0.33064 | 0.06852 | 0.50000 |
| 141 | Pressure side | 0.33676 | 0.06442 | 0.50000 |
| 142 | Pressure side | 0.34279 | 0.06020 | 0.50000 |
| 143 | Pressure side | 0.34874 | 0.05588 | 0.50000 |
| 144 | Pressure side | 0.35462 | 0.05146 | 0.50000 |
| 145 | Pressure side | 0.36043 | 0.04695 | 0.50000 |
| 146 | Pressure side | 0.36617 | 0.04235 | 0.50000 |
| 147 | Pressure side | 0.37185 | 0.03767 | 0.50000 |
| 148 | Pressure side | 0.37746 | 0.03291 | 0.50000 |
| 149 | Pressure side | 0.38302 | 0.02809 | 0.50000 |
| 150 | Pressure side | 0.38852 | 0.02319 | 0.50000 |
| 151 | Pressure side | 0.39395 | 0.01824 | 0.50000 |
| 152 | Pressure side | 0.39933 | 0.01322 | 0.50000 |
| 153 | Pressure side | 0.40466 | 0.00815 | 0.50000 |
| 154 | Pressure side | 0.40994 | 0.00303 | 0.50000 |
| 155 | Pressure side | 0.41517 | −0.00215 | 0.50000 |
| 156 | Pressure side | 0.42036 | −0.00738 | 0.50000 |
| 157 | Pressure side | 0.42549 | −0.01264 | 0.50000 |
| 158 | Pressure side | 0.43059 | −0.01795 | 0.50000 |
| 159 | Pressure side | 0.43562 | −0.02331 | 0.50000 |
| 160 | Pressure side | 0.44064 | −0.02870 | 0.50000 |
| 161 | Pressure side | 0.44560 | −0.03413 | 0.50000 |
| 162 | Pressure side | 0.45052 | −0.03960 | 0.50000 |
| 163 | Pressure side | 0.45542 | −0.04510 | 0.50000 |
| 164 | Pressure side | 0.46027 | −0.05063 | 0.50000 |
| 165 | Pressure side | 0.46507 | −0.05620 | 0.50000 |
| 166 | Pressure side | 0.46984 | −0.06180 | 0.50000 |

TABLE 1-continued

Non-Dimensionalized (X Y Z/Span Height)

| N | Location | X | Y | Z |
|---|---|---|---|---|
| 167 | Pressure side | 0.47459 | −0.06742 | 0.50000 |
| 168 | Pressure side | 0.47928 | −0.07308 | 0.50000 |
| 169 | Pressure side | 0.48395 | −0.07877 | 0.50000 |
| 170 | Pressure side | 0.48858 | −0.08449 | 0.50000 |
| 171 | Pressure side | 0.49319 | −0.09023 | 0.50000 |
| 172 | Pressure side | 0.49774 | −0.09601 | 0.50000 |
| 173 | Pressure side | 0.50227 | −0.10181 | 0.50000 |
| 174 | Pressure side | 0.50676 | −0.10763 | 0.50000 |
| 175 | Pressure side | 0.51121 | −0.11349 | 0.50000 |
| 176 | Pressure side | 0.51564 | −0.11938 | 0.50000 |
| 177 | Pressure side | 0.52002 | −0.12529 | 0.50000 |
| 178 | Pressure side | 0.52435 | −0.13122 | 0.50000 |
| 179 | Pressure side | 0.52867 | −0.13719 | 0.50000 |
| 180 | Pressure side | 0.53293 | −0.14319 | 0.50000 |
| 181 | Pressure side | 0.53716 | −0.14921 | 0.50000 |
| 182 | Pressure side | 0.54135 | −0.15526 | 0.50000 |
| 183 | Pressure side | 0.54548 | −0.16134 | 0.50000 |
| 184 | Pressure side | 0.54959 | −0.16745 | 0.50000 |
| 185 | Pressure side | 0.55366 | −0.17358 | 0.50000 |
| 186 | Pressure side | 0.55768 | −0.17974 | 0.50000 |
| 187 | Pressure side | 0.56167 | −0.18592 | 0.50000 |
| 188 | Pressure side | 0.56561 | −0.19213 | 0.50000 |
| 189 | Pressure side | 0.56953 | −0.19836 | 0.50000 |
| 190 | Pressure side | 0.57339 | −0.20462 | 0.50000 |
| 191 | Pressure side | 0.57724 | −0.21089 | 0.50000 |
| 192 | Pressure side | 0.58105 | −0.21719 | 0.50000 |
| 193 | Pressure side | 0.58484 | −0.22350 | 0.50000 |
| 194 | Pressure side | 0.58860 | −0.22982 | 0.50000 |
| 195 | Pressure side | 0.59234 | −0.23616 | 0.50000 |
| 196 | Pressure side | 0.59605 | −0.24252 | 0.50000 |
| 197 | Pressure side | 0.59858 | −0.24554 | 0.50000 |
| 198 | Pressure side | 0.60202 | −0.24748 | 0.50000 |
| 199 | Pressure side | 0.60594 | −0.24797 | 0.50000 |
| 200 | Pressure side | 0.60974 | −0.24694 | 0.50000 |
| 1 | Suction side | 0.04304 | 0.14010 | 0.60000 |
| 2 | Suction side | 0.04372 | 0.14994 | 0.60000 |
| 3 | Suction side | 0.04403 | 0.13029 | 0.60000 |
| 4 | Suction side | 0.04562 | 0.15964 | 0.60000 |
| 5 | Suction side | 0.04750 | 0.12109 | 0.60000 |
| 6 | Suction side | 0.04843 | 0.16910 | 0.60000 |
| 7 | Suction side | 0.05198 | 0.17831 | 0.60000 |
| 8 | Suction side | 0.05434 | 0.11410 | 0.60000 |
| 9 | Suction side | 0.05614 | 0.18727 | 0.60000 |
| 10 | Suction side | 0.06085 | 0.19596 | 0.60000 |
| 11 | Suction side | 0.06604 | 0.20435 | 0.60000 |
| 12 | Suction side | 0.07168 | 0.21246 | 0.60000 |
| 13 | Suction side | 0.07775 | 0.22025 | 0.60000 |
| 14 | Suction side | 0.08423 | 0.22771 | 0.60000 |
| 15 | Suction side | 0.09107 | 0.23482 | 0.60000 |
| 16 | Suction side | 0.09830 | 0.24156 | 0.60000 |
| 17 | Suction side | 0.10585 | 0.24791 | 0.60000 |
| 18 | Suction side | 0.11375 | 0.25384 | 0.60000 |
| 19 | Suction side | 0.12197 | 0.25932 | 0.60000 |
| 20 | Suction side | 0.13048 | 0.26433 | 0.60000 |
| 21 | Suction side | 0.13927 | 0.26882 | 0.60000 |
| 22 | Suction side | 0.14832 | 0.27278 | 0.60000 |
| 23 | Suction side | 0.15760 | 0.27616 | 0.60000 |
| 24 | Suction side | 0.16708 | 0.27895 | 0.60000 |
| 25 | Suction side | 0.17671 | 0.28111 | 0.60000 |
| 26 | Suction side | 0.18647 | 0.28265 | 0.60000 |
| 27 | Suction side | 0.19630 | 0.28353 | 0.60000 |
| 28 | Suction side | 0.20617 | 0.28376 | 0.60000 |
| 29 | Suction side | 0.21604 | 0.28334 | 0.60000 |
| 30 | Suction side | 0.22586 | 0.28230 | 0.60000 |
| 31 | Suction side | 0.23560 | 0.28063 | 0.60000 |
| 32 | Suction side | 0.24521 | 0.27839 | 0.60000 |
| 33 | Suction side | 0.25468 | 0.27559 | 0.60000 |
| 34 | Suction side | 0.26399 | 0.27228 | 0.60000 |
| 35 | Suction side | 0.27311 | 0.26849 | 0.60000 |
| 36 | Suction side | 0.28203 | 0.26426 | 0.60000 |
| 37 | Suction side | 0.29076 | 0.25963 | 0.60000 |
| 38 | Suction side | 0.29927 | 0.25463 | 0.60000 |
| 39 | Suction side | 0.30757 | 0.24928 | 0.60000 |
| 40 | Suction side | 0.31568 | 0.24364 | 0.60000 |
| 41 | Suction side | 0.32359 | 0.23772 | 0.60000 |
| 42 | Suction side | 0.33130 | 0.23155 | 0.60000 |
| 43 | Suction side | 0.33883 | 0.22515 | 0.60000 |
| 44 | Suction side | 0.34617 | 0.21855 | 0.60000 |
| 45 | Suction side | 0.35336 | 0.21177 | 0.60000 |
| 46 | Suction side | 0.36037 | 0.20482 | 0.60000 |
| 47 | Suction side | 0.36722 | 0.19771 | 0.60000 |
| 48 | Suction side | 0.37394 | 0.19046 | 0.60000 |
| 49 | Suction side | 0.38052 | 0.18310 | 0.60000 |
| 50 | Suction side | 0.38695 | 0.17560 | 0.60000 |
| 51 | Suction side | 0.39328 | 0.16802 | 0.60000 |
| 52 | Suction side | 0.39947 | 0.16033 | 0.60000 |
| 53 | Suction side | 0.40556 | 0.15255 | 0.60000 |
| 54 | Suction side | 0.41156 | 0.14469 | 0.60000 |
| 55 | Suction side | 0.41745 | 0.13677 | 0.60000 |
| 56 | Suction side | 0.42323 | 0.12878 | 0.60000 |
| 57 | Suction side | 0.42896 | 0.12071 | 0.60000 |
| 58 | Suction side | 0.43458 | 0.11261 | 0.60000 |
| 59 | Suction side | 0.44014 | 0.10444 | 0.60000 |
| 60 | Suction side | 0.44564 | 0.09622 | 0.60000 |
| 61 | Suction side | 0.45106 | 0.08797 | 0.60000 |
| 62 | Suction side | 0.45642 | 0.07967 | 0.60000 |
| 63 | Suction side | 0.46172 | 0.07134 | 0.60000 |
| 64 | Suction side | 0.46697 | 0.06297 | 0.60000 |
| 65 | Suction side | 0.47216 | 0.05457 | 0.60000 |
| 66 | Suction side | 0.47730 | 0.04614 | 0.60000 |
| 67 | Suction side | 0.48240 | 0.03768 | 0.60000 |
| 68 | Suction side | 0.48745 | 0.02920 | 0.60000 |
| 69 | Suction side | 0.49245 | 0.02067 | 0.60000 |
| 70 | Suction side | 0.49741 | 0.01214 | 0.60000 |
| 71 | Suction side | 0.50233 | 0.00357 | 0.60000 |
| 72 | Suction side | 0.50721 | −0.00501 | 0.60000 |
| 73 | Suction side | 0.51205 | −0.01362 | 0.60000 |
| 74 | Suction side | 0.51685 | −0.02226 | 0.60000 |
| 75 | Suction side | 0.52161 | −0.03091 | 0.60000 |
| 76 | Suction side | 0.52633 | −0.03960 | 0.60000 |
| 77 | Suction side | 0.53100 | −0.04829 | 0.60000 |
| 78 | Suction side | 0.53564 | −0.05702 | 0.60000 |
| 79 | Suction side | 0.54023 | −0.06576 | 0.60000 |
| 80 | Suction side | 0.54478 | −0.07452 | 0.60000 |
| 81 | Suction side | 0.54930 | −0.08331 | 0.60000 |
| 82 | Suction side | 0.55377 | −0.09211 | 0.60000 |
| 83 | Suction side | 0.55819 | −0.10094 | 0.60000 |
| 84 | Suction side | 0.56257 | −0.10980 | 0.60000 |
| 85 | Suction side | 0.56691 | −0.11868 | 0.60000 |
| 86 | Suction side | 0.57121 | −0.12757 | 0.60000 |
| 87 | Suction side | 0.57546 | −0.13649 | 0.60000 |
| 88 | Suction side | 0.57965 | −0.14543 | 0.60000 |
| 89 | Suction side | 0.58381 | −0.15438 | 0.60000 |
| 90 | Suction side | 0.58794 | −0.16337 | 0.60000 |
| 91 | Suction side | 0.59199 | −0.17236 | 0.60000 |
| 92 | Suction side | 0.59603 | −0.18138 | 0.60000 |
| 93 | Suction side | 0.60001 | −0.19042 | 0.60000 |
| 94 | Suction side | 0.60394 | −0.19948 | 0.60000 |
| 95 | Suction side | 0.60784 | −0.20855 | 0.60000 |
| 96 | Suction side | 0.61170 | −0.21765 | 0.60000 |
| 97 | Suction side | 0.61389 | −0.23767 | 0.60000 |
| 98 | Suction side | 0.61553 | −0.22676 | 0.60000 |
| 99 | Suction side | 0.61583 | −0.23434 | 0.60000 |
| 100 | Suction side | 0.61639 | −0.23052 | 0.60000 |
| 101 | Pressure side | 0.06073 | 0.11042 | 0.60000 |
| 102 | Pressure side | 0.06746 | 0.10743 | 0.60000 |
| 103 | Pressure side | 0.07452 | 0.10537 | 0.60000 |
| 104 | Pressure side | 0.08184 | 0.10449 | 0.60000 |
| 105 | Pressure side | 0.08919 | 0.10471 | 0.60000 |
| 106 | Pressure side | 0.09648 | 0.10579 | 0.60000 |
| 107 | Pressure side | 0.10365 | 0.10747 | 0.60000 |
| 108 | Pressure side | 0.11071 | 0.10954 | 0.60000 |
| 109 | Pressure side | 0.11772 | 0.11184 | 0.60000 |
| 110 | Pressure side | 0.12468 | 0.11424 | 0.60000 |
| 111 | Pressure side | 0.13165 | 0.11664 | 0.60000 |
| 112 | Pressure side | 0.13865 | 0.11896 | 0.60000 |
| 113 | Pressure side | 0.14568 | 0.12113 | 0.60000 |
| 114 | Pressure side | 0.15278 | 0.12310 | 0.60000 |
| 115 | Pressure side | 0.15994 | 0.12486 | 0.60000 |
| 116 | Pressure side | 0.16716 | 0.12633 | 0.60000 |
| 117 | Pressure side | 0.17443 | 0.12752 | 0.60000 |
| 118 | Pressure side | 0.18175 | 0.12839 | 0.60000 |

TABLE 1-continued

Non-Dimensionalized (X Y Z/Span Height)

| N | Location | X | Y | Z |
|---|---|---|---|---|
| 119 | Pressure side | 0.18909 | 0.12894 | 0.60000 |
| 120 | Pressure side | 0.19645 | 0.12916 | 0.60000 |
| 121 | Pressure side | 0.20382 | 0.12903 | 0.60000 |
| 122 | Pressure side | 0.21118 | 0.12857 | 0.60000 |
| 123 | Pressure side | 0.21850 | 0.12777 | 0.60000 |
| 124 | Pressure side | 0.22579 | 0.12665 | 0.60000 |
| 125 | Pressure side | 0.23301 | 0.12521 | 0.60000 |
| 126 | Pressure side | 0.24018 | 0.12348 | 0.60000 |
| 127 | Pressure side | 0.24726 | 0.12147 | 0.60000 |
| 128 | Pressure side | 0.25426 | 0.11918 | 0.60000 |
| 129 | Pressure side | 0.26118 | 0.11665 | 0.60000 |
| 130 | Pressure side | 0.26801 | 0.11389 | 0.60000 |
| 131 | Pressure side | 0.27475 | 0.11092 | 0.60000 |
| 132 | Pressure side | 0.28141 | 0.10775 | 0.60000 |
| 133 | Pressure side | 0.28797 | 0.10439 | 0.60000 |
| 134 | Pressure side | 0.29443 | 0.10087 | 0.60000 |
| 135 | Pressure side | 0.30082 | 0.09719 | 0.60000 |
| 136 | Pressure side | 0.30711 | 0.09336 | 0.60000 |
| 137 | Pressure side | 0.31332 | 0.08939 | 0.60000 |
| 138 | Pressure side | 0.31945 | 0.08531 | 0.60000 |
| 139 | Pressure side | 0.32551 | 0.08110 | 0.60000 |
| 140 | Pressure side | 0.33148 | 0.07679 | 0.60000 |
| 141 | Pressure side | 0.33738 | 0.07238 | 0.60000 |
| 142 | Pressure side | 0.34322 | 0.06788 | 0.60000 |
| 143 | Pressure side | 0.34898 | 0.06329 | 0.60000 |
| 144 | Pressure side | 0.35468 | 0.05862 | 0.60000 |
| 145 | Pressure side | 0.36033 | 0.05389 | 0.60000 |
| 146 | Pressure side | 0.36591 | 0.04908 | 0.60000 |
| 147 | Pressure side | 0.37143 | 0.04421 | 0.60000 |
| 148 | Pressure side | 0.37692 | 0.03927 | 0.60000 |
| 149 | Pressure side | 0.38234 | 0.03430 | 0.60000 |
| 150 | Pressure side | 0.38772 | 0.02926 | 0.60000 |
| 151 | Pressure side | 0.39305 | 0.02417 | 0.60000 |
| 152 | Pressure side | 0.39834 | 0.01903 | 0.60000 |
| 153 | Pressure side | 0.40358 | 0.01387 | 0.60000 |
| 154 | Pressure side | 0.40878 | 0.00865 | 0.60000 |
| 155 | Pressure side | 0.41395 | 0.00340 | 0.60000 |
| 156 | Pressure side | 0.41909 | −0.00190 | 0.60000 |
| 157 | Pressure side | 0.42418 | −0.00723 | 0.60000 |
| 158 | Pressure side | 0.42923 | −0.01258 | 0.60000 |
| 159 | Pressure side | 0.43425 | −0.01798 | 0.60000 |
| 160 | Pressure side | 0.43925 | −0.02339 | 0.60000 |
| 161 | Pressure side | 0.44420 | −0.02884 | 0.60000 |
| 162 | Pressure side | 0.44913 | −0.03432 | 0.60000 |
| 163 | Pressure side | 0.45403 | −0.03983 | 0.60000 |
| 164 | Pressure side | 0.45889 | −0.04536 | 0.60000 |
| 165 | Pressure side | 0.46373 | −0.05092 | 0.60000 |
| 166 | Pressure side | 0.46853 | −0.05651 | 0.60000 |
| 167 | Pressure side | 0.47330 | −0.06212 | 0.60000 |
| 168 | Pressure side | 0.47806 | −0.06775 | 0.60000 |
| 169 | Pressure side | 0.48277 | −0.07341 | 0.60000 |
| 170 | Pressure side | 0.48746 | −0.07910 | 0.60000 |
| 171 | Pressure side | 0.49212 | −0.08481 | 0.60000 |
| 172 | Pressure side | 0.49674 | −0.09055 | 0.60000 |
| 173 | Pressure side | 0.50133 | −0.09631 | 0.60000 |
| 174 | Pressure side | 0.50590 | −0.10209 | 0.60000 |
| 175 | Pressure side | 0.51043 | −0.10790 | 0.60000 |
| 176 | Pressure side | 0.51493 | −0.11374 | 0.60000 |
| 177 | Pressure side | 0.51938 | −0.11960 | 0.60000 |
| 178 | Pressure side | 0.52382 | −0.12549 | 0.60000 |
| 179 | Pressure side | 0.52821 | −0.13141 | 0.60000 |
| 180 | Pressure side | 0.53256 | −0.13735 | 0.60000 |
| 181 | Pressure side | 0.53689 | −0.14332 | 0.60000 |
| 182 | Pressure side | 0.54116 | −0.14932 | 0.60000 |
| 183 | Pressure side | 0.54541 | −0.15534 | 0.60000 |
| 184 | Pressure side | 0.54961 | −0.16139 | 0.60000 |
| 185 | Pressure side | 0.55377 | −0.16747 | 0.60000 |
| 186 | Pressure side | 0.55789 | −0.17358 | 0.60000 |
| 187 | Pressure side | 0.56197 | −0.17971 | 0.60000 |
| 188 | Pressure side | 0.56603 | −0.18587 | 0.60000 |
| 189 | Pressure side | 0.57004 | −0.19205 | 0.60000 |
| 190 | Pressure side | 0.57401 | −0.19826 | 0.60000 |
| 191 | Pressure side | 0.57795 | −0.20448 | 0.60000 |
| 192 | Pressure side | 0.58185 | −0.21073 | 0.60000 |
| 193 | Pressure side | 0.58573 | −0.21699 | 0.60000 |
| 194 | Pressure side | 0.58959 | −0.22327 | 0.60000 |
| 195 | Pressure side | 0.59342 | −0.22957 | 0.60000 |
| 196 | Pressure side | 0.59723 | −0.23588 | 0.60000 |
| 197 | Pressure side | 0.59978 | −0.23883 | 0.60000 |
| 198 | Pressure side | 0.60320 | −0.24067 | 0.60000 |
| 199 | Pressure side | 0.60708 | −0.24109 | 0.60000 |
| 200 | Pressure side | 0.61082 | −0.24002 | 0.60000 |
| 1 | Suction side | 0.04455 | 0.17371 | 0.70000 |
| 2 | Suction side | 0.04497 | 0.16398 | 0.70000 |
| 3 | Suction side | 0.04582 | 0.18336 | 0.70000 |
| 4 | Suction side | 0.04795 | 0.15475 | 0.70000 |
| 5 | Suction side | 0.04830 | 0.19279 | 0.70000 |
| 6 | Suction side | 0.05166 | 0.20194 | 0.70000 |
| 7 | Suction side | 0.05426 | 0.14745 | 0.70000 |
| 8 | Suction side | 0.05576 | 0.21079 | 0.70000 |
| 9 | Suction side | 0.06046 | 0.21931 | 0.70000 |
| 10 | Suction side | 0.06573 | 0.22753 | 0.70000 |
| 11 | Suction side | 0.07147 | 0.23541 | 0.70000 |
| 12 | Suction side | 0.07766 | 0.24294 | 0.70000 |
| 13 | Suction side | 0.08425 | 0.25011 | 0.70000 |
| 14 | Suction side | 0.09125 | 0.25690 | 0.70000 |
| 15 | Suction side | 0.09859 | 0.26332 | 0.70000 |
| 16 | Suction side | 0.10629 | 0.26929 | 0.70000 |
| 17 | Suction side | 0.11431 | 0.27484 | 0.70000 |
| 18 | Suction side | 0.12264 | 0.27990 | 0.70000 |
| 19 | Suction side | 0.13126 | 0.28446 | 0.70000 |
| 20 | Suction side | 0.14014 | 0.28849 | 0.70000 |
| 21 | Suction side | 0.14924 | 0.29196 | 0.70000 |
| 22 | Suction side | 0.15856 | 0.29484 | 0.70000 |
| 23 | Suction side | 0.16803 | 0.29710 | 0.70000 |
| 24 | Suction side | 0.17765 | 0.29874 | 0.70000 |
| 25 | Suction side | 0.18734 | 0.29972 | 0.70000 |
| 26 | Suction side | 0.19709 | 0.30004 | 0.70000 |
| 27 | Suction side | 0.20683 | 0.29971 | 0.70000 |
| 28 | Suction side | 0.21653 | 0.29873 | 0.70000 |
| 29 | Suction side | 0.22614 | 0.29712 | 0.70000 |
| 30 | Suction side | 0.23563 | 0.29490 | 0.70000 |
| 31 | Suction side | 0.24498 | 0.29213 | 0.70000 |
| 32 | Suction side | 0.25416 | 0.28882 | 0.70000 |
| 33 | Suction side | 0.26313 | 0.28502 | 0.70000 |
| 34 | Suction side | 0.27190 | 0.28077 | 0.70000 |
| 35 | Suction side | 0.28046 | 0.27610 | 0.70000 |
| 36 | Suction side | 0.28881 | 0.27106 | 0.70000 |
| 37 | Suction side | 0.29695 | 0.26569 | 0.70000 |
| 38 | Suction side | 0.30488 | 0.26003 | 0.70000 |
| 39 | Suction side | 0.31261 | 0.25409 | 0.70000 |
| 40 | Suction side | 0.32015 | 0.24791 | 0.70000 |
| 41 | Suction side | 0.32751 | 0.24151 | 0.70000 |
| 42 | Suction side | 0.33469 | 0.23492 | 0.70000 |
| 43 | Suction side | 0.34170 | 0.22815 | 0.70000 |
| 44 | Suction side | 0.34857 | 0.22122 | 0.70000 |
| 45 | Suction side | 0.35529 | 0.21416 | 0.70000 |
| 46 | Suction side | 0.36187 | 0.20696 | 0.70000 |
| 47 | Suction side | 0.36833 | 0.19966 | 0.70000 |
| 48 | Suction side | 0.37466 | 0.19226 | 0.70000 |
| 49 | Suction side | 0.38089 | 0.18475 | 0.70000 |
| 50 | Suction side | 0.38700 | 0.17716 | 0.70000 |
| 51 | Suction side | 0.39303 | 0.16950 | 0.70000 |
| 52 | Suction side | 0.39896 | 0.16176 | 0.70000 |
| 53 | Suction side | 0.40481 | 0.15395 | 0.70000 |
| 54 | Suction side | 0.41059 | 0.14610 | 0.70000 |
| 55 | Suction side | 0.41629 | 0.13819 | 0.70000 |
| 56 | Suction side | 0.42191 | 0.13023 | 0.70000 |
| 57 | Suction side | 0.42747 | 0.12221 | 0.70000 |
| 58 | Suction side | 0.43298 | 0.11416 | 0.70000 |
| 59 | Suction side | 0.43841 | 0.10607 | 0.70000 |
| 60 | Suction side | 0.44380 | 0.09795 | 0.70000 |
| 61 | Suction side | 0.44913 | 0.08979 | 0.70000 |
| 62 | Suction side | 0.45441 | 0.08159 | 0.70000 |
| 63 | Suction side | 0.45965 | 0.07338 | 0.70000 |
| 64 | Suction side | 0.46486 | 0.06512 | 0.70000 |
| 65 | Suction side | 0.47001 | 0.05684 | 0.70000 |
| 66 | Suction side | 0.47511 | 0.04854 | 0.70000 |
| 67 | Suction side | 0.48019 | 0.04021 | 0.70000 |
| 68 | Suction side | 0.48522 | 0.03187 | 0.70000 |
| 69 | Suction side | 0.49022 | 0.02350 | 0.70000 |
| 70 | Suction side | 0.49519 | 0.01510 | 0.70000 |

TABLE 1-continued

Non-Dimensionalized (X Y Z/Span Height)

| N | Location | X | Y | Z |
|---|---|---|---|---|
| 71 | Suction side | 0.50011 | 0.00668 | 0.70000 |
| 72 | Suction side | 0.50499 | −0.00176 | 0.70000 |
| 73 | Suction side | 0.50985 | −0.01020 | 0.70000 |
| 74 | Suction side | 0.51466 | −0.01869 | 0.70000 |
| 75 | Suction side | 0.51944 | −0.02719 | 0.70000 |
| 76 | Suction side | 0.52419 | −0.03570 | 0.70000 |
| 77 | Suction side | 0.52890 | −0.04424 | 0.70000 |
| 78 | Suction side | 0.53355 | −0.05281 | 0.70000 |
| 79 | Suction side | 0.53818 | −0.06138 | 0.70000 |
| 80 | Suction side | 0.54278 | −0.06999 | 0.70000 |
| 81 | Suction side | 0.54732 | −0.07860 | 0.70000 |
| 82 | Suction side | 0.55182 | −0.08725 | 0.70000 |
| 83 | Suction side | 0.55630 | −0.09592 | 0.70000 |
| 84 | Suction side | 0.56071 | −0.10461 | 0.70000 |
| 85 | Suction side | 0.56510 | −0.11332 | 0.70000 |
| 86 | Suction side | 0.56945 | −0.12205 | 0.70000 |
| 87 | Suction side | 0.57375 | −0.13080 | 0.70000 |
| 88 | Suction side | 0.57801 | −0.13956 | 0.70000 |
| 89 | Suction side | 0.58224 | −0.14835 | 0.70000 |
| 90 | Suction side | 0.58641 | −0.15716 | 0.70000 |
| 91 | Suction side | 0.59054 | −0.16599 | 0.70000 |
| 92 | Suction side | 0.59463 | −0.17484 | 0.70000 |
| 93 | Suction side | 0.59867 | −0.18372 | 0.70000 |
| 94 | Suction side | 0.60265 | −0.19262 | 0.70000 |
| 95 | Suction side | 0.60658 | −0.20154 | 0.70000 |
| 96 | Suction side | 0.61048 | −0.21047 | 0.70000 |
| 97 | Suction side | 0.61277 | −0.23030 | 0.70000 |
| 98 | Suction side | 0.61434 | −0.21943 | 0.70000 |
| 99 | Suction side | 0.61470 | −0.22697 | 0.70000 |
| 100 | Suction side | 0.61525 | −0.22317 | 0.70000 |
| 101 | Pressure side | 0.06043 | 0.14337 | 0.70000 |
| 102 | Pressure side | 0.06713 | 0.14026 | 0.70000 |
| 103 | Pressure side | 0.07428 | 0.13836 | 0.70000 |
| 104 | Pressure side | 0.08162 | 0.13754 | 0.70000 |
| 105 | Pressure side | 0.08902 | 0.13768 | 0.70000 |
| 106 | Pressure side | 0.09636 | 0.13857 | 0.70000 |
| 107 | Pressure side | 0.10364 | 0.13992 | 0.70000 |
| 108 | Pressure side | 0.11085 | 0.14154 | 0.70000 |
| 109 | Pressure side | 0.11805 | 0.14325 | 0.70000 |
| 110 | Pressure side | 0.12525 | 0.14496 | 0.70000 |
| 111 | Pressure side | 0.13248 | 0.14659 | 0.70000 |
| 112 | Pressure side | 0.13973 | 0.14806 | 0.70000 |
| 113 | Pressure side | 0.14702 | 0.14933 | 0.70000 |
| 114 | Pressure side | 0.15433 | 0.15039 | 0.70000 |
| 115 | Pressure side | 0.16170 | 0.15118 | 0.70000 |
| 116 | Pressure side | 0.16908 | 0.15170 | 0.70000 |
| 117 | Pressure side | 0.17647 | 0.15190 | 0.70000 |
| 118 | Pressure side | 0.18387 | 0.15181 | 0.70000 |
| 119 | Pressure side | 0.19126 | 0.15139 | 0.70000 |
| 120 | Pressure side | 0.19862 | 0.15067 | 0.70000 |
| 121 | Pressure side | 0.20594 | 0.14963 | 0.70000 |
| 122 | Pressure side | 0.21322 | 0.14828 | 0.70000 |
| 123 | Pressure side | 0.22043 | 0.14664 | 0.70000 |
| 124 | Pressure side | 0.22758 | 0.14470 | 0.70000 |
| 125 | Pressure side | 0.23464 | 0.14250 | 0.70000 |
| 126 | Pressure side | 0.24163 | 0.14005 | 0.70000 |
| 127 | Pressure side | 0.24852 | 0.13736 | 0.70000 |
| 128 | Pressure side | 0.25531 | 0.13444 | 0.70000 |
| 129 | Pressure side | 0.26202 | 0.13131 | 0.70000 |
| 130 | Pressure side | 0.26863 | 0.12799 | 0.70000 |
| 131 | Pressure side | 0.27515 | 0.12449 | 0.70000 |
| 132 | Pressure side | 0.28157 | 0.12081 | 0.70000 |
| 133 | Pressure side | 0.28791 | 0.11700 | 0.70000 |
| 134 | Pressure side | 0.29415 | 0.11303 | 0.70000 |
| 135 | Pressure side | 0.30031 | 0.10892 | 0.70000 |
| 136 | Pressure side | 0.30639 | 0.10470 | 0.70000 |
| 137 | Pressure side | 0.31238 | 0.10036 | 0.70000 |
| 138 | Pressure side | 0.31831 | 0.09592 | 0.70000 |
| 139 | Pressure side | 0.32416 | 0.09139 | 0.70000 |
| 140 | Pressure side | 0.32994 | 0.08677 | 0.70000 |
| 141 | Pressure side | 0.33565 | 0.08206 | 0.70000 |
| 142 | Pressure side | 0.34131 | 0.07729 | 0.70000 |
| 143 | Pressure side | 0.34689 | 0.07245 | 0.70000 |
| 144 | Pressure side | 0.35244 | 0.06755 | 0.70000 |
| 145 | Pressure side | 0.35792 | 0.06259 | 0.70000 |
| 146 | Pressure side | 0.36337 | 0.05756 | 0.70000 |
| 147 | Pressure side | 0.36876 | 0.05250 | 0.70000 |
| 148 | Pressure side | 0.37410 | 0.04739 | 0.70000 |
| 149 | Pressure side | 0.37942 | 0.04223 | 0.70000 |
| 150 | Pressure side | 0.38469 | 0.03704 | 0.70000 |
| 151 | Pressure side | 0.38993 | 0.03182 | 0.70000 |
| 152 | Pressure side | 0.39513 | 0.02655 | 0.70000 |
| 153 | Pressure side | 0.40031 | 0.02126 | 0.70000 |
| 154 | Pressure side | 0.40545 | 0.01594 | 0.70000 |
| 155 | Pressure side | 0.41056 | 0.01058 | 0.70000 |
| 156 | Pressure side | 0.41564 | 0.00522 | 0.70000 |
| 157 | Pressure side | 0.42070 | −0.00019 | 0.70000 |
| 158 | Pressure side | 0.42573 | −0.00561 | 0.70000 |
| 159 | Pressure side | 0.43074 | −0.01107 | 0.70000 |
| 160 | Pressure side | 0.43571 | −0.01654 | 0.70000 |
| 161 | Pressure side | 0.44067 | −0.02203 | 0.70000 |
| 162 | Pressure side | 0.44561 | −0.02754 | 0.70000 |
| 163 | Pressure side | 0.45052 | −0.03309 | 0.70000 |
| 164 | Pressure side | 0.45541 | −0.03865 | 0.70000 |
| 165 | Pressure side | 0.46027 | −0.04422 | 0.70000 |
| 166 | Pressure side | 0.46510 | −0.04983 | 0.70000 |
| 167 | Pressure side | 0.46991 | −0.05544 | 0.70000 |
| 168 | Pressure side | 0.47469 | −0.06109 | 0.70000 |
| 169 | Pressure side | 0.47945 | −0.06676 | 0.70000 |
| 170 | Pressure side | 0.48418 | −0.07245 | 0.70000 |
| 171 | Pressure side | 0.48889 | −0.07816 | 0.70000 |
| 172 | Pressure side | 0.49357 | −0.08388 | 0.70000 |
| 173 | Pressure side | 0.49823 | −0.08965 | 0.70000 |
| 174 | Pressure side | 0.50284 | −0.09542 | 0.70000 |
| 175 | Pressure side | 0.50744 | −0.10122 | 0.70000 |
| 176 | Pressure side | 0.51199 | −0.10705 | 0.70000 |
| 177 | Pressure side | 0.51653 | −0.11290 | 0.70000 |
| 178 | Pressure side | 0.52102 | −0.11878 | 0.70000 |
| 179 | Pressure side | 0.52549 | −0.12468 | 0.70000 |
| 180 | Pressure side | 0.52993 | −0.13061 | 0.70000 |
| 181 | Pressure side | 0.53432 | −0.13655 | 0.70000 |
| 182 | Pressure side | 0.53868 | −0.14253 | 0.70000 |
| 183 | Pressure side | 0.54300 | −0.14853 | 0.70000 |
| 184 | Pressure side | 0.54730 | −0.15456 | 0.70000 |
| 185 | Pressure side | 0.55155 | −0.16062 | 0.70000 |
| 186 | Pressure side | 0.55578 | −0.16669 | 0.70000 |
| 187 | Pressure side | 0.55996 | −0.17279 | 0.70000 |
| 188 | Pressure side | 0.56411 | −0.17892 | 0.70000 |
| 189 | Pressure side | 0.56823 | −0.18507 | 0.70000 |
| 190 | Pressure side | 0.57231 | −0.19124 | 0.70000 |
| 191 | Pressure side | 0.57636 | −0.19743 | 0.70000 |
| 192 | Pressure side | 0.58038 | −0.20365 | 0.70000 |
| 193 | Pressure side | 0.58436 | −0.20989 | 0.70000 |
| 194 | Pressure side | 0.58832 | −0.21613 | 0.70000 |
| 195 | Pressure side | 0.59225 | −0.22240 | 0.70000 |
| 196 | Pressure side | 0.59614 | −0.22870 | 0.70000 |
| 197 | Pressure side | 0.59871 | −0.23160 | 0.70000 |
| 198 | Pressure side | 0.60216 | −0.23338 | 0.70000 |
| 199 | Pressure side | 0.60601 | −0.23375 | 0.70000 |
| 200 | Pressure side | 0.60973 | −0.23266 | 0.70000 |
| 1 | Suction side | 0.04563 | 0.20565 | 0.80000 |
| 2 | Suction side | 0.04609 | 0.21519 | 0.80000 |
| 3 | Suction side | 0.04779 | 0.19638 | 0.80000 |
| 4 | Suction side | 0.04829 | 0.22450 | 0.80000 |
| 5 | Suction side | 0.05166 | 0.23345 | 0.80000 |
| 6 | Suction side | 0.05339 | 0.18872 | 0.80000 |
| 7 | Suction side | 0.05595 | 0.24201 | 0.80000 |
| 8 | Suction side | 0.06095 | 0.25016 | 0.80000 |
| 9 | Suction side | 0.06654 | 0.25792 | 0.80000 |
| 10 | Suction side | 0.07268 | 0.26527 | 0.80000 |
| 11 | Suction side | 0.07927 | 0.27222 | 0.80000 |
| 12 | Suction side | 0.08626 | 0.27875 | 0.80000 |
| 13 | Suction side | 0.09365 | 0.28483 | 0.80000 |
| 14 | Suction side | 0.10139 | 0.29046 | 0.80000 |
| 15 | Suction side | 0.10944 | 0.29563 | 0.80000 |
| 16 | Suction side | 0.11780 | 0.30031 | 0.80000 |
| 17 | Suction side | 0.12641 | 0.30447 | 0.80000 |
| 18 | Suction side | 0.13526 | 0.30809 | 0.80000 |
| 19 | Suction side | 0.14433 | 0.31116 | 0.80000 |
| 20 | Suction side | 0.15357 | 0.31365 | 0.80000 |
| 21 | Suction side | 0.16296 | 0.31555 | 0.80000 |
| 22 | Suction side | 0.17244 | 0.31682 | 0.80000 |

TABLE 1-continued

| | Non-Dimensionalized (X Y Z/Span Height) | | | |
|---|---|---|---|---|
| N | Location | X | Y | Z |
| 23 | Suction side | 0.18199 | 0.31748 | 0.80000 |
| 24 | Suction side | 0.19156 | 0.31751 | 0.80000 |
| 25 | Suction side | 0.20111 | 0.31690 | 0.80000 |
| 26 | Suction side | 0.21060 | 0.31568 | 0.80000 |
| 27 | Suction side | 0.21999 | 0.31386 | 0.80000 |
| 28 | Suction side | 0.22926 | 0.31145 | 0.80000 |
| 29 | Suction side | 0.23836 | 0.30849 | 0.80000 |
| 30 | Suction side | 0.24727 | 0.30502 | 0.80000 |
| 31 | Suction side | 0.25599 | 0.30107 | 0.80000 |
| 32 | Suction side | 0.26450 | 0.29668 | 0.80000 |
| 33 | Suction side | 0.27278 | 0.29189 | 0.80000 |
| 34 | Suction side | 0.28086 | 0.28674 | 0.80000 |
| 35 | Suction side | 0.28871 | 0.28127 | 0.80000 |
| 36 | Suction side | 0.29634 | 0.27550 | 0.80000 |
| 37 | Suction side | 0.30378 | 0.26947 | 0.80000 |
| 38 | Suction side | 0.31103 | 0.26323 | 0.80000 |
| 39 | Suction side | 0.31809 | 0.25676 | 0.80000 |
| 40 | Suction side | 0.32499 | 0.25012 | 0.80000 |
| 41 | Suction side | 0.33173 | 0.24333 | 0.80000 |
| 42 | Suction side | 0.33832 | 0.23639 | 0.80000 |
| 43 | Suction side | 0.34477 | 0.22932 | 0.80000 |
| 44 | Suction side | 0.35110 | 0.22214 | 0.80000 |
| 45 | Suction side | 0.35731 | 0.21486 | 0.80000 |
| 46 | Suction side | 0.36343 | 0.20750 | 0.80000 |
| 47 | Suction side | 0.36944 | 0.20004 | 0.80000 |
| 48 | Suction side | 0.37536 | 0.19252 | 0.80000 |
| 49 | Suction side | 0.38120 | 0.18494 | 0.80000 |
| 50 | Suction side | 0.38697 | 0.17730 | 0.80000 |
| 51 | Suction side | 0.39266 | 0.16961 | 0.80000 |
| 52 | Suction side | 0.39830 | 0.16186 | 0.80000 |
| 53 | Suction side | 0.40387 | 0.15409 | 0.80000 |
| 54 | Suction side | 0.40939 | 0.14627 | 0.80000 |
| 55 | Suction side | 0.41486 | 0.13842 | 0.80000 |
| 56 | Suction side | 0.42028 | 0.13053 | 0.80000 |
| 57 | Suction side | 0.42566 | 0.12261 | 0.80000 |
| 58 | Suction side | 0.43101 | 0.11467 | 0.80000 |
| 59 | Suction side | 0.43631 | 0.10669 | 0.80000 |
| 60 | Suction side | 0.44158 | 0.09870 | 0.80000 |
| 61 | Suction side | 0.44681 | 0.09069 | 0.80000 |
| 62 | Suction side | 0.45200 | 0.08265 | 0.80000 |
| 63 | Suction side | 0.45715 | 0.07458 | 0.80000 |
| 64 | Suction side | 0.46228 | 0.06649 | 0.80000 |
| 65 | Suction side | 0.46738 | 0.05839 | 0.80000 |
| 66 | Suction side | 0.47244 | 0.05027 | 0.80000 |
| 67 | Suction side | 0.47746 | 0.04213 | 0.80000 |
| 68 | Suction side | 0.48246 | 0.03397 | 0.80000 |
| 69 | Suction side | 0.48743 | 0.02579 | 0.80000 |
| 70 | Suction side | 0.49236 | 0.01758 | 0.80000 |
| 71 | Suction side | 0.49726 | 0.00936 | 0.80000 |
| 72 | Suction side | 0.50213 | 0.00112 | 0.80000 |
| 73 | Suction side | 0.50696 | −0.00715 | 0.80000 |
| 74 | Suction side | 0.51176 | −0.01543 | 0.80000 |
| 75 | Suction side | 0.51653 | −0.02373 | 0.80000 |
| 76 | Suction side | 0.52126 | −0.03204 | 0.80000 |
| 77 | Suction side | 0.52596 | −0.04039 | 0.80000 |
| 78 | Suction side | 0.53061 | −0.04875 | 0.80000 |
| 79 | Suction side | 0.53523 | −0.05713 | 0.80000 |
| 80 | Suction side | 0.53981 | −0.06554 | 0.80000 |
| 81 | Suction side | 0.54437 | −0.07396 | 0.80000 |
| 82 | Suction side | 0.54887 | −0.08241 | 0.80000 |
| 83 | Suction side | 0.55333 | −0.09088 | 0.80000 |
| 84 | Suction side | 0.55776 | −0.09937 | 0.80000 |
| 85 | Suction side | 0.56214 | −0.10788 | 0.80000 |
| 86 | Suction side | 0.56649 | −0.11640 | 0.80000 |
| 87 | Suction side | 0.57079 | −0.12495 | 0.80000 |
| 88 | Suction side | 0.57505 | −0.13352 | 0.80000 |
| 89 | Suction side | 0.57927 | −0.14211 | 0.80000 |
| 90 | Suction side | 0.58344 | −0.15072 | 0.80000 |
| 91 | Suction side | 0.58758 | −0.15936 | 0.80000 |
| 92 | Suction side | 0.59169 | −0.16801 | 0.80000 |
| 93 | Suction side | 0.59575 | −0.17667 | 0.80000 |
| 94 | Suction side | 0.59977 | −0.18536 | 0.80000 |
| 95 | Suction side | 0.60375 | −0.19406 | 0.80000 |
| 96 | Suction side | 0.60769 | −0.20279 | 0.80000 |
| 97 | Suction side | 0.61011 | −0.22240 | 0.80000 |
| 98 | Suction side | 0.61160 | −0.21153 | 0.80000 |
| 99 | Suction side | 0.61202 | −0.21907 | 0.80000 |
| 100 | Suction side | 0.61253 | −0.21526 | 0.80000 |
| 101 | Pressure side | 0.05940 | 0.18432 | 0.80000 |
| 102 | Pressure side | 0.06602 | 0.18093 | 0.80000 |
| 103 | Pressure side | 0.07315 | 0.17876 | 0.80000 |
| 104 | Pressure side | 0.08051 | 0.17765 | 0.80000 |
| 105 | Pressure side | 0.08795 | 0.17731 | 0.80000 |
| 106 | Pressure side | 0.09540 | 0.17749 | 0.80000 |
| 107 | Pressure side | 0.10283 | 0.17797 | 0.80000 |
| 108 | Pressure side | 0.11025 | 0.17859 | 0.80000 |
| 109 | Pressure side | 0.11768 | 0.17919 | 0.80000 |
| 110 | Pressure side | 0.12511 | 0.17971 | 0.80000 |
| 111 | Pressure side | 0.13255 | 0.18008 | 0.80000 |
| 112 | Pressure side | 0.14001 | 0.18026 | 0.80000 |
| 113 | Pressure side | 0.14746 | 0.18023 | 0.80000 |
| 114 | Pressure side | 0.15491 | 0.17998 | 0.80000 |
| 115 | Pressure side | 0.16234 | 0.17947 | 0.80000 |
| 116 | Pressure side | 0.16975 | 0.17872 | 0.80000 |
| 117 | Pressure side | 0.17713 | 0.17772 | 0.80000 |
| 118 | Pressure side | 0.18447 | 0.17643 | 0.80000 |
| 119 | Pressure side | 0.19176 | 0.17489 | 0.80000 |
| 120 | Pressure side | 0.19900 | 0.17308 | 0.80000 |
| 121 | Pressure side | 0.20616 | 0.17104 | 0.80000 |
| 122 | Pressure side | 0.21325 | 0.16873 | 0.80000 |
| 123 | Pressure side | 0.22024 | 0.16619 | 0.80000 |
| 124 | Pressure side | 0.22716 | 0.16344 | 0.80000 |
| 125 | Pressure side | 0.23401 | 0.16048 | 0.80000 |
| 126 | Pressure side | 0.24075 | 0.15731 | 0.80000 |
| 127 | Pressure side | 0.24740 | 0.15395 | 0.80000 |
| 128 | Pressure side | 0.25397 | 0.15043 | 0.80000 |
| 129 | Pressure side | 0.26043 | 0.14673 | 0.80000 |
| 130 | Pressure side | 0.26681 | 0.14288 | 0.80000 |
| 131 | Pressure side | 0.27310 | 0.13889 | 0.80000 |
| 132 | Pressure side | 0.27931 | 0.13476 | 0.80000 |
| 133 | Pressure side | 0.28543 | 0.13049 | 0.80000 |
| 134 | Pressure side | 0.29146 | 0.12613 | 0.80000 |
| 135 | Pressure side | 0.29741 | 0.12164 | 0.80000 |
| 136 | Pressure side | 0.30329 | 0.11707 | 0.80000 |
| 137 | Pressure side | 0.30909 | 0.11239 | 0.80000 |
| 138 | Pressure side | 0.31482 | 0.10765 | 0.80000 |
| 139 | Pressure side | 0.32050 | 0.10281 | 0.80000 |
| 140 | Pressure side | 0.32611 | 0.09790 | 0.80000 |
| 141 | Pressure side | 0.33167 | 0.09294 | 0.80000 |
| 142 | Pressure side | 0.33716 | 0.08790 | 0.80000 |
| 143 | Pressure side | 0.34261 | 0.08283 | 0.80000 |
| 144 | Pressure side | 0.34801 | 0.07770 | 0.80000 |
| 145 | Pressure side | 0.35338 | 0.07252 | 0.80000 |
| 146 | Pressure side | 0.35870 | 0.06731 | 0.80000 |
| 147 | Pressure side | 0.36398 | 0.06205 | 0.80000 |
| 148 | Pressure side | 0.36923 | 0.05677 | 0.80000 |
| 149 | Pressure side | 0.37446 | 0.05146 | 0.80000 |
| 150 | Pressure side | 0.37965 | 0.04611 | 0.80000 |
| 151 | Pressure side | 0.38482 | 0.04075 | 0.80000 |
| 152 | Pressure side | 0.38997 | 0.03535 | 0.80000 |
| 153 | Pressure side | 0.39508 | 0.02995 | 0.80000 |
| 154 | Pressure side | 0.40018 | 0.02451 | 0.80000 |
| 155 | Pressure side | 0.40526 | 0.01906 | 0.80000 |
| 156 | Pressure side | 0.41032 | 0.01359 | 0.80000 |
| 157 | Pressure side | 0.41536 | 0.00810 | 0.80000 |
| 158 | Pressure side | 0.42038 | 0.00260 | 0.80000 |
| 159 | Pressure side | 0.42540 | −0.00291 | 0.80000 |
| 160 | Pressure side | 0.43038 | −0.00845 | 0.80000 |
| 161 | Pressure side | 0.43536 | −0.01401 | 0.80000 |
| 162 | Pressure side | 0.44031 | −0.01957 | 0.80000 |
| 163 | Pressure side | 0.44524 | −0.02515 | 0.80000 |
| 164 | Pressure side | 0.45015 | −0.03075 | 0.80000 |
| 165 | Pressure side | 0.45505 | −0.03637 | 0.80000 |
| 166 | Pressure side | 0.45993 | −0.04201 | 0.80000 |
| 167 | Pressure side | 0.46478 | −0.04765 | 0.80000 |
| 168 | Pressure side | 0.46962 | −0.05333 | 0.80000 |
| 169 | Pressure side | 0.47442 | −0.05903 | 0.80000 |
| 170 | Pressure side | 0.47921 | −0.06474 | 0.80000 |
| 171 | Pressure side | 0.48398 | −0.07046 | 0.80000 |
| 172 | Pressure side | 0.48871 | −0.07621 | 0.80000 |
| 173 | Pressure side | 0.49342 | −0.08199 | 0.80000 |
| 174 | Pressure side | 0.49810 | −0.08779 | 0.80000 |

TABLE 1-continued

Non-Dimensionalized (X Y Z/Span Height)

| N | Location | X | Y | Z |
|---|---|---|---|---|
| 175 | Pressure side | 0.50275 | −0.09360 | 0.80000 |
| 176 | Pressure side | 0.50737 | −0.09945 | 0.80000 |
| 177 | Pressure side | 0.51198 | −0.10532 | 0.80000 |
| 178 | Pressure side | 0.51654 | −0.11120 | 0.80000 |
| 179 | Pressure side | 0.52107 | −0.11711 | 0.80000 |
| 180 | Pressure side | 0.52558 | −0.12305 | 0.80000 |
| 181 | Pressure side | 0.53005 | −0.12901 | 0.80000 |
| 182 | Pressure side | 0.53449 | −0.13498 | 0.80000 |
| 183 | Pressure side | 0.53891 | −0.14099 | 0.80000 |
| 184 | Pressure side | 0.54330 | −0.14702 | 0.80000 |
| 185 | Pressure side | 0.54763 | −0.15307 | 0.80000 |
| 186 | Pressure side | 0.55196 | −0.15914 | 0.80000 |
| 187 | Pressure side | 0.55625 | −0.16524 | 0.80000 |
| 188 | Pressure side | 0.56050 | −0.17135 | 0.80000 |
| 189 | Pressure side | 0.56472 | −0.17749 | 0.80000 |
| 190 | Pressure side | 0.56892 | −0.18366 | 0.80000 |
| 191 | Pressure side | 0.57308 | −0.18983 | 0.80000 |
| 192 | Pressure side | 0.57721 | −0.19603 | 0.80000 |
| 193 | Pressure side | 0.58131 | −0.20225 | 0.80000 |
| 194 | Pressure side | 0.58537 | −0.20850 | 0.80000 |
| 195 | Pressure side | 0.58940 | −0.21477 | 0.80000 |
| 196 | Pressure side | 0.59341 | −0.22106 | 0.80000 |
| 197 | Pressure side | 0.59603 | −0.22393 | 0.80000 |
| 198 | Pressure side | 0.59951 | −0.22565 | 0.80000 |
| 199 | Pressure side | 0.60338 | −0.22595 | 0.80000 |
| 200 | Pressure side | 0.60709 | −0.22480 | 0.80000 |
| 1 | Suction side | 0.04899 | 0.26035 | 0.90000 |
| 2 | Suction side | 0.04999 | 0.25110 | 0.90000 |
| 3 | Suction side | 0.05071 | 0.26950 | 0.90000 |
| 4 | Suction side | 0.05423 | 0.27814 | 0.90000 |
| 5 | Suction side | 0.05446 | 0.24300 | 0.90000 |
| 6 | Suction side | 0.05899 | 0.28616 | 0.90000 |
| 7 | Suction side | 0.06465 | 0.29358 | 0.90000 |
| 8 | Suction side | 0.07102 | 0.30040 | 0.90000 |
| 9 | Suction side | 0.07797 | 0.30664 | 0.90000 |
| 10 | Suction side | 0.08538 | 0.31232 | 0.90000 |
| 11 | Suction side | 0.09320 | 0.31741 | 0.90000 |
| 12 | Suction side | 0.10136 | 0.32194 | 0.90000 |
| 13 | Suction side | 0.10982 | 0.32589 | 0.90000 |
| 14 | Suction side | 0.11852 | 0.32928 | 0.90000 |
| 15 | Suction side | 0.12743 | 0.33207 | 0.90000 |
| 16 | Suction side | 0.13650 | 0.33429 | 0.90000 |
| 17 | Suction side | 0.14570 | 0.33590 | 0.90000 |
| 18 | Suction side | 0.15497 | 0.33693 | 0.90000 |
| 19 | Suction side | 0.16429 | 0.33738 | 0.90000 |
| 20 | Suction side | 0.17363 | 0.33723 | 0.90000 |
| 21 | Suction side | 0.18294 | 0.33651 | 0.90000 |
| 22 | Suction side | 0.19219 | 0.33523 | 0.90000 |
| 23 | Suction side | 0.20135 | 0.33341 | 0.90000 |
| 24 | Suction side | 0.21038 | 0.33107 | 0.90000 |
| 25 | Suction side | 0.21928 | 0.32823 | 0.90000 |
| 26 | Suction side | 0.22801 | 0.32492 | 0.90000 |
| 27 | Suction side | 0.23656 | 0.32118 | 0.90000 |
| 28 | Suction side | 0.24492 | 0.31702 | 0.90000 |
| 29 | Suction side | 0.25308 | 0.31248 | 0.90000 |
| 30 | Suction side | 0.26104 | 0.30760 | 0.90000 |
| 31 | Suction side | 0.26880 | 0.30241 | 0.90000 |
| 32 | Suction side | 0.27636 | 0.29693 | 0.90000 |
| 33 | Suction side | 0.28372 | 0.29119 | 0.90000 |
| 34 | Suction side | 0.29091 | 0.28522 | 0.90000 |
| 35 | Suction side | 0.29790 | 0.27905 | 0.90000 |
| 36 | Suction side | 0.30475 | 0.27269 | 0.90000 |
| 37 | Suction side | 0.31143 | 0.26617 | 0.90000 |
| 38 | Suction side | 0.31797 | 0.25950 | 0.90000 |
| 39 | Suction side | 0.32438 | 0.25271 | 0.90000 |
| 40 | Suction side | 0.33065 | 0.24580 | 0.90000 |
| 41 | Suction side | 0.33682 | 0.23879 | 0.90000 |
| 42 | Suction side | 0.34289 | 0.23169 | 0.90000 |
| 43 | Suction side | 0.34885 | 0.22452 | 0.90000 |
| 44 | Suction side | 0.35474 | 0.21727 | 0.90000 |
| 45 | Suction side | 0.36054 | 0.20995 | 0.90000 |
| 46 | Suction side | 0.36628 | 0.20257 | 0.90000 |
| 47 | Suction side | 0.37194 | 0.19516 | 0.90000 |
| 48 | Suction side | 0.37754 | 0.18769 | 0.90000 |
| 49 | Suction side | 0.38310 | 0.18017 | 0.90000 |
| 50 | Suction side | 0.38859 | 0.17263 | 0.90000 |
| 51 | Suction side | 0.39404 | 0.16504 | 0.90000 |
| 52 | Suction side | 0.39945 | 0.15744 | 0.90000 |
| 53 | Suction side | 0.40481 | 0.14979 | 0.90000 |
| 54 | Suction side | 0.41014 | 0.14212 | 0.90000 |
| 55 | Suction side | 0.41544 | 0.13444 | 0.90000 |
| 56 | Suction side | 0.42070 | 0.12672 | 0.90000 |
| 57 | Suction side | 0.42593 | 0.11898 | 0.90000 |
| 58 | Suction side | 0.43113 | 0.11123 | 0.90000 |
| 59 | Suction side | 0.43630 | 0.10345 | 0.90000 |
| 60 | Suction side | 0.44144 | 0.09566 | 0.90000 |
| 61 | Suction side | 0.44655 | 0.08785 | 0.90000 |
| 62 | Suction side | 0.45164 | 0.08002 | 0.90000 |
| 63 | Suction side | 0.45670 | 0.07217 | 0.90000 |
| 64 | Suction side | 0.46174 | 0.06431 | 0.90000 |
| 65 | Suction side | 0.46674 | 0.05642 | 0.90000 |
| 66 | Suction side | 0.47171 | 0.04852 | 0.90000 |
| 67 | Suction side | 0.47666 | 0.04061 | 0.90000 |
| 68 | Suction side | 0.48159 | 0.03267 | 0.90000 |
| 69 | Suction side | 0.48647 | 0.02472 | 0.90000 |
| 70 | Suction side | 0.49133 | 0.01674 | 0.90000 |
| 71 | Suction side | 0.49616 | 0.00875 | 0.90000 |
| 72 | Suction side | 0.50097 | 0.00074 | 0.90000 |
| 73 | Suction side | 0.50574 | −0.00729 | 0.90000 |
| 74 | Suction side | 0.51048 | −0.01533 | 0.90000 |
| 75 | Suction side | 0.51518 | −0.02339 | 0.90000 |
| 76 | Suction side | 0.51986 | −0.03148 | 0.90000 |
| 77 | Suction side | 0.52449 | −0.03958 | 0.90000 |
| 78 | Suction side | 0.52910 | −0.04770 | 0.90000 |
| 79 | Suction side | 0.53368 | −0.05585 | 0.90000 |
| 80 | Suction side | 0.53821 | −0.06401 | 0.90000 |
| 81 | Suction side | 0.54271 | −0.07219 | 0.90000 |
| 82 | Suction side | 0.54716 | −0.08040 | 0.90000 |
| 83 | Suction side | 0.55158 | −0.08863 | 0.90000 |
| 84 | Suction side | 0.55597 | −0.09687 | 0.90000 |
| 85 | Suction side | 0.56030 | −0.10514 | 0.90000 |
| 86 | Suction side | 0.56460 | −0.11342 | 0.90000 |
| 87 | Suction side | 0.56887 | −0.12173 | 0.90000 |
| 88 | Suction side | 0.57308 | −0.13006 | 0.90000 |
| 89 | Suction side | 0.57726 | −0.13842 | 0.90000 |
| 90 | Suction side | 0.58140 | −0.14679 | 0.90000 |
| 91 | Suction side | 0.58548 | −0.15519 | 0.90000 |
| 92 | Suction side | 0.58954 | −0.16359 | 0.90000 |
| 93 | Suction side | 0.59355 | −0.17203 | 0.90000 |
| 94 | Suction side | 0.59753 | −0.18048 | 0.90000 |
| 95 | Suction side | 0.60146 | −0.18894 | 0.90000 |
| 96 | Suction side | 0.60536 | −0.19742 | 0.90000 |
| 97 | Suction side | 0.60783 | −0.21672 | 0.90000 |
| 98 | Suction side | 0.60923 | −0.20592 | 0.90000 |
| 99 | Suction side | 0.60969 | −0.21340 | 0.90000 |
| 100 | Suction side | 0.61017 | −0.20962 | 0.90000 |
| 101 | Pressure side | 0.06001 | 0.23787 | 0.90000 |
| 102 | Pressure side | 0.06637 | 0.23380 | 0.90000 |
| 103 | Pressure side | 0.07319 | 0.23053 | 0.90000 |
| 104 | Pressure side | 0.08026 | 0.22785 | 0.90000 |
| 105 | Pressure side | 0.08748 | 0.22561 | 0.90000 |
| 106 | Pressure side | 0.09480 | 0.22369 | 0.90000 |
| 107 | Pressure side | 0.10216 | 0.22193 | 0.90000 |
| 108 | Pressure side | 0.10954 | 0.22028 | 0.90000 |
| 109 | Pressure side | 0.11693 | 0.21865 | 0.90000 |
| 110 | Pressure side | 0.12431 | 0.21700 | 0.90000 |
| 111 | Pressure side | 0.13168 | 0.21527 | 0.90000 |
| 112 | Pressure side | 0.13903 | 0.21347 | 0.90000 |
| 113 | Pressure side | 0.14634 | 0.21157 | 0.90000 |
| 114 | Pressure side | 0.15363 | 0.20953 | 0.90000 |
| 115 | Pressure side | 0.16088 | 0.20738 | 0.90000 |
| 116 | Pressure side | 0.16810 | 0.20508 | 0.90000 |
| 117 | Pressure side | 0.17526 | 0.20264 | 0.90000 |
| 118 | Pressure side | 0.18236 | 0.20004 | 0.90000 |
| 119 | Pressure side | 0.18941 | 0.19728 | 0.90000 |
| 120 | Pressure side | 0.19639 | 0.19437 | 0.90000 |
| 121 | Pressure side | 0.20331 | 0.19130 | 0.90000 |
| 122 | Pressure side | 0.21015 | 0.18808 | 0.90000 |
| 123 | Pressure side | 0.21692 | 0.18470 | 0.90000 |
| 124 | Pressure side | 0.22361 | 0.18118 | 0.90000 |
| 125 | Pressure side | 0.23023 | 0.17750 | 0.90000 |
| 126 | Pressure side | 0.23675 | 0.17370 | 0.90000 |

TABLE 1-continued

Non-Dimensionalized (X Y Z/Span Height)

| N | Location | X | Y | Z |
|---|---|---|---|---|
| 127 | Pressure side | 0.24322 | 0.16974 | 0.90000 |
| 128 | Pressure side | 0.24958 | 0.16566 | 0.90000 |
| 129 | Pressure side | 0.25587 | 0.16144 | 0.90000 |
| 130 | Pressure side | 0.26207 | 0.15712 | 0.90000 |
| 131 | Pressure side | 0.26820 | 0.15268 | 0.90000 |
| 132 | Pressure side | 0.27424 | 0.14813 | 0.90000 |
| 133 | Pressure side | 0.28021 | 0.14348 | 0.90000 |
| 134 | Pressure side | 0.28611 | 0.13874 | 0.90000 |
| 135 | Pressure side | 0.29193 | 0.13392 | 0.90000 |
| 136 | Pressure side | 0.29769 | 0.12901 | 0.90000 |
| 137 | Pressure side | 0.30337 | 0.12402 | 0.90000 |
| 138 | Pressure side | 0.30900 | 0.11896 | 0.90000 |
| 139 | Pressure side | 0.31458 | 0.11384 | 0.90000 |
| 140 | Pressure side | 0.32009 | 0.10866 | 0.90000 |
| 141 | Pressure side | 0.32557 | 0.10345 | 0.90000 |
| 142 | Pressure side | 0.33099 | 0.09817 | 0.90000 |
| 143 | Pressure side | 0.33639 | 0.09286 | 0.90000 |
| 144 | Pressure side | 0.34173 | 0.08751 | 0.90000 |
| 145 | Pressure side | 0.34705 | 0.08213 | 0.90000 |
| 146 | Pressure side | 0.35234 | 0.07672 | 0.90000 |
| 147 | Pressure side | 0.35759 | 0.07128 | 0.90000 |
| 148 | Pressure side | 0.36283 | 0.06582 | 0.90000 |
| 149 | Pressure side | 0.36804 | 0.06034 | 0.90000 |
| 150 | Pressure side | 0.37324 | 0.05483 | 0.90000 |
| 151 | Pressure side | 0.37840 | 0.04932 | 0.90000 |
| 152 | Pressure side | 0.38357 | 0.04377 | 0.90000 |
| 153 | Pressure side | 0.38871 | 0.03823 | 0.90000 |
| 154 | Pressure side | 0.39384 | 0.03267 | 0.90000 |
| 155 | Pressure side | 0.39895 | 0.02710 | 0.90000 |
| 156 | Pressure side | 0.40405 | 0.02151 | 0.90000 |
| 157 | Pressure side | 0.40914 | 0.01591 | 0.90000 |
| 158 | Pressure side | 0.41421 | 0.01030 | 0.90000 |
| 159 | Pressure side | 0.41929 | 0.00468 | 0.90000 |
| 160 | Pressure side | 0.42434 | −0.00094 | 0.90000 |
| 161 | Pressure side | 0.42938 | −0.00659 | 0.90000 |
| 162 | Pressure side | 0.43442 | −0.01224 | 0.90000 |
| 163 | Pressure side | 0.43943 | −0.01790 | 0.90000 |
| 164 | Pressure side | 0.44443 | −0.02357 | 0.90000 |
| 165 | Pressure side | 0.44941 | −0.02926 | 0.90000 |
| 166 | Pressure side | 0.45439 | −0.03497 | 0.90000 |
| 167 | Pressure side | 0.45935 | −0.04068 | 0.90000 |
| 168 | Pressure side | 0.46429 | −0.04641 | 0.90000 |
| 169 | Pressure side | 0.46921 | −0.05216 | 0.90000 |
| 170 | Pressure side | 0.47411 | −0.05793 | 0.90000 |
| 171 | Pressure side | 0.47898 | −0.06371 | 0.90000 |
| 172 | Pressure side | 0.48384 | −0.06951 | 0.90000 |
| 173 | Pressure side | 0.48867 | −0.07533 | 0.90000 |
| 174 | Pressure side | 0.49347 | −0.08117 | 0.90000 |
| 175 | Pressure side | 0.49825 | −0.08704 | 0.90000 |
| 176 | Pressure side | 0.50300 | −0.09293 | 0.90000 |
| 177 | Pressure side | 0.50773 | −0.09884 | 0.90000 |
| 178 | Pressure side | 0.51242 | −0.10477 | 0.90000 |
| 179 | Pressure side | 0.51708 | −0.11073 | 0.90000 |
| 180 | Pressure side | 0.52171 | −0.11672 | 0.90000 |
| 181 | Pressure side | 0.52631 | −0.12272 | 0.90000 |
| 182 | Pressure side | 0.53088 | −0.12875 | 0.90000 |
| 183 | Pressure side | 0.53542 | −0.13479 | 0.90000 |
| 184 | Pressure side | 0.53993 | −0.14087 | 0.90000 |
| 185 | Pressure side | 0.54440 | −0.14698 | 0.90000 |
| 186 | Pressure side | 0.54884 | −0.15310 | 0.90000 |
| 187 | Pressure side | 0.55324 | −0.15926 | 0.90000 |
| 188 | Pressure side | 0.55762 | −0.16543 | 0.90000 |
| 189 | Pressure side | 0.56196 | −0.17162 | 0.90000 |
| 190 | Pressure side | 0.56627 | −0.17784 | 0.90000 |
| 191 | Pressure side | 0.57055 | −0.18409 | 0.90000 |
| 192 | Pressure side | 0.57478 | −0.19035 | 0.90000 |
| 193 | Pressure side | 0.57899 | −0.19664 | 0.90000 |
| 194 | Pressure side | 0.58316 | −0.20295 | 0.90000 |
| 195 | Pressure side | 0.58730 | −0.20928 | 0.90000 |
| 196 | Pressure side | 0.59141 | −0.21564 | 0.90000 |
| 197 | Pressure side | 0.59400 | −0.21845 | 0.90000 |
| 198 | Pressure side | 0.59744 | −0.22010 | 0.90000 |
| 199 | Pressure side | 0.60125 | −0.22033 | 0.90000 |
| 200 | Pressure side | 0.60488 | −0.21914 | 0.90000 |
| 1 | Suction side | 0.05236 | 0.31452 | 1.00000 |
| 2 | Suction side | 0.05281 | 0.32369 | 1.00000 |
| 3 | Suction side | 0.05539 | 0.30586 | 1.00000 |
| 4 | Suction side | 0.05606 | 0.33230 | 1.00000 |
| 5 | Suction side | 0.06119 | 0.33997 | 1.00000 |
| 6 | Suction side | 0.06752 | 0.34668 | 1.00000 |
| 7 | Suction side | 0.07472 | 0.35247 | 1.00000 |
| 8 | Suction side | 0.08252 | 0.35739 | 1.00000 |
| 9 | Suction side | 0.09078 | 0.36152 | 1.00000 |
| 10 | Suction side | 0.09937 | 0.36489 | 1.00000 |
| 11 | Suction side | 0.10822 | 0.36752 | 1.00000 |
| 12 | Suction side | 0.11725 | 0.36942 | 1.00000 |
| 13 | Suction side | 0.12641 | 0.37066 | 1.00000 |
| 14 | Suction side | 0.13562 | 0.37122 | 1.00000 |
| 15 | Suction side | 0.14486 | 0.37115 | 1.00000 |
| 16 | Suction side | 0.15407 | 0.37047 | 1.00000 |
| 17 | Suction side | 0.16321 | 0.36918 | 1.00000 |
| 18 | Suction side | 0.17226 | 0.36735 | 1.00000 |
| 19 | Suction side | 0.18119 | 0.36497 | 1.00000 |
| 20 | Suction side | 0.18995 | 0.36211 | 1.00000 |
| 21 | Suction side | 0.19857 | 0.35876 | 1.00000 |
| 22 | Suction side | 0.20700 | 0.35500 | 1.00000 |
| 23 | Suction side | 0.21523 | 0.35081 | 1.00000 |
| 24 | Suction side | 0.22327 | 0.34627 | 1.00000 |
| 25 | Suction side | 0.23111 | 0.34139 | 1.00000 |
| 26 | Suction side | 0.23876 | 0.33622 | 1.00000 |
| 27 | Suction side | 0.24622 | 0.33078 | 1.00000 |
| 28 | Suction side | 0.25351 | 0.32510 | 1.00000 |
| 29 | Suction side | 0.26061 | 0.31920 | 1.00000 |
| 30 | Suction side | 0.26755 | 0.31312 | 1.00000 |
| 31 | Suction side | 0.27435 | 0.30686 | 1.00000 |
| 32 | Suction side | 0.28101 | 0.30046 | 1.00000 |
| 33 | Suction side | 0.28754 | 0.29392 | 1.00000 |
| 34 | Suction side | 0.29394 | 0.28727 | 1.00000 |
| 35 | Suction side | 0.30023 | 0.28051 | 1.00000 |
| 36 | Suction side | 0.30642 | 0.27366 | 1.00000 |
| 37 | Suction side | 0.31252 | 0.26673 | 1.00000 |
| 38 | Suction side | 0.31853 | 0.25970 | 1.00000 |
| 39 | Suction side | 0.32445 | 0.25263 | 1.00000 |
| 40 | Suction side | 0.33031 | 0.24549 | 1.00000 |
| 41 | Suction side | 0.33611 | 0.23829 | 1.00000 |
| 42 | Suction side | 0.34183 | 0.23105 | 1.00000 |
| 43 | Suction side | 0.34752 | 0.22378 | 1.00000 |
| 44 | Suction side | 0.35314 | 0.21645 | 1.00000 |
| 45 | Suction side | 0.35872 | 0.20910 | 1.00000 |
| 46 | Suction side | 0.36426 | 0.20171 | 1.00000 |
| 47 | Suction side | 0.36977 | 0.19429 | 1.00000 |
| 48 | Suction side | 0.37522 | 0.18684 | 1.00000 |
| 49 | Suction side | 0.38064 | 0.17937 | 1.00000 |
| 50 | Suction side | 0.38604 | 0.17186 | 1.00000 |
| 51 | Suction side | 0.39141 | 0.16436 | 1.00000 |
| 52 | Suction side | 0.39675 | 0.15681 | 1.00000 |
| 53 | Suction side | 0.40205 | 0.14926 | 1.00000 |
| 54 | Suction side | 0.40733 | 0.14169 | 1.00000 |
| 55 | Suction side | 0.41260 | 0.13409 | 1.00000 |
| 56 | Suction side | 0.41783 | 0.12649 | 1.00000 |
| 57 | Suction side | 0.42303 | 0.11885 | 1.00000 |
| 58 | Suction side | 0.42821 | 0.11121 | 1.00000 |
| 59 | Suction side | 0.43336 | 0.10354 | 1.00000 |
| 60 | Suction side | 0.43849 | 0.09585 | 1.00000 |
| 61 | Suction side | 0.44359 | 0.08816 | 1.00000 |
| 62 | Suction side | 0.44866 | 0.08045 | 1.00000 |
| 63 | Suction side | 0.45371 | 0.07271 | 1.00000 |
| 64 | Suction side | 0.45875 | 0.06497 | 1.00000 |
| 65 | Suction side | 0.46375 | 0.05722 | 1.00000 |
| 66 | Suction side | 0.46874 | 0.04945 | 1.00000 |
| 67 | Suction side | 0.47370 | 0.04165 | 1.00000 |
| 68 | Suction side | 0.47863 | 0.03385 | 1.00000 |
| 69 | Suction side | 0.48355 | 0.02601 | 1.00000 |
| 70 | Suction side | 0.48842 | 0.01818 | 1.00000 |
| 71 | Suction side | 0.49326 | 0.01032 | 1.00000 |
| 72 | Suction side | 0.49807 | 0.00243 | 1.00000 |
| 73 | Suction side | 0.50286 | −0.00547 | 1.00000 |
| 74 | Suction side | 0.50760 | −0.01340 | 1.00000 |
| 75 | Suction side | 0.51231 | −0.02133 | 1.00000 |
| 76 | Suction side | 0.51699 | −0.02930 | 1.00000 |
| 77 | Suction side | 0.52163 | −0.03729 | 1.00000 |
| 78 | Suction side | 0.52624 | −0.04529 | 1.00000 |

TABLE 1-continued

Non-Dimensionalized (X Y Z/Span Height)

| N | Location | X | Y | Z |
|---|---|---|---|---|
| 79 | Suction side | 0.53082 | −0.05330 | 1.00000 |
| 80 | Suction side | 0.53536 | −0.06135 | 1.00000 |
| 81 | Suction side | 0.53986 | −0.06941 | 1.00000 |
| 82 | Suction side | 0.54434 | −0.07748 | 1.00000 |
| 83 | Suction side | 0.54878 | −0.08559 | 1.00000 |
| 84 | Suction side | 0.55318 | −0.09370 | 1.00000 |
| 85 | Suction side | 0.55754 | −0.10185 | 1.00000 |
| 86 | Suction side | 0.56187 | −0.11000 | 1.00000 |
| 87 | Suction side | 0.56614 | −0.11819 | 1.00000 |
| 88 | Suction side | 0.57037 | −0.12640 | 1.00000 |
| 89 | Suction side | 0.57455 | −0.13463 | 1.00000 |
| 90 | Suction side | 0.57869 | −0.14290 | 1.00000 |
| 91 | Suction side | 0.58277 | −0.15118 | 1.00000 |
| 92 | Suction side | 0.58680 | −0.15949 | 1.00000 |
| 93 | Suction side | 0.59080 | −0.16781 | 1.00000 |
| 94 | Suction side | 0.59475 | −0.17615 | 1.00000 |
| 95 | Suction side | 0.59867 | −0.18452 | 1.00000 |
| 96 | Suction side | 0.60256 | −0.19289 | 1.00000 |
| 97 | Suction side | 0.60512 | −0.21195 | 1.00000 |
| 98 | Suction side | 0.60642 | −0.20127 | 1.00000 |
| 99 | Suction side | 0.60686 | −0.20863 | 1.00000 |
| 100 | Suction side | 0.60736 | −0.20491 | 1.00000 |
| 101 | Pressure side | 0.06050 | 0.29997 | 1.00000 |
| 102 | Pressure side | 0.06652 | 0.29499 | 1.00000 |
| 103 | Pressure side | 0.07278 | 0.29030 | 1.00000 |
| 104 | Pressure side | 0.07913 | 0.28573 | 1.00000 |
| 105 | Pressure side | 0.08554 | 0.28127 | 1.00000 |
| 106 | Pressure side | 0.09199 | 0.27685 | 1.00000 |
| 107 | Pressure side | 0.09849 | 0.27251 | 1.00000 |
| 108 | Pressure side | 0.10503 | 0.26823 | 1.00000 |
| 109 | Pressure side | 0.11159 | 0.26399 | 1.00000 |
| 110 | Pressure side | 0.11819 | 0.25980 | 1.00000 |
| 111 | Pressure side | 0.12483 | 0.25568 | 1.00000 |
| 112 | Pressure side | 0.13149 | 0.25159 | 1.00000 |
| 113 | Pressure side | 0.13816 | 0.24753 | 1.00000 |
| 114 | Pressure side | 0.14487 | 0.24348 | 1.00000 |
| 115 | Pressure side | 0.15157 | 0.23946 | 1.00000 |
| 116 | Pressure side | 0.15828 | 0.23546 | 1.00000 |
| 117 | Pressure side | 0.16498 | 0.23145 | 1.00000 |
| 118 | Pressure side | 0.17169 | 0.22743 | 1.00000 |
| 119 | Pressure side | 0.17839 | 0.22340 | 1.00000 |
| 120 | Pressure side | 0.18507 | 0.21934 | 1.00000 |
| 121 | Pressure side | 0.19172 | 0.21524 | 1.00000 |
| 122 | Pressure side | 0.19835 | 0.21111 | 1.00000 |
| 123 | Pressure side | 0.20494 | 0.20691 | 1.00000 |
| 124 | Pressure side | 0.21149 | 0.20264 | 1.00000 |
| 125 | Pressure side | 0.21800 | 0.19831 | 1.00000 |
| 126 | Pressure side | 0.22445 | 0.19390 | 1.00000 |
| 127 | Pressure side | 0.23084 | 0.18939 | 1.00000 |
| 128 | Pressure side | 0.23717 | 0.18481 | 1.00000 |
| 129 | Pressure side | 0.24345 | 0.18014 | 1.00000 |
| 130 | Pressure side | 0.24965 | 0.17539 | 1.00000 |
| 131 | Pressure side | 0.25578 | 0.17055 | 1.00000 |
| 132 | Pressure side | 0.26185 | 0.16562 | 1.00000 |
| 133 | Pressure side | 0.26784 | 0.16061 | 1.00000 |
| 134 | Pressure side | 0.27377 | 0.15552 | 1.00000 |
| 135 | Pressure side | 0.27965 | 0.15035 | 1.00000 |
| 136 | Pressure side | 0.28545 | 0.14512 | 1.00000 |
| 137 | Pressure side | 0.29119 | 0.13982 | 1.00000 |
| 138 | Pressure side | 0.29689 | 0.13446 | 1.00000 |
| 139 | Pressure side | 0.30252 | 0.12904 | 1.00000 |
| 140 | Pressure side | 0.30811 | 0.12357 | 1.00000 |
| 141 | Pressure side | 0.31365 | 0.11807 | 1.00000 |
| 142 | Pressure side | 0.31916 | 0.11252 | 1.00000 |
| 143 | Pressure side | 0.32463 | 0.10695 | 1.00000 |
| 144 | Pressure side | 0.33008 | 0.10132 | 1.00000 |
| 145 | Pressure side | 0.33548 | 0.09569 | 1.00000 |
| 146 | Pressure side | 0.34088 | 0.09003 | 1.00000 |
| 147 | Pressure side | 0.34623 | 0.08434 | 1.00000 |
| 148 | Pressure side | 0.35158 | 0.07864 | 1.00000 |
| 149 | Pressure side | 0.35691 | 0.07292 | 1.00000 |
| 150 | Pressure side | 0.36222 | 0.06719 | 1.00000 |
| 151 | Pressure side | 0.36753 | 0.06146 | 1.00000 |
| 152 | Pressure side | 0.37282 | 0.05569 | 1.00000 |
| 153 | Pressure side | 0.37811 | 0.04994 | 1.00000 |
| 154 | Pressure side | 0.38338 | 0.04417 | 1.00000 |
| 155 | Pressure side | 0.38865 | 0.03839 | 1.00000 |
| 156 | Pressure side | 0.39391 | 0.03262 | 1.00000 |
| 157 | Pressure side | 0.39915 | 0.02683 | 1.00000 |
| 158 | Pressure side | 0.40441 | 0.02103 | 1.00000 |
| 159 | Pressure side | 0.40964 | 0.01523 | 1.00000 |
| 160 | Pressure side | 0.41486 | 0.00941 | 1.00000 |
| 161 | Pressure side | 0.42008 | 0.00359 | 1.00000 |
| 162 | Pressure side | 0.42529 | −0.00224 | 1.00000 |
| 163 | Pressure side | 0.43049 | −0.00807 | 1.00000 |
| 164 | Pressure side | 0.43568 | −0.01392 | 1.00000 |
| 165 | Pressure side | 0.44085 | −0.01977 | 1.00000 |
| 166 | Pressure side | 0.44602 | −0.02563 | 1.00000 |
| 167 | Pressure side | 0.45117 | −0.03151 | 1.00000 |
| 168 | Pressure side | 0.45631 | −0.03740 | 1.00000 |
| 169 | Pressure side | 0.46144 | −0.04330 | 1.00000 |
| 170 | Pressure side | 0.46655 | −0.04922 | 1.00000 |
| 171 | Pressure side | 0.47164 | −0.05515 | 1.00000 |
| 172 | Pressure side | 0.47671 | −0.06110 | 1.00000 |
| 173 | Pressure side | 0.48176 | −0.06705 | 1.00000 |
| 174 | Pressure side | 0.48680 | −0.07303 | 1.00000 |
| 175 | Pressure side | 0.49181 | −0.07904 | 1.00000 |
| 176 | Pressure side | 0.49680 | −0.08505 | 1.00000 |
| 177 | Pressure side | 0.50175 | −0.09111 | 1.00000 |
| 178 | Pressure side | 0.50667 | −0.09718 | 1.00000 |
| 179 | Pressure side | 0.51156 | −0.10328 | 1.00000 |
| 180 | Pressure side | 0.51640 | −0.10940 | 1.00000 |
| 181 | Pressure side | 0.52121 | −0.11556 | 1.00000 |
| 182 | Pressure side | 0.52600 | −0.12175 | 1.00000 |
| 183 | Pressure side | 0.53073 | −0.12798 | 1.00000 |
| 184 | Pressure side | 0.53543 | −0.13421 | 1.00000 |
| 185 | Pressure side | 0.54010 | −0.14048 | 1.00000 |
| 186 | Pressure side | 0.54473 | −0.14678 | 1.00000 |
| 187 | Pressure side | 0.54933 | −0.15310 | 1.00000 |
| 188 | Pressure side | 0.55389 | −0.15945 | 1.00000 |
| 189 | Pressure side | 0.55842 | −0.16582 | 1.00000 |
| 190 | Pressure side | 0.56291 | −0.17222 | 1.00000 |
| 191 | Pressure side | 0.56737 | −0.17864 | 1.00000 |
| 192 | Pressure side | 0.57178 | −0.18509 | 1.00000 |
| 193 | Pressure side | 0.57616 | −0.19157 | 1.00000 |
| 194 | Pressure side | 0.58051 | −0.19806 | 1.00000 |
| 195 | Pressure side | 0.58481 | −0.20459 | 1.00000 |
| 196 | Pressure side | 0.58905 | −0.21115 | 1.00000 |
| 197 | Pressure side | 0.59159 | −0.21393 | 1.00000 |
| 198 | Pressure side | 0.59500 | −0.21552 | 1.00000 |
| 199 | Pressure side | 0.59875 | −0.21569 | 1.00000 |
| 200 | Pressure side | 0.60230 | −0.21442 | 1.00000 |

Figure 6:
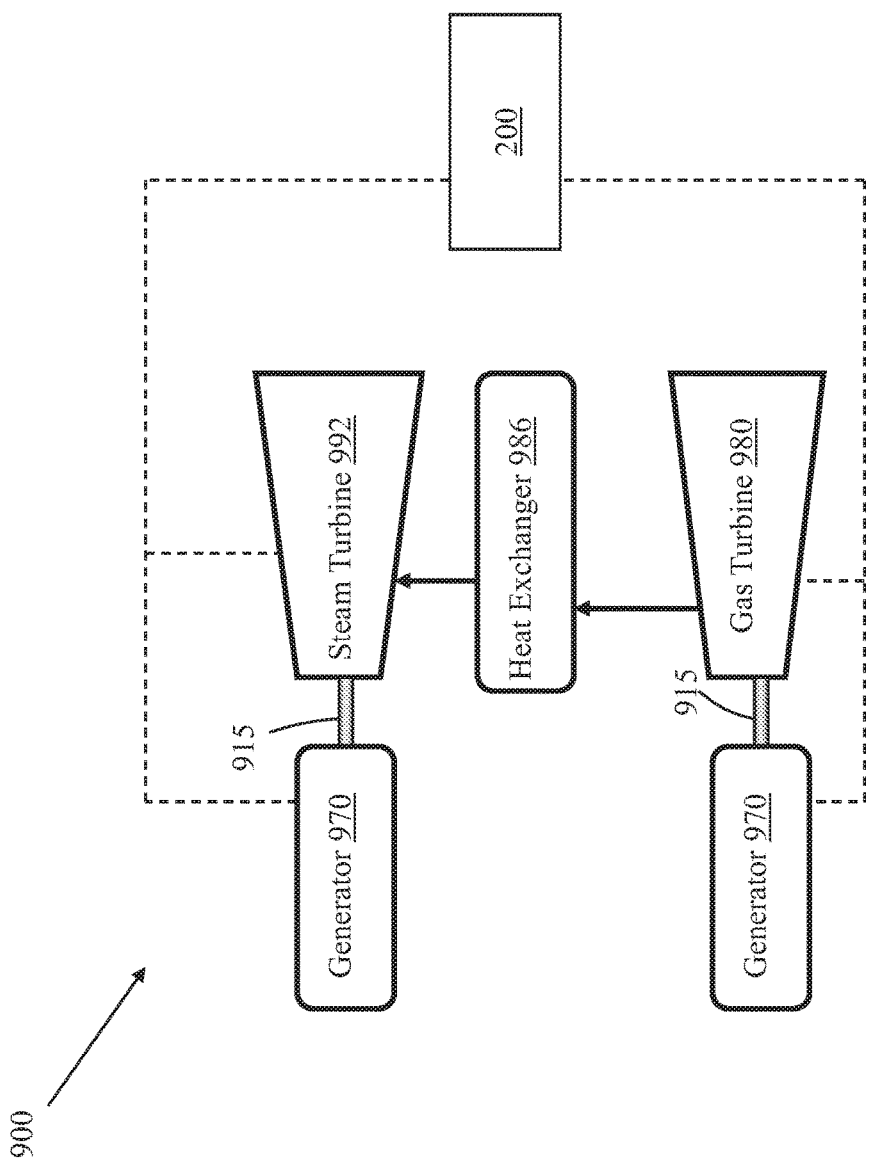
FIG. 6 shows a schematic block diagram illustrating portions of a multi-shaft combined cycle power plant system according to embodiments of the disclosure.

Turning to FIG. 6, a schematic view of portions of a multi-shaft combined cycle power plant 900 is shown. Combined cycle power plant 900 may include, for example, a gas turbine 980 operably connected to a generator 970. Generator 970 and gas turbine 980 may be mechanically coupled by a shaft 915, which may transfer energy between a drive shaft (not shown) of gas turbine 980 and generator 970. Also shown in FIG. 6 is a heat exchanger 986 operably connected to gas turbine 980 and a steam turbine 992. Heat exchanger 986 may be fluidly connected to both gas turbine 980 and a steam turbine 992 via conventional conduits (numbering omitted). Gas turbine 980 and/or steam turbine 992 may include one or more blades 200 as shown and described with reference to FIG. 2 and/or other embodiments described herein. Heat exchanger 986 may be a conventional heat recovery steam generator (HRSG), such as those used in conventional combined cycle power systems. As is known in the art of power generation, HRSG 986 may use hot exhaust from gas turbine 980, combined with a water supply, to create steam which is fed to steam turbine 992. Steam turbine 992 may optionally be coupled to a second generator system 970 (via a second shaft 915). It is understood that generators 970 and shafts 915 may be of any size or type known in the art and may differ depending upon their application or the system to which they are connected. Common numbering of the generators and shafts is for clarity and does not necessarily suggest these generators or shafts are identical. In another embodiment, shown in FIG. 9, a single shaft combined cycle power plant 990 may include a single generator 970 coupled to both gas turbine 980 and steam turbine 992 via a single shaft 915. Steam turbine 992 and/or gas turbine 980 may include one or more blades 200 shown and described with reference to FIG. 2 and/or other embodiments described herein.

The apparatus and devices of the present disclosure are not limited to any one particular engine, turbine, jet engine, generator, power generation system or other system, and may be used with other aircraft systems, power generation systems and/or systems (e.g., combined cycle, simple cycle, nuclear reactor, etc.). Additionally, the apparatus of the present invention may be used with other systems not described herein that may benefit from the increased reduced tip leakage and increased efficiency of the apparatus and devices described herein.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A turbine blade comprising:
    an airfoil having: a suction side; a pressure side opposing the suction side; a leading edge spanning between the pressure side and the suction side; and a trailing edge opposing the leading edge and spanning between the pressure side and the suction side, wherein the trailing edge defines a radial throat distribution between the airfoil and an adjacent airfoil; and
    a base connected with a first end of the airfoil along the suction side, pressure side, trailing edge and the leading edge,
    wherein at least one of the suction side or the pressure side of the airfoil includes a nominal profile substantially in accordance with Cartesian coordinate values of X, Y and Z set forth in TABLE I, wherein the Z coordinate values are non-dimensional values of from 0 to 1 convertible to Z distances by multiplying the values by an airfoil height expressed in units of distance, and wherein X and Y values connected by smooth continuing arcs define airfoil profile sections at each distance Z along the airfoil, the profile sections at the Z distances being joined smoothly with one another to form the airfoil profile, the X, Y, and Z distances being scalable as a function of the same constant or number to provide a scaled up or scaled down airfoil, wherein the Cartesian coordinate values have an origin at a root of the leading edge of the airfoil.

2. The turbine blade of claim 1, further comprising a fillet connecting a surface of the base to a surface of the airfoil.

3. The turbine blade of claim 1, wherein the turbine blade includes at least one of a first stage blade or a second stage blade.

4. The turbine blade of claim 1, wherein the base directs flow of a working fluid across a passage trough proximate the suction side of the airfoil.

5. The turbine blade of claim 1, wherein the base is radially inboard of the airfoil.

6. The turbine blade of claim 1, wherein the radial throat distribution is defined by a distance of approximately 2.5 centimeters to approximately 5 centimeters between the trailing edge and the adjacent airfoil.

7. The turbine blade of claim 6, wherein the radial throat distribution is measured from the trailing edge to a suction side of the adjacent airfoil at approximately 65-75% of an axial span of the adjacent airfoil.

8. A turbine rotor section comprising:
    a set of blades, the set of blades including at least one blade having:
        an airfoil having: a suction side; a pressure side opposing the suction side; a leading edge spanning between the pressure side and the suction side; and a trailing edge opposing the leading edge and spanning between the pressure side and the suction side, wherein the trailing edge defines a radial throat distribution between the airfoil and an adjacent airfoil of a distinct blade in the set of blades; and
        a base connected with a first end of the airfoil along the suction side, pressure side, trailing edge and the leading edge,
        wherein at least one of the suction side or the pressure side of the airfoil includes a nominal profile substantially in accordance with Cartesian coordinate values of X, Y and Z set forth in TABLE I, wherein the Z coordinate values are non-dimensional values of from 0 to 1 convertible to Z distances by multiplying the Z values by an airfoil height expressed in units of distance, and wherein X and Y values connected by smooth continuing arcs define airfoil profile sections at each distance Z along the airfoil, the profile sections at the Z distances being joined smoothly with one another to form the airfoil profile, the X, Y, and Z distances being scalable as a function of the same constant or number to provide a scaled up or scaled down airfoil, wherein the Cartesian coordinate values have an origin at a root of the leading edge of the airfoil.

9. The turbine rotor section of claim 8, further comprising a fillet connecting a surface of the base to a surface of the airfoil.

10. The turbine rotor section of claim 8, wherein the turbine blade includes at least one of a first stage blade or a second stage blade.

11. The turbine rotor section of claim 8, wherein the radial throat distribution is defined by a distance of approximately 2.5 centimeters to approximately 5 centimeters between the trailing edge and the adjacent airfoil.

12. The turbine rotor section of claim 11, wherein the radial throat distribution is measured from the trailing edge to a suction side of the adjacent airfoil at approximately 65-75% of an axial span of the adjacent airfoil.

13. The turbine rotor section of claim 8, wherein the base directs flow of a working fluid across a passage trough proximate the suction side of the airfoil.

14. A turbine comprising:
a static nozzle section; and
a rotor section at least partially contained within the static nozzle section, the rotor section having a set of blades including at least one blade having:
an airfoil having: a suction side; a pressure side opposing the suction side; a leading edge spanning between the pressure side and the suction side; and a trailing edge opposing the leading edge and spanning between the pressure side and the suction side, wherein the trailing edge defines a radial throat distribution between the airfoil and an adjacent airfoil of a distinct blade in the set of blades, wherein at least one of the suction side or the pressure side of the airfoil includes a nominal profile substantially in accordance with Cartesian coordinate values of X, Y and Z set forth in TABLE I, wherein the Z coordinate values are non-dimensional values of from 0 to 1 convertible to Z distances by multiplying the values by an airfoil height expressed in units of distance, and wherein X and Y values connected by smooth continuing arcs define airfoil profile sections at each distance Z along the airfoil, the profile sections at the Z distances being joined smoothly with one another to form the airfoil profile, the X, Y, and Z distances being scalable as a function of the same constant or number to provide a scaled up or scaled down airfoil, wherein the Cartesian coordinate values have an origin at a root of the leading edge of the airfoil; and
a base connected with a first end of the airfoil along the suction side, pressure side, trailing edge and the leading edge.

15. The turbine of claim 14, wherein the radial throat distribution is defined by a distance of approximately 2.5 centimeters to approximately 5 centimeters between the trailing edge and the adjacent airfoil.

16. The turbine of claim 14, wherein the radial throat distribution is measured from the trailing edge to a suction side of the adjacent airfoil at approximately 65-75% of an axial span of the adjacent airfoil.

17. The turbine of claim 14, further comprising a fillet connecting a surface of the base to a surface of the airfoil.

18. The turbine of claim 14, wherein the at least one blade includes at least one of a first stage blade or a second stage blade.

* * * * *